US012529905B2

(12) United States Patent
Makinen et al.

(10) Patent No.: US 12,529,905 B2
(45) Date of Patent: Jan. 20, 2026

(54) LIGHT FIELD IMAGE ENGINE METHOD AND APPARATUS FOR GENERATING PROJECTED 3D LIGHT FIELDS

(71) Applicant: INTERDIGITAL MADISON PATENT HOLDINGS, SAS, Paris (FR)

(72) Inventors: Jukka-Tapani Makinen, Oulu (FI); Kai Ojala, Oulu (FI)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 16/638,719

(22) PCT Filed: Aug. 21, 2018

(86) PCT No.: PCT/US2018/047313
§ 371 (c)(1),
(2) Date: Feb. 12, 2020

(87) PCT Pub. No.: WO2019/040484
PCT Pub. Date: Feb. 28, 2019

(65) Prior Publication Data
US 2020/0371378 A1 Nov. 26, 2020

Related U.S. Application Data

(60) Provisional application No. 62/617,539, filed on Jan. 15, 2018, provisional application No. 62/553,615, (Continued)

(51) Int. Cl.
*G02B 30/50* (2020.01)
*G02B 30/27* (2020.01)
(Continued)

(52) U.S. Cl.
CPC ............. *G02B 30/50* (2020.01); *G02B 30/27* (2020.01); *G02B 30/33* (2020.01); *G02B 30/60* (2020.01)

(58) Field of Classification Search
CPC ........ G02B 30/50; G02B 30/33; G02B 30/60; G02B 30/27
See application file for complete search history.

(56) References Cited

U.S. PATENT DOCUMENTS 4,210,391 A 7/1980 Cohen
4,452,509 A 6/1984 VanBreemen
(Continued)

FOREIGN PATENT DOCUMENTS

CN 1797175 A 7/2006
CN 101002242 A 7/2007
(Continued)

OTHER PUBLICATIONS

English Translation of JP2003005129 (Year: 2003).*
English Translation of KR 20080094318 (Year: 2008).*
(Continued)

*Primary Examiner* — Patrick N Edouard
*Assistant Examiner* — Eboni N Giles
(74) *Attorney, Agent, or Firm* — Smadar Gefen

(57) ABSTRACT

Systems and methods are described for providing a three-dimensional display. In an example, a display device includes a light engine, a spatial light modulator, one or more directable mirrors, and a projection lens. Light from the light engine is modulated by the spatial light modulator, reflected by the directable mirror(s) toward the projection lens, and projected by the projection lens (e.g. onto a screen). The directable mirror(s) may include a rotatable mirror or a digital micromirror device. The spatial light modulator may be a digital micromirror device. The spatial light modulator and the directable mirror(s) are synchro-
(Continued)

nized so as to generate different modulated light patterns for different positions of the directable mirror(s). The projection of different modulated light patterns in different directions may generate different views that are visible from different user perspectives.

20 Claims, 34 Drawing Sheets

Related U.S. Application Data filed on Sep. 1, 2017, provisional application No. 62/549,386, filed on Aug. 23, 2017.

(51) Int. Cl.
    *G02B 30/33*     (2020.01)
    *G02B 30/60*     (2020.01)

(56) References Cited

U.S. PATENT DOCUMENTS

| | | |
|---|---|---|
| 4,717,949 A | 1/1988 | Eichenlaub |
| 5,083,854 A | 1/1992 | Zampolin |
| 5,132,839 A | 7/1992 | Travis |
| 5,359,454 A | 10/1994 | Steenblik et al. |
| 5,392,140 A | 2/1995 | Ezra |
| 5,457,574 A | 10/1995 | Eichenlaub |
| 5,465,175 A | 11/1995 | Woodgate |
| 5,566,024 A | 10/1996 | Rauch |
| 5,742,262 A | 4/1998 | Tabata |
| 5,777,720 A | 7/1998 | Shapiro et al. |
| 5,959,664 A | 9/1999 | Woodgate |
| 5,991,073 A | 11/1999 | Woodgate et al. |
| 6,014,164 A | 1/2000 | Woodgate et al. |
| 6,061,489 A | 5/2000 | Ezra et al. |
| 6,064,424 A | 5/2000 | van Berkel |
| 6,118,584 A | 9/2000 | Van Berkel |
| 6,201,565 B1 | 3/2001 | Balogh |
| 6,212,007 B1 | 4/2001 | Hentschke |
| 6,462,871 B1 | 10/2002 | Morishima |
| 6,554,430 B2 | 4/2003 | Dorval |
| 6,642,969 B2 | 11/2003 | Tew |
| 6,665,100 B1 | 12/2003 | Klug |
| 6,919,900 B2 | 7/2005 | Wilt |
| 6,999,071 B2 | 2/2006 | Balogh |
| 7,446,733 B1 | 11/2008 | Hirimai |
| 7,518,149 B2 | 4/2009 | Maaskant |
| 7,573,491 B2 | 8/2009 | Hartkop |
| 7,607,780 B2 | 10/2009 | Kim |
| 7,710,636 B2 | 5/2010 | Chui |
| 7,782,523 B2 | 8/2010 | Ishii |
| 7,864,419 B2 | 1/2011 | Cossairt et al. |
| 7,891,815 B2 | 2/2011 | Nayar |
| 7,961,182 B2 | 6/2011 | Tachi |
| 7,994,527 B2 | 8/2011 | Denbaars |
| 8,047,660 B2 | 11/2011 | Penn |
| 8,287,127 B2 | 10/2012 | Gao |
| 8,328,360 B2 | 12/2012 | Gao |
| 8,432,436 B2 | 4/2013 | Debevec |
| 8,587,498 B2 | 11/2013 | Connor |
| 8,605,026 B2 | 12/2013 | Ko et al. |
| 8,675,125 B2 | 3/2014 | Cossairt et al. |
| 8,704,934 B2 | 4/2014 | Yokogawa |
| 8,736,675 B1 | 5/2014 | Holzbach et al. |
| 8,823,702 B2 | 9/2014 | Smithwick |
| 8,848,006 B2 | 9/2014 | Wetzstein |
| 8,872,085 B2 | 10/2014 | Gruhlke |
| 8,958,137 B2 | 2/2015 | Haussler |
| 9,176,328 B1 | 11/2015 | Lieberman et al. |
| 9,298,168 B2 | 3/2016 | Taff |
| 9,304,387 B2 | 4/2016 | Park |
| 9,341,843 B2 | 5/2016 | Border et al. |
| 9,383,562 B2 * | 7/2016 | Hartell .............. G02B 26/0833 |
| 9,405,124 B2 | 8/2016 | Hirsch |
| 9,523,797 B2 | 12/2016 | Yun |
| 9,560,342 B2 | 1/2017 | Cho |
| 9,918,074 B2 | 3/2018 | Smoot et al. |
| 10,110,882 B2 * | 10/2018 | Huang ................... G02B 30/27 |
| 10,154,252 B2 | 12/2018 | Yamagishi |
| 10,209,412 B2 | 2/2019 | Chan et al. |
| 10,394,036 B2 | 8/2019 | Hua |
| 10,469,833 B2 | 11/2019 | Hua et al. |
| 10,475,038 B1 | 11/2019 | Osborn et al. |
| 10,552,676 B2 | 2/2020 | Shroff et al. |
| 10,735,715 B2 | 8/2020 | Jin et al. |
| 10,775,540 B2 | 9/2020 | Song et al. |
| 10,838,214 B2 | 11/2020 | Chen et al. |
| 11,067,802 B1 | 7/2021 | Harrison et al. |
| 11,087,701 B1 | 8/2021 | Chen et al. |
| 11,500,143 B2 | 11/2022 | Danziger |
| 2001/0001566 A1 | 5/2001 | Moseley et al. |
| 2002/0050957 A1 * | 5/2002 | Nagano ................... G09G 3/36 |
| | | 345/32 |
| 2003/0112507 A1 | 6/2003 | Divelbiss |
| 2003/0137730 A1 | 7/2003 | Fridman et al. |
| 2003/0156077 A1 | 8/2003 | Balogh |
| 2003/0176214 A1 | 9/2003 | Burak |
| 2004/0135973 A1 | 7/2004 | Gustafsson |
| 2004/0184145 A1 | 9/2004 | Fridman et al. |
| 2004/0223227 A1 * | 11/2004 | Ohmori ................... G02B 27/09 |
| | | 359/619 |
| 2004/0240033 A1 | 12/2004 | Pan et al. |
| 2005/0018288 A1 | 1/2005 | Redert |
| 2005/0180019 A1 | 8/2005 | Cho |
| 2005/0190140 A1 | 9/2005 | Asahi |
| 2005/0213182 A1 | 9/2005 | Cossairt et al. |
| 2005/0285027 A1 | 12/2005 | Favalora et al. |
| 2006/0050384 A1 | 3/2006 | Agostinelli |
| 2006/0061846 A1 | 3/2006 | Sprague |
| 2006/0083437 A1 | 4/2006 | Jung et al. |
| 2006/0158729 A1 | 7/2006 | Vissenberg et al. |
| 2006/0209066 A1 | 9/2006 | Kubara et al. |
| 2006/0245030 A1 | 11/2006 | Pan |
| 2007/0053052 A1 | 3/2007 | Pan |
| 2007/0070476 A1 | 3/2007 | Yamada et al. |
| 2007/0121191 A1 | 5/2007 | Pan |
| 2007/0139624 A1 | 6/2007 | Decusatis |
| 2007/0171521 A1 | 7/2007 | Sugawara |
| 2007/0200792 A1 | 8/2007 | Kim et al. |
| 2007/0247598 A1 | 10/2007 | Refai |
| 2008/0007671 A1 | 1/2008 | Klenke |
| 2008/0012850 A1 | 1/2008 | Keating et al. |
| 2008/0013147 A1 | 1/2008 | Pan |
| 2008/0036853 A1 | 2/2008 | Shestak et al. |
| 2008/0037120 A1 | 2/2008 | Koo et al. |
| 2008/0094700 A1 | 4/2008 | Uehara |
| 2008/0117289 A1 | 5/2008 | Schowengerdt et al. |
| 2008/0144174 A1 | 6/2008 | Lucente et al. |
| 2008/0157412 A1 | 7/2008 | Kihara et al. |
| 2008/0158245 A1 | 7/2008 | Lieb et al. |
| 2008/0170293 A1 | 7/2008 | Lucente et al. |
| 2008/0204847 A1 | 8/2008 | Kamm |
| 2008/0225360 A1 | 9/2008 | Kasazumi et al. |
| 2008/0239421 A1 | 10/2008 | Yoshikawa et al. |
| 2008/0297593 A1 | 12/2008 | Debevec |
| 2009/0168146 A1 | 7/2009 | Hornbek |
| 2009/0244270 A1 | 10/2009 | Takagi et al. |
| 2010/0033788 A1 | 2/2010 | Huikai |
| 2010/0103486 A1 | 4/2010 | Kroll |
| 2010/0157026 A1 | 6/2010 | Reichelt |
| 2010/0214659 A1 | 8/2010 | Levola |
| 2010/0232000 A1 | 9/2010 | Futterer |
| 2010/0302351 A1 | 12/2010 | Yanamoto |
| 2011/0032365 A1 | 2/2011 | Yett |
| 2011/0037953 A1 | 2/2011 | Nizani |
| 2011/0038044 A1 | 2/2011 | Kim et al. |
| 2011/0096071 A1 | 4/2011 | Okamoto et al. |
| 2011/0102560 A1 | 5/2011 | Kim et al. |
| 2011/0128555 A1 | 6/2011 | Rotschild |
| 2011/0164318 A1 | 7/2011 | Yun et al. |
| 2011/0234770 A1 | 9/2011 | Zerrouk |
| 2011/0242150 A1 | 10/2011 | Song |
| 2011/0285968 A1 | 11/2011 | Huang |

(56) References Cited

U.S. PATENT DOCUMENTS

| | | |
|---|---|---|
| 2012/0050832 A1 | 3/2012 | Rosen et al. |
| 2012/0105929 A1 | 5/2012 | Sung |
| 2012/0113358 A1 | 5/2012 | Kashiwagi et al. |
| 2012/0139908 A1 | 6/2012 | Choi et al. |
| 2012/0140131 A1 | 6/2012 | Lanman |
| 2012/0162763 A1 | 6/2012 | Son et al. |
| 2012/0229452 A1 | 9/2012 | Yoon et al. |
| 2012/0287501 A1 | 11/2012 | Hahn |
| 2013/0002970 A1 | 1/2013 | Baek et al. |
| 2013/0009945 A1 | 1/2013 | Davidson |
| 2013/0100365 A1 | 4/2013 | Komura et al. |
| 2013/0107174 A1 | 5/2013 | Yun et al. |
| 2013/0128087 A1 | 5/2013 | Georgiev |
| 2013/0135545 A1 | 5/2013 | Jung et al. |
| 2013/0155337 A1 | 6/2013 | Sugiyama et al. |
| 2013/0208196 A1 | 8/2013 | Kim et al. |
| 2013/0215111 A1 | 8/2013 | Yokoyama |
| 2013/0215364 A1 | 8/2013 | Huang et al. |
| 2013/0222384 A1* | 8/2013 | Futterer ............... H04N 13/344 345/426 |
| 2013/0286053 A1 | 10/2013 | Fleck et al. |
| 2014/0016051 A1 | 1/2014 | Kroll et al. |
| 2014/0028663 A1 | 1/2014 | Smithwick |
| 2014/0043460 A1 | 2/2014 | Hartell |
| 2014/0063077 A1 | 3/2014 | Wetzstein |
| 2014/0111856 A1 | 4/2014 | Brug et al. |
| 2014/0225887 A1 | 8/2014 | Aguirre-Valencia |
| 2014/0347361 A1 | 11/2014 | Alpaslan |
| 2014/0361990 A1 | 12/2014 | Leister |
| 2015/0033539 A1 | 2/2015 | El-Ghoroury |
| 2015/0035880 A1 | 2/2015 | Heide et al. |
| 2015/0043096 A1 | 2/2015 | Quin |
| 2015/0097756 A1 | 4/2015 | Ziarati |
| 2015/0160614 A1 | 6/2015 | Sung et al. |
| 2015/0172646 A1 | 6/2015 | Smithwick |
| 2015/0253579 A1 | 9/2015 | Kim et al. |
| 2015/0258838 A1 | 9/2015 | Fuhse et al. |
| 2015/0362645 A1 | 12/2015 | Franz et al. |
| 2016/0004128 A1 | 1/2016 | Wu |
| 2016/0014398 A1 | 1/2016 | Kroon |
| 2016/0033705 A1 | 2/2016 | Fattal |
| 2016/0116752 A1 | 4/2016 | Wu |
| 2016/0150225 A1 | 5/2016 | Kurashige |
| 2016/0161752 A1 | 6/2016 | Negoita |
| 2016/0202489 A1 | 7/2016 | Seo et al. |
| 2016/0209665 A1 | 7/2016 | Brown |
| 2016/0252759 A1 | 9/2016 | Woodgate et al. |
| 2016/0261838 A1* | 9/2016 | Ranieri ............... H04N 9/3161 |
| 2016/0313556 A1 | 10/2016 | Futterer |
| 2016/0327906 A1 | 11/2016 | Futterer et al. |
| 2016/0370695 A1 | 12/2016 | Miyasaka |
| 2016/0373701 A1* | 12/2016 | Ferri ............... G03B 35/16 |
| 2017/0010473 A1 | 1/2017 | Masafumi |
| 2017/0052508 A1* | 2/2017 | Brooker ............... G02B 5/3083 |
| 2017/0102545 A1 | 4/2017 | Hua |
| 2017/0108704 A1 | 4/2017 | Ishida |
| 2017/0115519 A1 | 4/2017 | Shi et al. |
| 2017/0129272 A1 | 5/2017 | Rich |
| 2017/0139213 A1 | 5/2017 | Schmidtlin et al. |
| 2017/0171533 A1 | 6/2017 | Benitez et al. |
| 2017/0184776 A1 | 6/2017 | El-Ghoroury et al. |
| 2017/0199496 A1 | 7/2017 | Grata et al. |
| 2017/0236466 A1 | 8/2017 | Spitzer et al. |
| 2017/0272733 A1 | 9/2017 | Taniguchi et al. |
| 2017/0276953 A1 | 9/2017 | Huang et al. |
| 2017/0276957 A1 | 9/2017 | Matsuki |
| 2017/0315371 A1 | 11/2017 | Johnson |
| 2017/0371076 A1 | 12/2017 | Hua |
| 2018/0067057 A1 | 3/2018 | Shmarev et al. |
| 2018/0181063 A1 | 6/2018 | Popov et al. |
| 2018/0220127 A1 | 8/2018 | Khan |
| 2018/0224591 A1 | 8/2018 | Van et al. |
| 2018/0231831 A1 | 8/2018 | Wang et al. |
| 2018/0261003 A1 | 9/2018 | Peli |
| 2018/0267326 A1 | 9/2018 | Broadbent et al. |
| 2018/0284464 A1 | 10/2018 | Lu et al. |
| 2018/0284465 A1 | 10/2018 | Kwon et al. |
| 2018/0308401 A1* | 10/2018 | French ............... H04N 9/3126 |
| 2018/0341219 A1 | 11/2018 | Shestak et al. |
| 2019/0129192 A1 | 5/2019 | Yang et al. |
| 2019/0152250 A1 | 5/2019 | Berthe et al. |
| 2019/0196297 A1 | 6/2019 | Gao et al. |
| 2019/0197928 A1 | 6/2019 | Schubert et al. |
| 2019/0198576 A1 | 6/2019 | Schubert et al. |
| 2019/0199982 A1 | 6/2019 | Schubert et al. |
| 2019/0200004 A1 | 6/2019 | Schubert et al. |
| 2019/0222828 A1 | 7/2019 | Salvador et al. |
| 2019/0271851 A1 | 9/2019 | Mukhtarov et al. |
| 2019/0303001 A1 | 10/2019 | Kikuchi et al. |
| 2019/0373249 A1 | 12/2019 | Kato et al. |
| 2019/0387206 A1 | 12/2019 | Ishii et al. |
| 2020/0081254 A1 | 3/2020 | Tam et al. |
| 2020/0174252 A1 | 6/2020 | Lamkin et al. |
| 2020/0174279 A1 | 6/2020 | Ishihara et al. |
| 2020/0265594 A1 | 8/2020 | Aguirre-Valencia et al. |
| 2020/0301162 A1 | 9/2020 | Ogawa et al. |
| 2020/0341292 A1 | 10/2020 | Sato et al. |
| 2020/0346486 A1 | 11/2020 | Ochiai et al. |
| 2020/0348454 A1 | 11/2020 | Kido |
| 2020/0351490 A1 | 11/2020 | Smithwick |
| 2020/0363772 A1 | 11/2020 | Popov et al. |
| 2020/0371378 A1 | 11/2020 | Makinen |
| 2020/0413032 A1 | 12/2020 | Lyubarsky et al. |
| 2021/0041718 A1 | 2/2021 | Balogh |
| 2021/0063766 A1 | 3/2021 | Karafin et al. |
| 2021/0072556 A1 | 3/2021 | Kim et al. |
| 2021/0092335 A1 | 3/2021 | Cramer |
| 2021/0109363 A1 | 4/2021 | Lyubarsky |
| 2021/0172709 A1 | 6/2021 | Cramer |
| 2021/0173222 A1 | 6/2021 | Makinen et al. |
| 2021/0185303 A1 | 6/2021 | Valli et al. |
| 2021/0199984 A1 | 7/2021 | Park et al. |
| 2021/0203913 A1 | 7/2021 | Kim et al. |
| 2021/0223568 A1 | 7/2021 | Makinen et al. |
| 2021/0311356 A1 | 10/2021 | Haddad et al. |
| 2021/0364987 A1 | 11/2021 | Li et al. |
| 2021/0373205 A1 | 12/2021 | Hornstein et al. |
| 2022/0020962 A1 | 1/2022 | Kim et al. |
| 2022/0034006 A1 | 2/2022 | Mcgraw |
| 2022/0046225 A1 | 2/2022 | Arieli et al. |
| 2022/0075204 A1 | 3/2022 | Rudavskyi et al. |
| 2022/0082853 A1 | 3/2022 | Tanahashi et al. |
| 2022/0105742 A1 | 4/2022 | Dejean et al. |
| 2022/0109824 A1 | 4/2022 | Makinen et al. |
| 2022/0155574 A1 | 5/2022 | Fisch et al. |
| 2022/0197052 A1 | 6/2022 | Makinen |
| 2022/0199588 A1 | 6/2022 | Lu et al. |
| 2022/0206191 A1 | 6/2022 | Kollin et al. |
| 2022/0206313 A1 | 6/2022 | Park et al. |
| 2022/0206314 A1 | 6/2022 | Kim et al. |
| 2022/0208037 A1 | 6/2022 | Chen et al. |
| 2022/0264076 A1 | 8/2022 | Makinen |
| 2022/0308356 A1 | 9/2022 | Makinen |
| 2022/0311990 A1 | 9/2022 | Makinen et al. |
| 2022/0317464 A1 | 10/2022 | Kelly |
| 2022/0321867 A1 | 10/2022 | Makinen et al. |
| 2022/0357591 A1 | 11/2022 | Makinen |
| 2022/0363010 A1 | 11/2022 | Kostenko |
| 2022/0377310 A1 | 11/2022 | Yang et al. |
| 2023/0022108 A1 | 1/2023 | Ghosh et al. |
| 2023/0029109 A1 | 1/2023 | Shi et al. |
| 2023/0076388 A1 | 3/2023 | Yan et al. |
| 2023/0125258 A1 | 4/2023 | Connor |
| 2023/0174368 A1 | 6/2023 | Pepper |
| 2024/0022699 A1 | 1/2024 | Valli et al. |

FOREIGN PATENT DOCUMENTS

| | | |
|---|---|---|
| CN | 101006708 A | 7/2007 |
| CN | 101123735 A | 2/2008 |
| CN | 101209583 A | 7/2008 |
| CN | 101855902 A | 10/2010 |
| CN | 102483544 A | 5/2012 |
| CN | 102645853 A | 8/2012 |

(56) References Cited

FOREIGN PATENT DOCUMENTS

| | | |
|---|---|---|
| CN | 102768410 A | 11/2012 |
| CN | 102854630 | 1/2013 |
| CN | 103048867 A | 4/2013 |
| CN | 103423641 A | 12/2013 |
| CN | 103529554 A | 1/2014 |
| CN | 104756494 A | 7/2015 |
| CN | 104769485 A | 7/2015 |
| CN | 105814626 A | 7/2016 |
| CN | 105929547 A | 9/2016 |
| CN | 106164748 A | 11/2016 |
| CN | 106249394 A | 12/2016 |
| CN | 106569381 A | 4/2017 |
| CN | 106773589 | 5/2017 |
| CN | 106802513 A | 6/2017 |
| CN | 106940483 A | 7/2017 |
| CN | 111065957 | 4/2020 |
| EP | 0650301 A2 | 4/1995 |
| EP | 0797784 A1 | 10/1997 |
| EP | 0635138 B1 | 12/1997 |
| EP | 0961502 A2 | 12/1999 |
| EP | 1069454 | 1/2001 |
| EP | 1069454 A1 | 1/2001 |
| EP | 1447703 A1 | 8/2004 |
| EP | 2045648 B1 | 4/2009 |
| JP | H0772422 A | 3/1995 |
| JP | H07168126 A | 7/1995 |
| JP | 3623265 B2 | 6/1996 |
| JP | H08166556 A | 6/1996 |
| JP | H08179259 A | 7/1996 |
| JP | H1010444 A | 1/1998 |
| JP | H10170860 A | 6/1998 |
| JP | H11237848 A | 8/1999 |
| JP | 2000003611 A | 1/2000 |
| JP | 2002162601 A | 6/2002 |
| JP | 2002318357 A | 10/2002 |
| JP | 2003005129 A | 1/2003 |
| JP | 2003075744 A | 3/2003 |
| JP | 2005078000 | 3/2005 |
| JP | 2006035416 A | 2/2006 |
| JP | 2007017536 A | 1/2007 |
| JP | 2007072049 A | 3/2007 |
| JP | 2014503836 A | 2/2014 |
| JP | 2014130305 A | 7/2014 |
| JP | 2017003766 A | 1/2017 |
| JP | 2017525115 A | 8/2017 |
| JP | 2017173486 A | 9/2017 |
| JP | 2017528741 A | 9/2017 |
| KR | 20080094318 A | 10/2008 |
| KR | 20090034477 A | 4/2009 |
| KR | 20110123280 A | 11/2011 |
| KR | 20160058955 A | 5/2016 |
| KR | 20160129080 A | 11/2016 |
| KR | 20170046127 A | 4/2017 |
| WO | 1993021548 A1 | 10/1993 |
| WO | 0144858 A2 | 6/2001 |
| WO | WO2004105403 A1 | 12/2004 |
| WO | 2005086766 A2 | 9/2005 |
| WO | 2005094483 A2 | 10/2005 |
| WO | 2011149641 | 12/2011 |
| WO | 2012062681 A1 | 5/2012 |
| WO | 2013163468 A1 | 10/2013 |
| WO | 2014033484 | 3/2014 |
| WO | 2014063716 A1 | 5/2014 |
| WO | 2016004998 A1 | 1/2016 |
| WO | 2015077718 A9 | 6/2016 |
| WO | 2017005614 A1 | 1/2017 |
| WO | 2017062289 A1 | 4/2017 |
| WO | 2018014048 A2 | 1/2018 |
| WO | 2019089283 A1 | 5/2019 |

OTHER PUBLICATIONS

"Meet Holoflex, World's First Holographic Flexible Smartphone". Gadgets Now, Web Article available at: http://www.gadgetsnow.com/mobiles/Meet-HoloFlex-worlds-first-holographic-flexible-smartphone/articleshow/52185503.cms, May 9, 2016, 2 pages.

Akeley, Kurt, et al. "A Stereo Display Prototype with Multiple Focal Distances". ACM transactions on graphics (TOG), 23(3), (2004) pp. 804-813.

Andrew Dalton, "The HoloFlex is a flexible, glasses-free 3D display", Gadgetry, May 5, 2016.

Balogh, Tibor., et al., "The Holovizio System—New Opportunity Offered by 3D Displays". Proceedings of the TMCE, Apr. 2008, pp. 1-11.

Bimber, Oliver, et al., "The Visual Computing of Projector-Camera Systems". Eurographics, Star—State of The Art Report, (2007), 25 pages.

Burvall, Anna, et al., "Telephoto Axicon". Proceedings of SPIE, vol. 5962, Optical Design and Engineering II, (2005), 8 pages.

Erdenebat, Munkh-Uchral, et al., "Integral-Floating Display With 360 Degree Horizontal Viewing Angle". Journal of the Optical Society of Korea, vol. 16, Issue 4, Dec. 2012, pp. 365-371.

Fattal, David, et al., "A Multi-Directional Backlight for A Wide-Angle, Glasses-Free Three-Dimensional Display". Nature, vol. 495, Mar. 21, 2013, pp. 348-351.

Flores, Angel, et. al., "Achromatic Hybrid Refractive-Diffractive Lens with Extended Depth of Focus". Applied Optics vol. 43, Issue 30, (2004), pp. 5618-5630.

Geng, Jason, "Design of a Single Projector Multiview 3D Display System". Emerging Digital Micromirror Device Based Systems and Applications VI, vol. 8979, 89790K, Mar. 7, 2014, 15 pages.

Hirsch Matthew, et al., "A Compressive Light Field Projection System". ACM Transactions on Graphics 33(4), (2014), pp. 1-12.

Hoffman, David, M., et al., "Vergence-Accommodation Conflicts Hinder Visual Performance and Cause Visual Fatigue". Journal of Vision, vol. 8, No. 33., (2008), pp. 1-30.

International Preliminary Report on Patentability for PCT/US2018/028949 issued on Oct. 29, 2019, 7 pages.

International Preliminary Report on Patentability for PCT/US2018/047313 issued on Feb. 25, 2020, 7 pages.

International Search Report and Written Opinion of the International Searching Authority for PCT/US2018/028949 mailed Jul. 4, 2018.

International Search Report and Written Opinion of the International Searching Authority for PCT/US2018/047313 mailed Nov. 29, 2018.

International Search Report and Written Opinion of the International Searching Authority for PCT/US2018/057147 mailed Feb. 1, 2019, 12 pages.

International Search Report and Written Opinion of the International Searching Authority for PCT/US2019/018018 mailed Apr. 26, 2019, 11 pages.

Jones, Andrew, et. al., "An Interactive 360° Light Field Display", USC Centers for Creative Technology, (2007), 4 pages.

Jones, Andrew, et al., "Rendering for An Interactive 360° Light Field Display". In SIGGRAPH papers, Article No. 40, (2007), 10 pages.

Katal, Goldy et al., "Digital Light Processing and its Future Applications". International Journal of Scientific and Research Publications, vol. 3 Issue 4, Apr. 2013, pp. 1-8.

Lee, Vincent W., et al. "Micro-LED Technologies and Applications". Information Display Jun. 2016, (2016), pp. 16-23.

Lim, Yongjun, et al., "360-Degree Tabletop Electronic Holographic Display". Optics Express, vol. 24, Issue 22, Oct. 31, 2016, pp. 24999-25009.

Love, Gordon D., et al., "High-Speed Switchable Lens Enables the Development of a Volumetric Stereoscopic Display". Optics Express, vol. 17, No. 18, Aug. 31, 2009, pp. 15716-15725.

Maimone, Andrew, et al., "Focus 3D: Compressive Accommodation Display". ACM Trans. Graph. 32.5 (2013), pp. 153: 1-153: 13.

Reichelt, Stephan, et al., "Holographic 3-D Displays—Electro-Holography Within the Grasp of Commercialization". Advances in Lasers and Electro Optics, book edited by Nelson Costa and Adolfo Cartaxo, Apr. 2010, pp. 683-710.

(56) References Cited

OTHER PUBLICATIONS

Smalley, D. E., et al., "Anisotropic Leaky-Mode Modulator for Holographic Video Displays". Macmillan Publishers Limited, Nature, vol. 498, Jun. 20, 2013, pp. 313-317.
Sullivan, Alan, "A solid-state multi-planar volumetric display". SID Symposium Digest of Technical Papers vol. 34, Issue 1, (2003), pp. 1531-1533.
Toussaint, Kimani C., et al., "Generation of Optical Vector Beams with A Diffractive Optical Element Interferometer". Optics Letters vol. 30, Issue 21, Nov. 1, 2005, pp. 2846-2848.
Urey, Hakan, "Diffractive Exit-Pupil Expander for Display Applications". Applied Optics, vol. 40, No. 32, Nov. 10, 2001, pp. 5840-5851.
Waldis, Severin, et al., "Uniform Tilt-Angle Micromirror Array for Multi Object Spectroscopy". Proceedings of SPIE, MOEMS and Miniaturized Systems VI, vol. 6466, p. 646603, (2007), 12 pages.
Wallace, John, "Highly Flexible OLED Light Source Has 10 Micron Bend Radius". Laser Focus World, Web Article available at: http://www.laserfocusworld.com/articles/2013/07/highly-flexible-oled-light-source-has-10-micron-bend-radius.html, Jul. 31, 2013, 2 pages.
Weitao, Song et al., "Design of Light Field Head-Mounted Display", Visual Communications and Image Processing, vol. 9293, Dec. 17, 2014, pp. 92930J-92930J.
Wetzstein, Gordon, et al., "Layered 3D: Tomographic Image Synthesis for Attenuation-Based Light Field and High Dynamic Range Displays". ACM Transactions on Graphics, vol. 30, No. 4, Article 95, Jul. 2011, pp. 1-11.
Wikipedia, "Volumetric Display". Wikipedia web article, updated on Jul. 17, 2017, available at: https://en.wikipedia.org/w/index.php?title=Volumetric_display&oldid=790957389.
Xia, Xinxing, et al., "A 360-degree floating 3D display based on light field regeneration", Optical Society of America, vol. 21, No. 9, May 2013, 11 pages.
Braga-Mele, Rosa, et. al., "Multifocal Intraocular Lenses: Relative Indications and Contraindications for Implantation". Journal of Cataract & Refractive Surgery, vol. 40, No. 2, (2014), pp. 313-322.
Findl, Oliver, "Intraocular Lens Materials and Design". Chapter 12 in Achieving Excellence in Cataract Surgery, A Step-by-Step Approach (edited by Michael Colvard, MD, FACS), (2009), pp. 95-108.
Huang, Fu-Chung, "The Light Field Stereoscope: Immersive Computer Graphics via Factored Near-Eye Light Field Displays with Focus Cues". ACM SIGGRAPH, Transactions on Graphics, vol. 33, No. 5, (2015).
Jesacher, Alexander, et., al., "Multi-Focal Light Microscopy Using Liquid Crystal Spatiallight Modulators". IEEE International Symposium on Optomechatronic Technologies, (2012), pp. 1-2.
Jia, Kemiao, et al., "High-Fill-Factor Micromirror Array with Hidden Bimorph Actuators and Tip-Tilt-Piston Capability". Journal of Microelectromechanical Systems, vol. 20, Issue 3, (2011), pp. 573-582.
Kololuoma, Terho K., et al., "Fabrication and Characterization of Hybrid-Glass-Based Axicons" Optical Engineering, vol. 41, No. 12, (2002), pp. 3136-3141.
Marrella, Alessandro et al., "Privacy-Preserving Outsourcing of Pattern Mining of Event-Log Data—An Use-Case from Process Industry". IEEE International Conference on Cloud Computing Technology and Science (CloudCom), (2016), pp. 545-551.
Takaki, Yasuhiro, et. al. "High-Density Directional Display for Generating Natural Three-Dimensional Images". Proceedings of the IEEE, vol. 94, No. 3, Mar. 2006, pp. 654-663.
Templier, François, et al. "A Novel Process for Fabricating High-Resolution and Very Small Pixel-pitch GaN LED Microdisplays". SID Symposium Digest of Technical Papers, vol. 48, No. 1, (2017), pp. 268-271.

Traub, Alan C., "Stereoscopic Display Using Rapid Varifocal Mirror Oscillations". Applied Optics vol. 6, Issue 6, Jun. 1967, pp. 1085-1087.
Wu, L., et al., "A Large-Aperture, Piston-Tip-Tilt Micromirror For Optical Phase Array Applications". IEEE 21st International Conference on Micro Electro Mechanical Systems, (2008), pp. 754-757.
Yan, Jun, et. al., "Autostereoscopic Three-Dimensional Display Based on A Micromirror Array". Applied Optics, vol. 43, Issue 18, (2004), pp. 3686-3696.
Zhang, Yan, et al., "Multi-View Autostereoscopic 3D Display". International Conference on Optics, Photonics and Energy Engineering (Opee), IEEE, vol. 1, (2010) pp. 58-61.
International Preliminary Report on Patentability for PCT/US2018/057147 issued May 5, 2020, 8 pages.
International Preliminary Report on Patentability for PCT/US2019/018018 issued on Aug. 27, 2020, 8 pages.
Lee, Vincent W., et al., "Micro-LED Technologies and Applications". Information Display, vol. 32, No. 6, (2016), pp. 16-23.
Wetzstein, Gordon, et. al. "Tensor Displays: Compressive Light Field Synthesis using Multilayer Displays with Directional Backlighting". ACM Transactions on Graphics, vol. 31, No. 4, Article 80, Jul. 2012, pp. 1-11.
Batbayar, Densmaa, et al. "Point Light Source Display With A Large Viewing Angle Using Multiple Illumination Sources". Optical Engineering, vol. 56, No. 5, Article 053113, May 2017, pp. 1-5.
International Search Report and Written Opinion of the International Searching Authority for PCT/US2019/047761 mailed Nov. 15, 2019, 13 pages.
Geng, Jason, "Three-Dimensional Display Technologies". Advances in Optics and Photonics, vol. 5, No. 4, Nov. 22, 2013, p. 497.
Kim, N. et al. "Advances in the light field displays based on integral imaging and holographic techniques." Chinese Optics Letters 12, No. 6: 060005. Jun. 10, 2014. (5 pages).
Jianshe, M. et al. "Holographic Display System of Digital Micro-Mirror Devices Based on LED Light Source." Acta Optica Sinica vol. 36, No. 7: 0709001 Jul. 2016 (7 pages).
Feather, G., et al., "The digital micromirror device for projection display." In Proceedings IEEE International Conference on Wafer Scale Integration, International Conference on Water Scale Integration (Icwsi), IEEE, 1995, pp. 43-51 (9 pages).
Dudley, D. et al., "Emerging digital micromirror device (DMD) applications." In MOEMS display and imaging systems, International Society for Optics and Photonics, 2003, vol. 4985, pp. 14-25 (12 pages).
Hornbeck, L. J. "Current status of the digital micromirror device (DMD) for projection television applications." In Proceedings of IEEE International Electron Devices Meeting, . IEEE, 1993, pp. 381-384 (4 pages).
Jasper Display Corporation, "2014 NAB JDC Announced 4K2K LCoS with Associated Controller for Future Home Solutions". Jasper Display Corporation Press Release, Apr. 3, 2014, 3 pages.
Texas Instruments, "DLP7000 DLP 0.7 XGA 2x LVDS Type A DMD". DLP7000 product description, DLPS026E, May 2017, 51 pages.
Wacyk, Ihor, et. al., "Ultra-High Resolution and High-Brightness AMOLED". Proceedings of SPIE vol. 8383, (2012), pp. 1-14.
Business Wire, "Kopin Debuts Lightning OLED Microdisplay With 2k × 2k Resolution for Mobile VR at 2017 CES". Business Wire Press Release, available at: https://www.businesswire.com/news/home/20170104005430/en/, Jan. 4, 2017, 6 pages.
International Preliminary Report on Patentability for PCT/US2019/047761 issued on Mar. 2, 2021, 9 pages.

\* cited by examiner

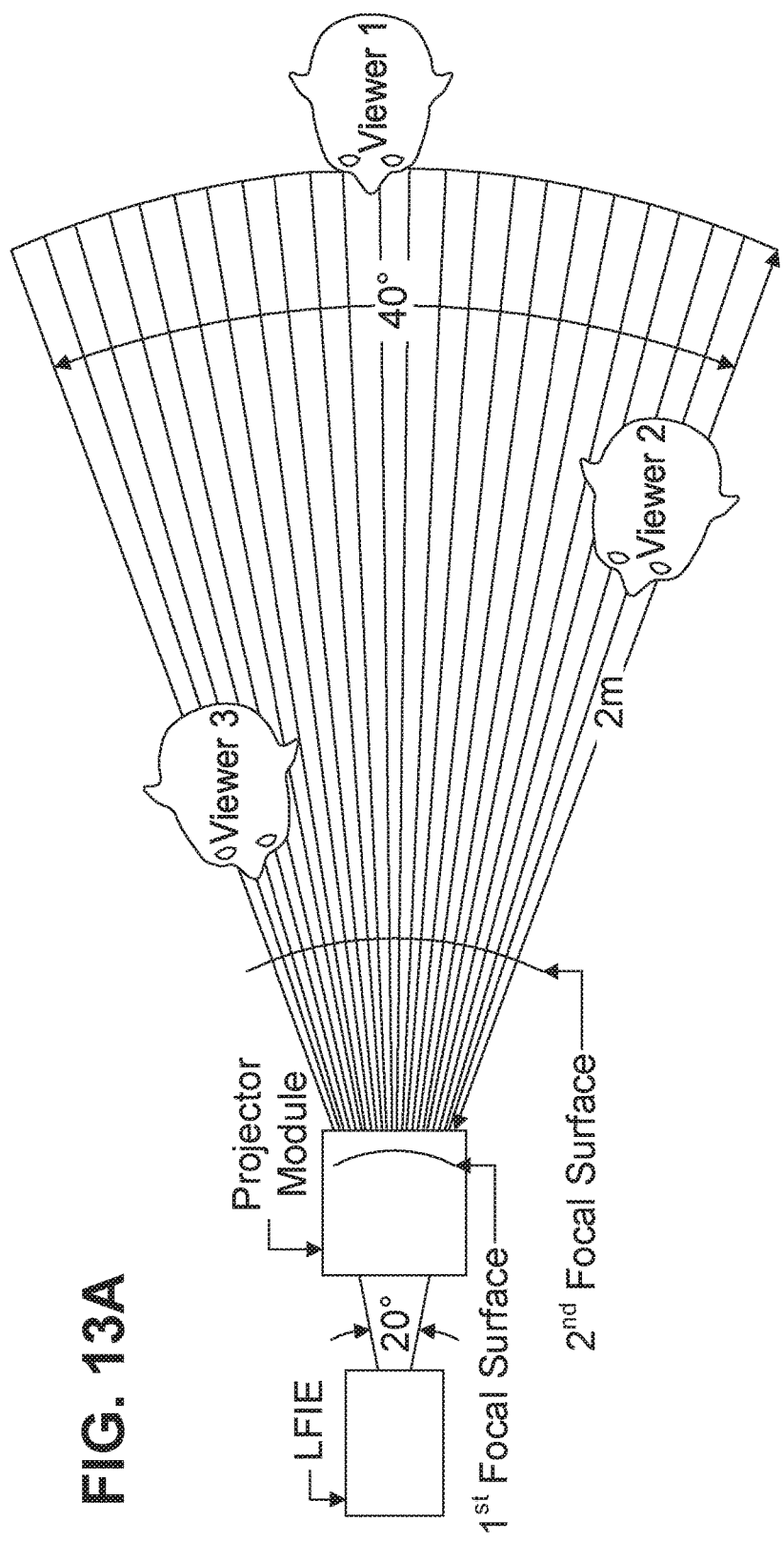
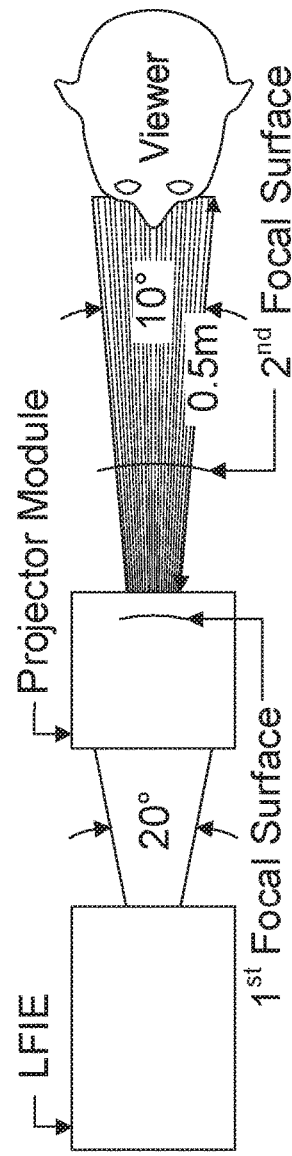
FIG. 13A
FIG. 13B

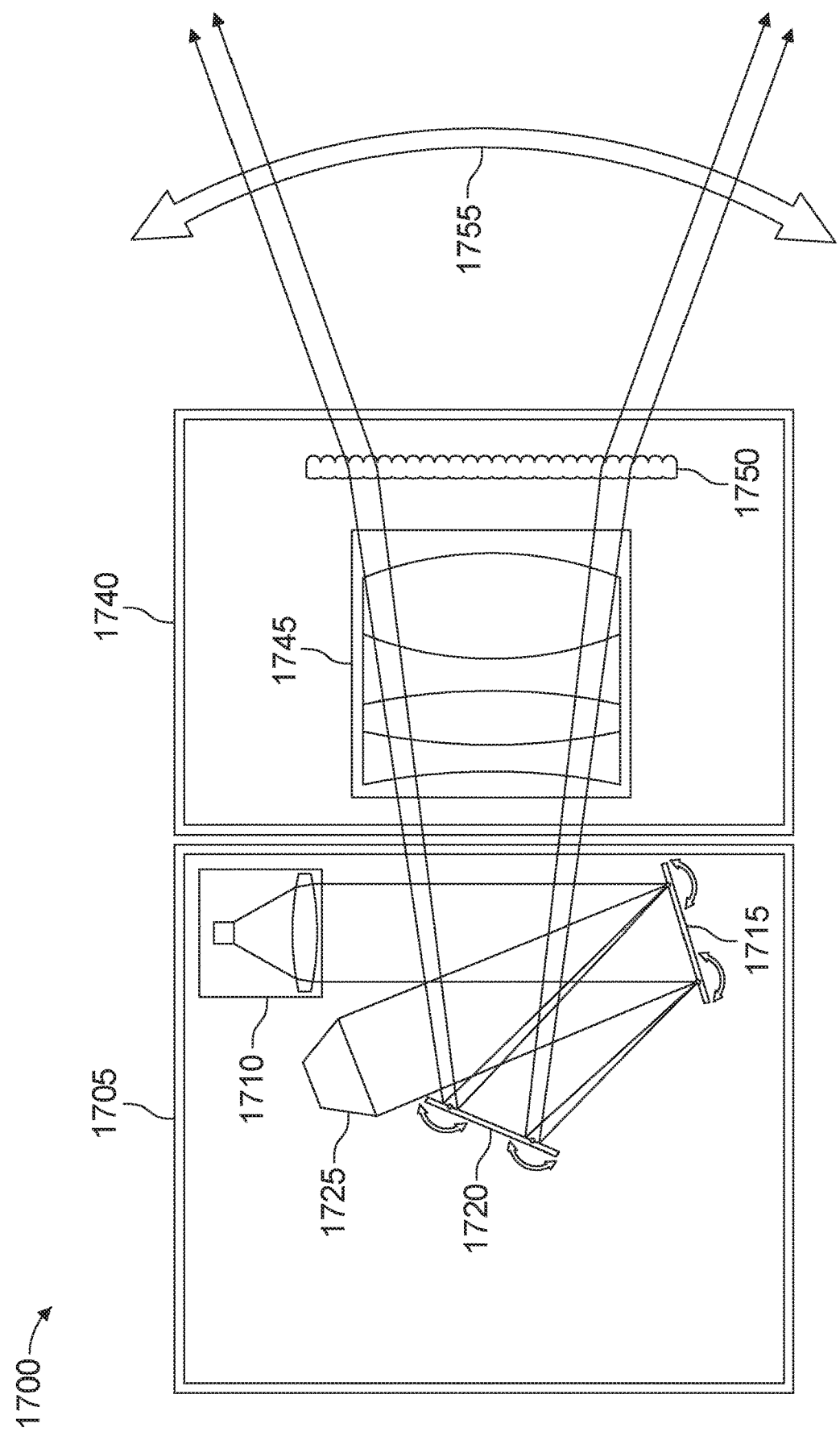

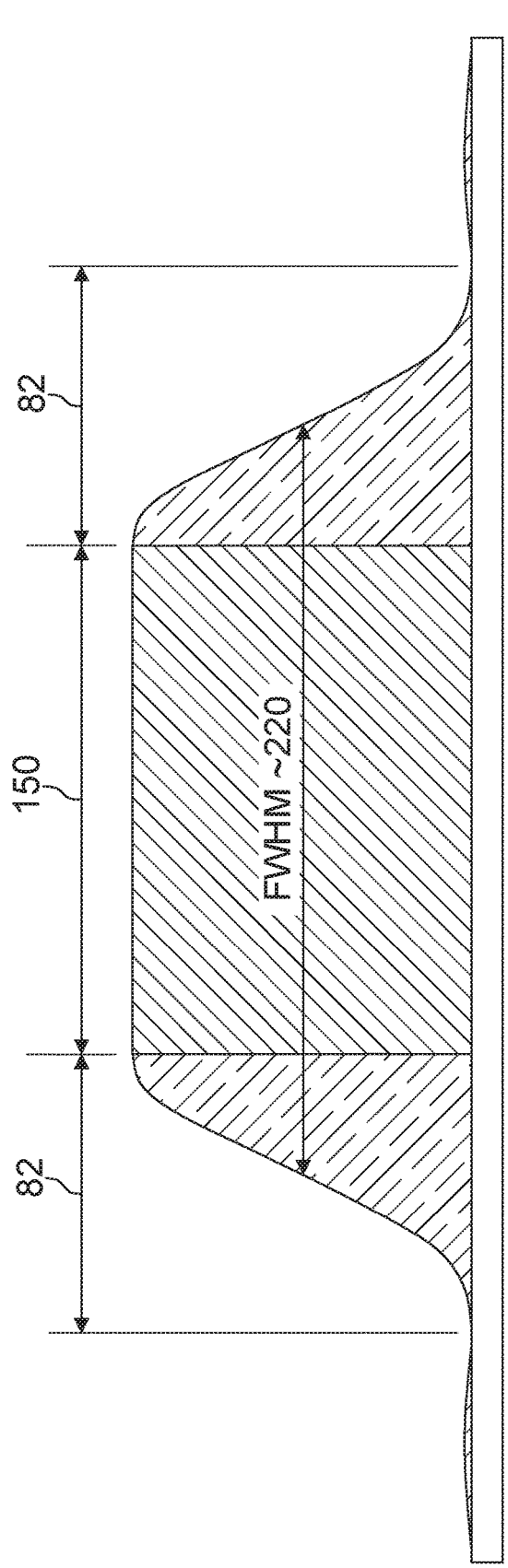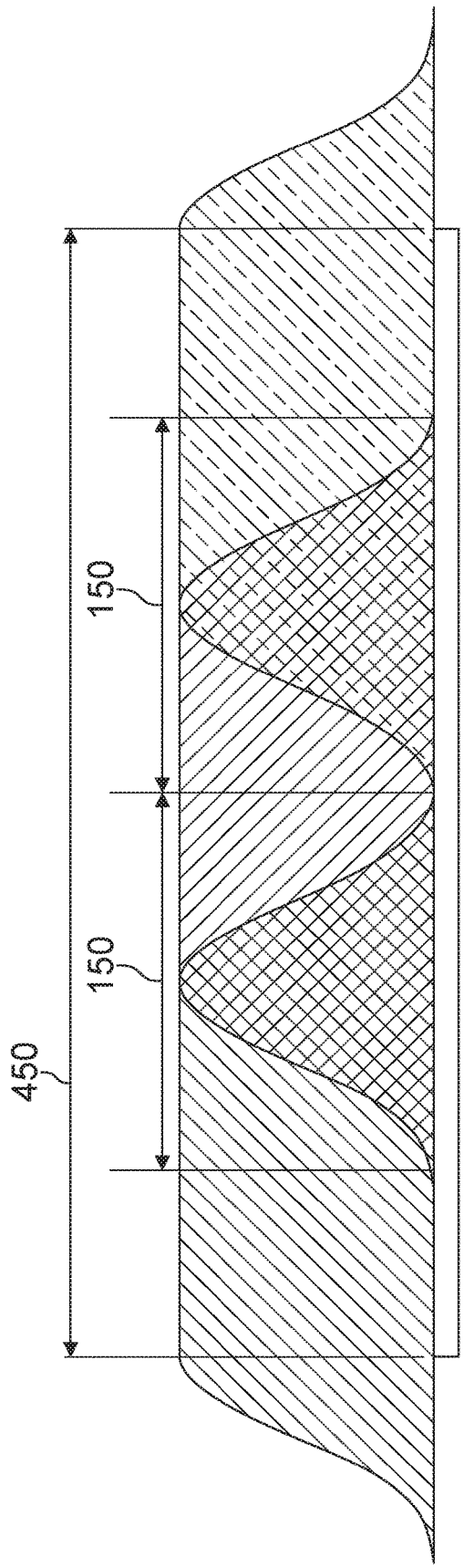

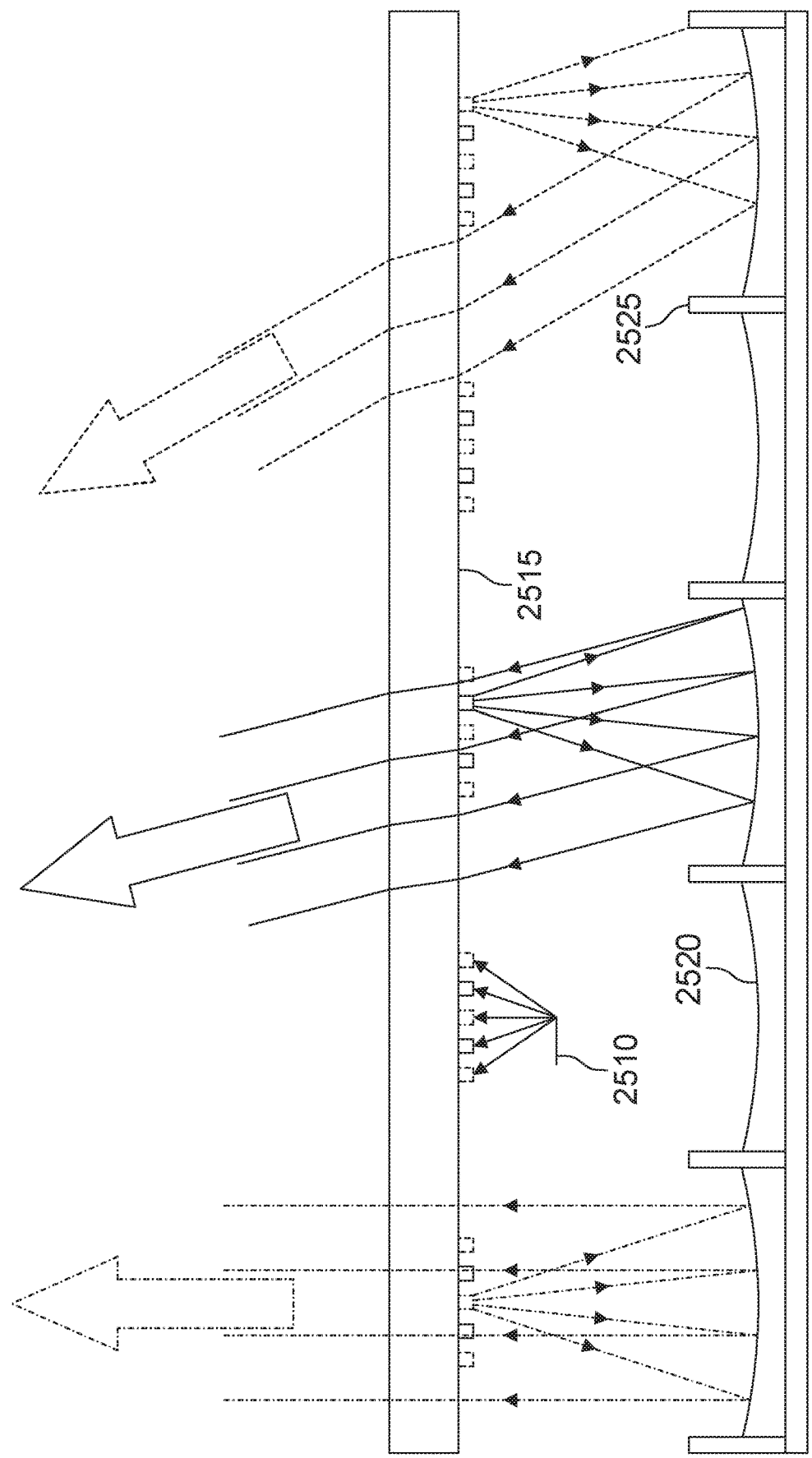

LIGHT FIELD IMAGE ENGINE METHOD AND APPARATUS FOR GENERATING PROJECTED 3D LIGHT FIELDS

CROSS-REFERENCE TO RELATED APPLICATIONS

The present application is a national stage application under 35 U.S.C. § 371 of International Application No. PCT/US2018/047313, entitled "LIGHT FIELD IMAGE ENGINE METHOD AND APPARATUS FOR GENERATING PROJECTED 3D LIGHT FIELDS," filed on Aug. 21, 2018, which claims benefit under 35 U.S.C. § 119 (e) from U.S. Provisional Patent Application Ser. No. 62/549,386, filed Aug. 23, 2017, entitled "LIGHT FIELD IMAGE ENGINE METHOD AND APPARATUS FOR GENERATING PROJECTED 3D LIGHT FIELDS", U.S. Provisional Patent Application Ser. No. 62/553,615, filed Sep. 1, 2017, entitled "SYSTEMS AND METHODS FOR GENERATING PROJECTED 3D LIGHT FIELDS USING A DOUBLE-DMD LIGHT FIELD IMAGE ENGINE", and U.S. Provisional Patent Application Ser. No. 62/617,539, filed Jan. 15, 2018, entitled "3D DISPLAY DIRECTIONAL BACKLIGHT BASED ON MICROMIRRORS", each of which is incorporated herein by reference in its entirety.

BACKGROUND

Some current types of 3D displays are able to provide correct focus cues for natural 3D image perception. The human mind perceives and determines depths of observed objects in part by receiving signals from muscles used to orient each eye. The brain associates the relative angular orientations of the eyes with the determined depth of focus. Correct focus cues give rise to a natural blur on objects outside of an observed focal plane and a natural dynamic parallax effect.

One type of 3D display capable of providing correct focus cues uses volumetric display techniques that can produce 3D images in true 3D space. Each "voxel" of a 3D image is located physically at the spatial position where it is supposed to be and reflects or emits light from that position toward the observers to form a real image in the eyes of viewers. The main problems with 3D volumetric displays are their low resolution, large physical size and expensive manufacturing costs. These issues make them too cumbersome to use outside of special cases, e.g., product displays, museums, shows, etc.

Another type of 3D display device capable of providing correct retinal focus cues is the holographic display. Holographic displays aim to reconstruct whole light wavefronts scattered from objects in natural settings. The main problem with this technology is a lack of suitable Spatial Light Modulator (SLM) component that could be used in the creation of the extremely detailed wavefronts.

Another type of 3D display technology capable of providing natural retinal focus cues is called the Light Field (LF) display. LF display systems are designed to create so-called light fields that represent light rays travelling in space to all directions. LF systems aim to control light emissions both in spatial and angular domains, unlike the conventional stereoscopic 3D displays that can basically only control the spatial domain with higher pixel densities. There are different ways to create light fields.

In a first approach, parallax is created across each individual eye of the viewer, producing the correct retinal blur corresponding to the 3D location of the object being viewed. This can be done by presenting multiple views per single eye.

The second approach is a multi-focal-plane approach, in which an object's image is projected to an appropriate focal plane corresponding to its 3D location. Many light field displays use one of these two approaches. The first approach is usually more suitable for a head mounted single-user device as the locations of eye pupils are much easier to determine and the eyes are closer to the display, making it possible to generate the desired dense field of light rays. The second approach is better suited for displays that are located at a distance from the viewer(s) and could be used without headgear.

In current relatively low density multi-view imaging displays, the views change in a coarse stepwise fashion as the viewer moves in front of the device. This lowers the quality of 3D experience and can even cause a complete breakdown of 3D perception. In order to mitigate this problem (together with vergence-accommodation conflict), some Super Multi View (SMV) techniques have been tested with as many as 512 views. The idea is to generate an extremely large number of views so as to make any transition between two viewpoints very smooth. If the light from at least two images from slightly different viewpoints enters the eye pupil simultaneously, a much more realistic visual experience follows. In this case, motion parallax effects resemble the natural conditions better as the brain unconsciously predicts the image change due to motion.

The SMV condition can be met by reducing the interval between two views at the correct viewing distance to a smaller value than the size of the eye pupil. At normal illumination conditions, the human pupil is generally estimated to be about 4 mm in diameter. If ambient light levels are high (e.g., in sunlight), the diameter can be as small as 1.5 mm and in dark conditions as large as 8 mm. The maximum angular density that can be achieved with SMV displays is limited by diffraction, and there is an inverse relationship between spatial resolution (pixel size) and angular resolution. Diffraction increases the angular spread of a light beam passing through an aperture, and this effect may be taken into account in the design of very high density SMV displays.

Different existing 3D displays can be classified on the basis of their form-factors into various different categories.

Head-mounted devices (HMD) occupy less space than goggle-free solutions, which also means that they can be made with smaller components and less materials making them relatively low cost. However, as head mounted VR goggles and smart glasses are single user devices, they do not allow shared experiences as naturally as goggle-free solutions.

Volumetric 3D displays take space from all three spatial directions and require a lot of physical material making these systems heavy, expensive to manufacture and difficult to transport. Due to the heavy use of materials, the volumetric displays also tend to have small "windows" and limited field-of view (FOV).

Projection-based 3D displays typically have one large but flat component, which is the screen, and a system that projects the image(s) over free space from a distance. These systems can be made more compact for transportation and they also cover much larger FOVs than e.g. volumetric displays. These systems tend to be complex and expensive as they require projector sub-assemblies and e.g., accurate alignment between the different parts, making them best for professional use cases.

Flat form-factor 3D displays may require a lot of space in the two spatial directions, but as the 3rd direction is only virtual, they are fairly easy to transport and assemble to different environments. As the devices are flat, at least some optical components used in them are more likely to be manufactured in sheet or roll format making them relatively low cost in large volumes.

Some of these issues may be further exacerbated in applications for mobile devices.

SUMMARY

Systems and methods are described for providing a three-dimensional display. In an example, a display device includes a light engine, a spatial light modulator, one or more directable mirrors, and a projection lens. Light from the light engine is modulated by the spatial light modulator, reflected by the directable mirror(s) toward the projection lens, and projected by the projection lens (e.g. onto a screen). The directable mirror(s) may include a rotatable mirror or a digital micromirror device. The spatial light modulator may be a digital micromirror device. The spatial light modulator and the directable mirror(s) are synchronized so as to generate different modulated light patterns for different positions of the directable mirror(s). The projection of different modulated light patterns in different directions may generate different views that are visible from different user perspectives.

In one example, a display device includes a light engine, a projection lens, and a spatial light modulator along an optical path from the light engine to the projection lens. In some embodiments, the spatial light modulator is a digital micromirror device. At least one directable mirror is provided along the optical path between the spatial light modulator and the projection lens. The display device may include a screen, where the projection lens is configured to project the modulated light on the screen. The screen may include a lenticular sheet layer and a light-diffusing layer.

In some embodiments, the directable mirror(s) includes a rotatable mirror. A motor may be provided to rotate the rotatable mirror. Control electronics may be provided to synchronize the motor with the spatial light modulator.

In some embodiments, the directable mirror(s) include a digital micromirror device having a plurality of individually-directable micromirrors. In such embodiments, an imaging lens may be provided between the spatial light modulator and the digital micromirror device. Where the spatial light modulator comprises a plurality of pixels, the imaging lens may be configured to image each pixel onto a respective micromirror. More than one pixel may be imaged onto each micromirror.

In a method according to some embodiments, light is directed from a light source to a spatial light modulator. While at least one directable mirror is in a first position, the light is modulated with the spatial light modulator to generate a first modulated light pattern, and the first modulated light pattern is reflected from the directable mirror(s) toward a projection lens. While the directable mirror(s) is in a second position, the light is modulated with the spatial light modulator to generate a second modulated light pattern, and the second modulated light pattern is reflected from the directable mirror(s) toward the projection lens. The first and second modulated light patterns are projected from the projection lens, e.g. onto a screen. The directable mirror(s) may be cycled through a plurality of positions including the first position and the second position. Such cycling in some embodiments is performed at a rate of 60 Hz or more.

In some embodiments, the directable mirror(s) includes a rotatable mirror that is repeatedly rotated through a plurality of positions including the first and second positions.

In some embodiments, the directable mirror(s) includes a digital micromirror device having a plurality of individually-directable micromirrors. In such embodiments, the micromirrors may be tilted through a plurality of positions including the first and second positions.

In some embodiments, the spatial light modulator includes a plurality of pixels. Each pixel may be imaged onto a respective micromirror with an imaging lens. More than one pixel may be imaged onto each micromirror.

BRIEF DESCRIPTION OF THE DRAWINGS

A more detailed understanding may be had from the following description, presented by way of example in conjunction with the accompanying drawings in which like reference numerals in the figures indicate like elements, and wherein:

FIG. 13A illustrates an LF projection system for multiple users based on a LFIE, in accordance with some embodiments.

FIG. 13B illustrates an LF projection system for a single user based on a LFIE, in accordance with some embodiments.

FIG. 17 depicts a schematic presentation of an example structure of a Light Field projector device having a DDMD-LFIE, in accordance with an embodiment.

FIGS. 24A-24B illustrate diffraction caused when an image is projected onto the projection screen of FIG. 22, in accordance with an embodiment.

FIG. 25 is a schematic illustration of a structure in which light-collimating static mirrors are used together with an array of μLEDs for the generation of multiple images to different directions.

FIG. 31A is a close-up view of two light sources and micromirrors, and FIG. 31B is a general view of the geometry with two simulated beams.

EXAMPLE NETWORKS FOR IMPLEMENTATION OF THE EMBODIMENTS

Figure 1A:
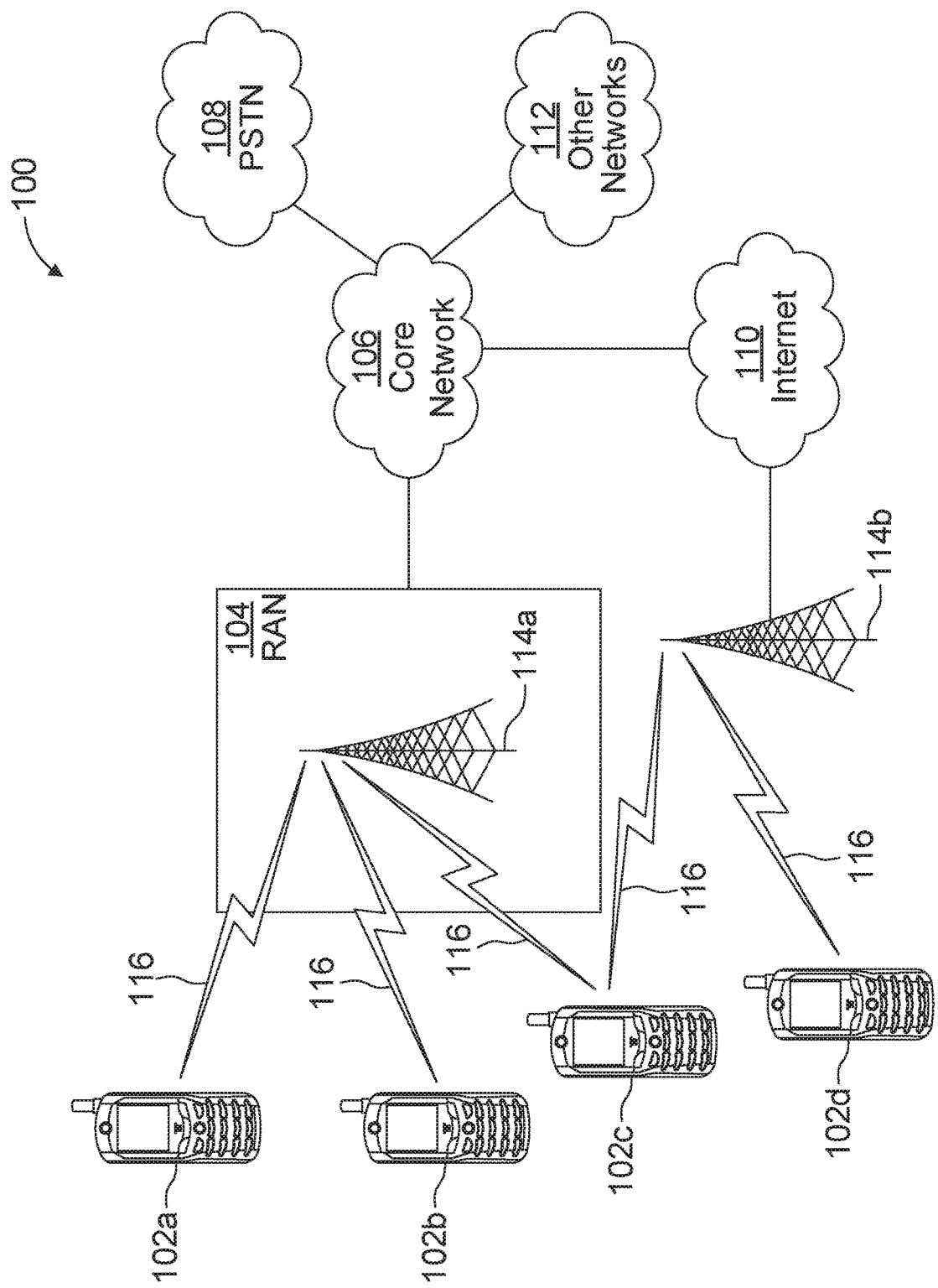
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104/113 may be in communication with the CN 106, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106 may be in direct or indirect communication with other RANs that employ the same RAT as the RAN 104/113 or a different RAT. For example, in addition to being connected to the RAN 104/113, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
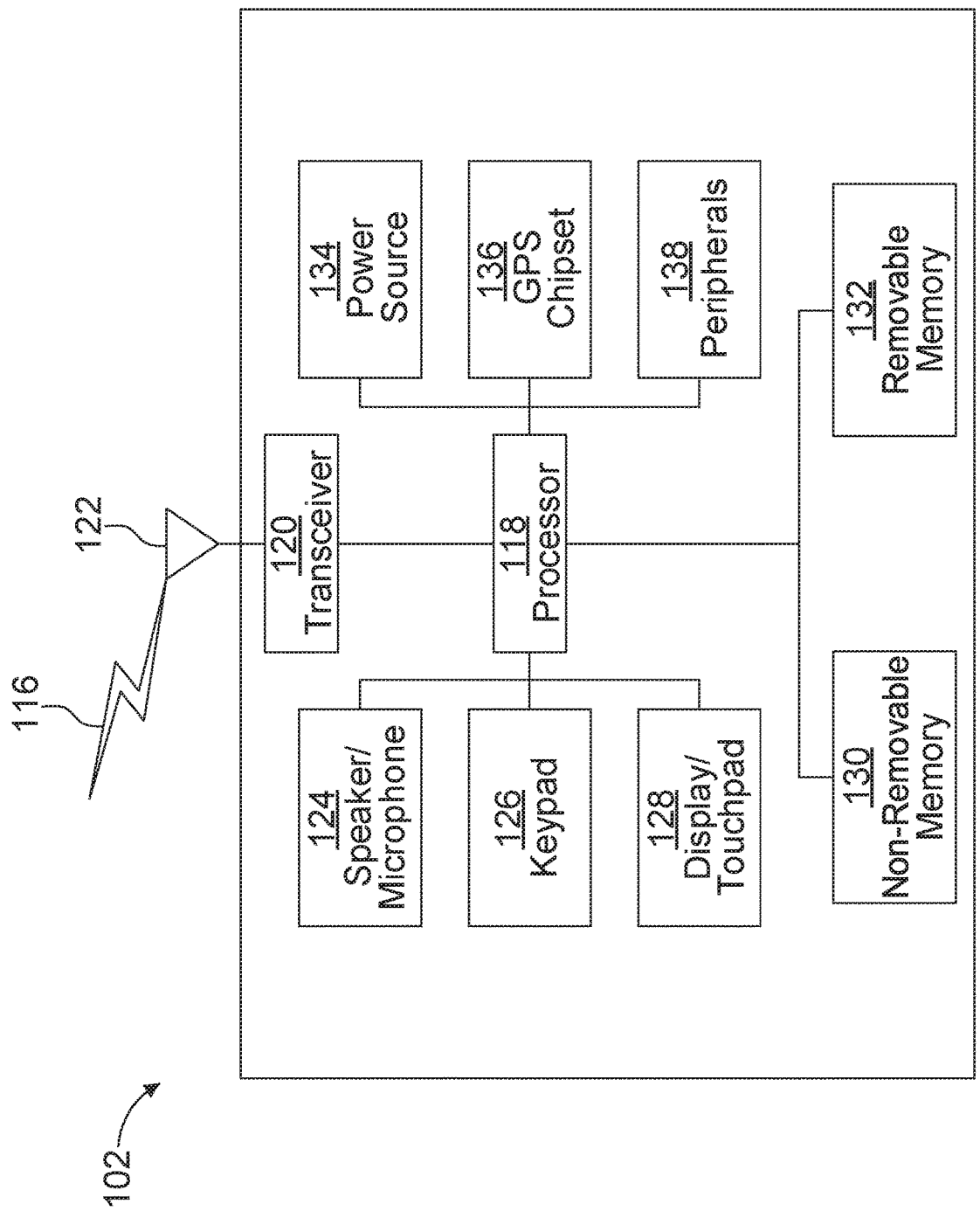
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

DETAILED DESCRIPTION

A detailed description of illustrative embodiments will now be provided with reference to the various Figures. Although this description provides detailed examples of possible implementations, it should be noted that the provided details are intended to be by way of example and in no way limit the scope of the application.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

Moreover, any of the variations and permutations described in the ensuing paragraphs and anywhere else in this disclosure can be implemented with respect to any embodiments, including with respect to any method embodiments and with respect to any system embodiments.

Current stereoscopic displays, commonly used in home theatres and cinemas, employ suboptimal technology for making 3D images. There is a neural connection in the human brain between light sensitive cells on the eye retinas and the cells sensing eye muscle movement. The associated areas work together when the perception of depth is created. Autostereoscopic 3D displays lack the correct retinal focus cues due to the fact that the image information is limited to the plane of the display. When the eyes focus to a different point than where they converge, physiological signals in the brain get mixed up. Depth cue mismatch of convergence and accommodation leads to, e.g., eye strain, fatigue, nausea and slower eye accommodation to object distance. This phenomenon is called vergence-accommodation conflict (VAC) and it a result of non-proportional depth squeezing in artificial 3D images.

Figure 2A:
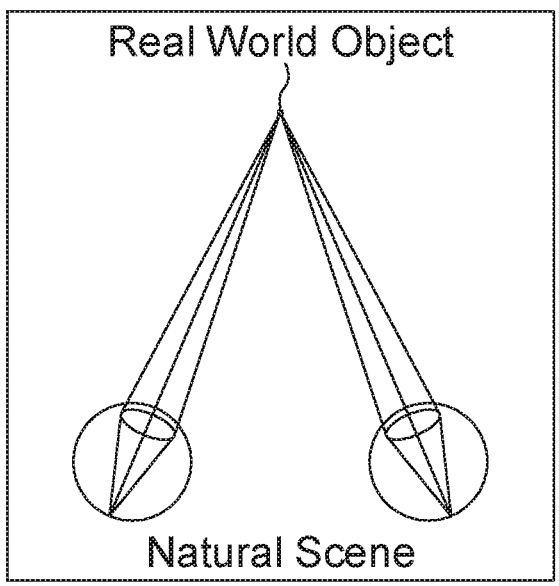
FIGS. 2A-2D illustrates various focal distances and eye convergence angles when looking at a real world objects (FIGS. 2A-2B) and at an autostereoscopic 3D display (FIGS. 2C-2D).
Figure 2B:
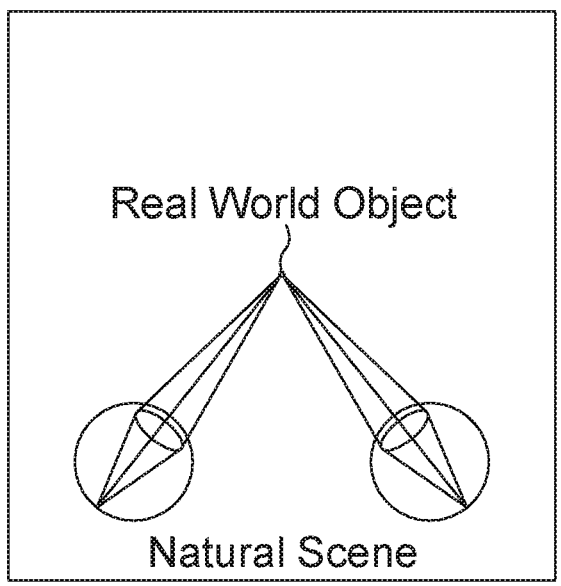
Figure 2C:
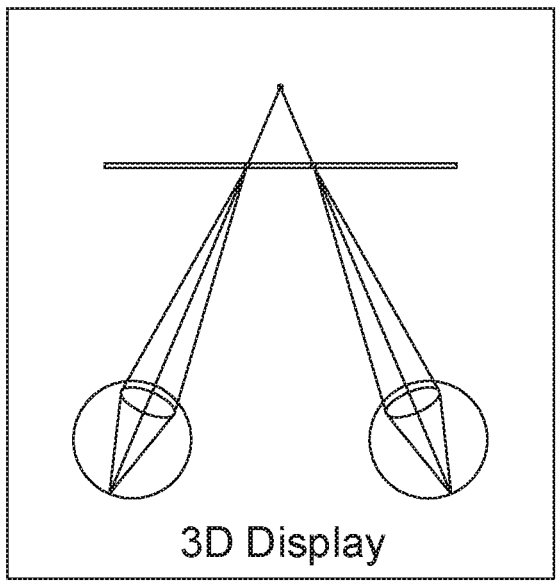
Figure 2D:
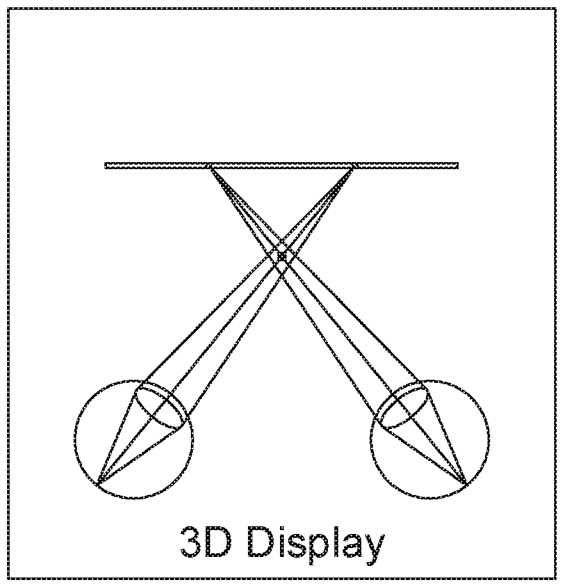

FIGS. 2A and 2B depict focal distances and eye convergence angles when looking at a real-world object, and FIGS. 2C and 2D depict focal distances and eye convergence angles when looking at an autostereoscopic 3D display. Some parts of what a person sees in the real world may be blurred, whereas in the case of the display all parts are in focus.

Figure 3A:
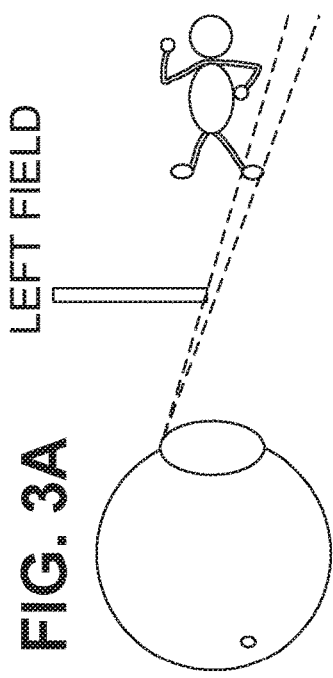
FIGS. 3A-3C depict various levels of occlusions of light fields directed towards a pupil.
Figure 3B:
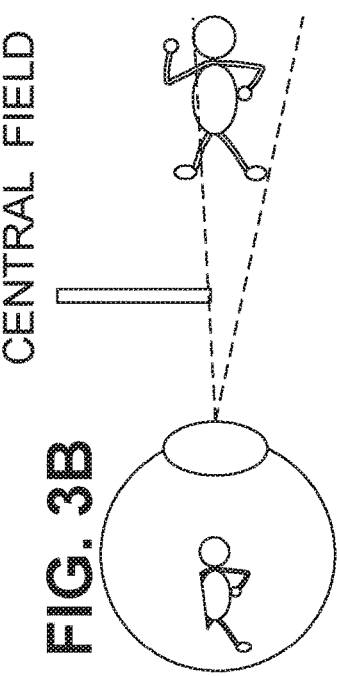
Figure 3C:
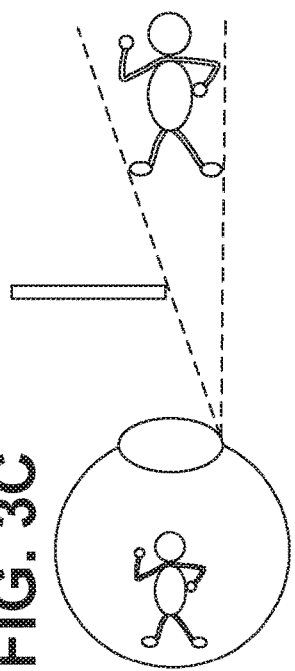

FIGS. 3A-3C depict various levels of occlusions of light fields directed towards a pupil. LF systems aim to control light emissions both in spatial and angular domains, unlike the conventional stereoscopic 3D displays that can only control the spatial domain. There are different ways to create light fields.

In a first approach, parallax is created across each eye of the viewer producing correct retinal blur corresponding to a 3D location of the object being viewed. In one embodiment, this is done by presenting multiple views per single eye. FIGS. 3A-3C show occlusions caused by parallax across the pupil. The resulting varied images represent various views that could be presented to produce correct retinal blur. If the light from at least two images from slightly different viewpoints enters the eye pupil simultaneously, a more realistic visual experience follows. In this case, motion parallax effects better resemble natural conditions as the brain unconsciously predicts the image change due to motion. The SMV condition can be met by reducing the interval between two views at the correct viewing distance to a smaller value than the size of the eye pupil.

The second approach is a multi-focal-plane approach, in which the object's image is projected to a focal plane corresponding to its 3D location.

Example Micromirror Technologies. One Spatial Light Modulator (SLM) component commonly used in current digital projector systems is the Digital Micromirror Device (DMD), which contains an array of very small micromirrors that can be individually addressed and act as pixels in the image generation. When the component is illuminated with a directed light source, some of the mirrors are tilted towards the projection lens, forming an image on a screen, and some towards a light trap that absorbs the extra light. One feature making the DMD component suitable for 3D image projection systems is the very fast frame rate that can be achieved. One example calculation for a possible framerate of a full-color image projected with a system that contained a DMD and RGB LED-based light engine was performed in O. Bimber et al., "*The Visual Computing of Projector-Camera Systems*", EUROGRAPHICS 2007, STAR—State of The Art Report, (2007). Assuming that the mirrors of a DMD could be switched at 15 µs (=67000 binary frames per second), if the intensities of three (RGB) color LEDs are switched between eight different levels (1, 2, 4, 8, 16, 32, 64, 128, 256) at a very high speed, a full color image can theoretically be projected at around 2800 Hz (=67000 binary frames per second/8 (8-bit encoded) intensity levels/3 color channels). One example component is the Texas Instruments DLP7000, with a binary frame rate as high as 32552 Hz. If the previous calculation is made for this component, a framerate of 1360 Hz for full-color image is obtained. One example 3D image projection system based on several DMD components is presented in Y. Lim et al., "360-*degree* tabletop electronic holographic display", *Optics Express* Vol. 24, Issue 22, pp. 24999-25009, (2016).

Many DMD devices are not designed for smooth scanning of light through an angular range but rather are designed as binary (on-off) devices. However, there are also other types of micromirror devices that have been developed especially for this purpose. Such systems are described in, for example, K. Jia et al., "High-Fill-Factor Micromirror Array With Hidden Bimorph Actuators and Tip-Tilt-Piston Capability"; Journal of Microelectromechanical Systems, Vol. 20, Iss. 3, (2011), and in L. Wu et al., *"A large-aperture, piston-tip-tilt micromirror for optical phase array applications"; Micro Electro Mechanical Systems*, 2008. *MEMS* 2008. *IEEE* 21*st International Conference*, (2008). These resources describe micromirror array (MMA) structures than can be used for scanning the angular range of approximately ±30° in two directions. The individually addressable micromirrors mentioned in Jia et al. have a rectangular aperture size of 1.5 mm, and the mirrors in Wu et al. were 0.5 mm wide. Both systems were based on bimorph actuators that change their shape when heated with electric current. Electrothermal bimorph actuators have relatively fast response times, low power consumption and they can be driven with low voltage (<5V). There are also several other types of MEMS (Micro Electro Mechanical Systems) systems that can be used for mirror tilt actuation. One example can be found from S. Waldis, et al. "Uniform tilt-angle micromirror array for multi-object spectroscopy," Proceedings of SPIE, Volume 6466, MOEMS and Miniaturized Systems VI, (2007). In this case, the micromirrors were manufactured by etching from single crystal silicon and the cantilever-type suspension structure was realized by surface micromachining. The resulting mirrors had the size of 100 µm×200 µm as well as 200 µm×500 µm and they could be tilted as much as 20°. Overall, the reported scanning MMA designs can reach frequencies up to a few kHz depending on the mirror size. With smaller mirror apertures, the device resonance frequencies are higher and can be used for very fast angular scanning of light.

Example Light Source Technologies. One display technology that can be used in exemplary embodiments is so-called µLEDs, such as those described in V. W. Lee et al., *"Micro-LED Technologies and Applications"; Information Display* 6/16, (2016). These are LED chips that are manufactured with the same basic techniques and from the same materials as the standard LED chips in use today. However, the µLEDs are miniaturized versions of the commonly available components and they can be made as small as 1 µm-10 µm in size. F. Templier et al., *"A Novel Process for Fabricating High-Resolution and Very Small Pixel-pitch GaN LED Microdisplays*," SID 2017 Digest, 268-271, (2017) describes a matrix with 2 µm×2 µm chips assembled with 3 µm pitch. When compared to OLEDs, the µLEDs are much more stable components and they can reach very high light intensities.

One bare µLED chip may emit a specific color with spectral width of ~20-30 nm. A white source can be created by coating the chip with a layer of phosphor, which converts the light emitted by blue or UV LEDs into a wider white light emission spectra. A full-color source can also be created by placing separate red, green and blue LED chips side-by-side as the combination of these three primary colors creates the sensation of a full-color pixel when the separate color emissions are combined by the human visual system. The previously mentioned very dense matrix would allow the manufacturing of self-emitting full-color pixels that have a total width below 10 µm (3×3 µm pitch).

Light extraction efficiency from the semiconductor chip is one of the parameters that determine electricity-to-light efficiency of LED structures. There are several methods that may be used to enhance the extraction efficiency and thus make it possible to build LED-based light sources that use the available electric energy more efficiently, which is useful for mobile devices that have a limited power supply. One method presented in U.S. Pat. No. 7,994,527 is based on the use of a shaped plastic optical element that is integrated directly on top of a LED chip. Due to lower refractive index difference, integration of the plastic shape extracts more light from the chip material in comparison to a case where the chip is surrounded by air. The plastic shape also directs the light in a way that enhances light extraction from the plastic piece and makes the emission pattern more directional. Another method presented in U.S. Pat. No. 7,518,149 enhances light extraction from a µLED chip. This is done by shaping the chip itself to a form that favors light emission angles that are more perpendicular towards the front facet of the semiconductor chip and makes it easier for the light to escape the high refractive index material. These structures also direct the light emitted from the chip. In the latter case, the extraction efficiency was calculated to be twice as good when compared to regular µLEDs and considerably more light was emitted to an emission cone of 30° in comparison to the standard chip's Lambertian distribution where light is distributed evenly to the surrounding hemisphere.

In accordance with some embodiments, described herein are systems and methods related to a light field image engine (LFIE) which projects a plurality images in a plurality of angular directions. The LFIE creates the different images with a combination of 1) a digital micromirror device (DMD), which acts as the pixelated spatial light modulator; 2) a rotating mirror, which scans the images through the angular viewing range; and 3) a light engine that generates the light visible in the images. By modulating the DMD matrix faster than the scanning mirror rotation cycle, different images can be projected at different viewing angles. A full-color image can be generated by modulating the light output of the light engine in synchronization with the DMD. In some embodiments, more than one image may be projected in one or more directions simultaneously by using more than one light engine and DMD in a single LFIE, which allows projection of virtual images to different focal surfaces in the depth direction, enabling correct retinal focus cues for 3D content.

The LFIE acts as an image generation core module which can be used in a variety of goggle-free LF 3D display systems in a similar manner to how the DMD component is currently used in various existing 2D projection systems. In addition to the LFIE, an LF projection device has a module which comprises at least a projection lens. This lens projects the image created by the LFIE to a screen, which is the visible component to viewers. It is possible to use the same LFIE for either a multiple user scenario or for a single user scenario with enhanced performance by selecting the other modules of a full LF projection system accordingly.

Figure 4:
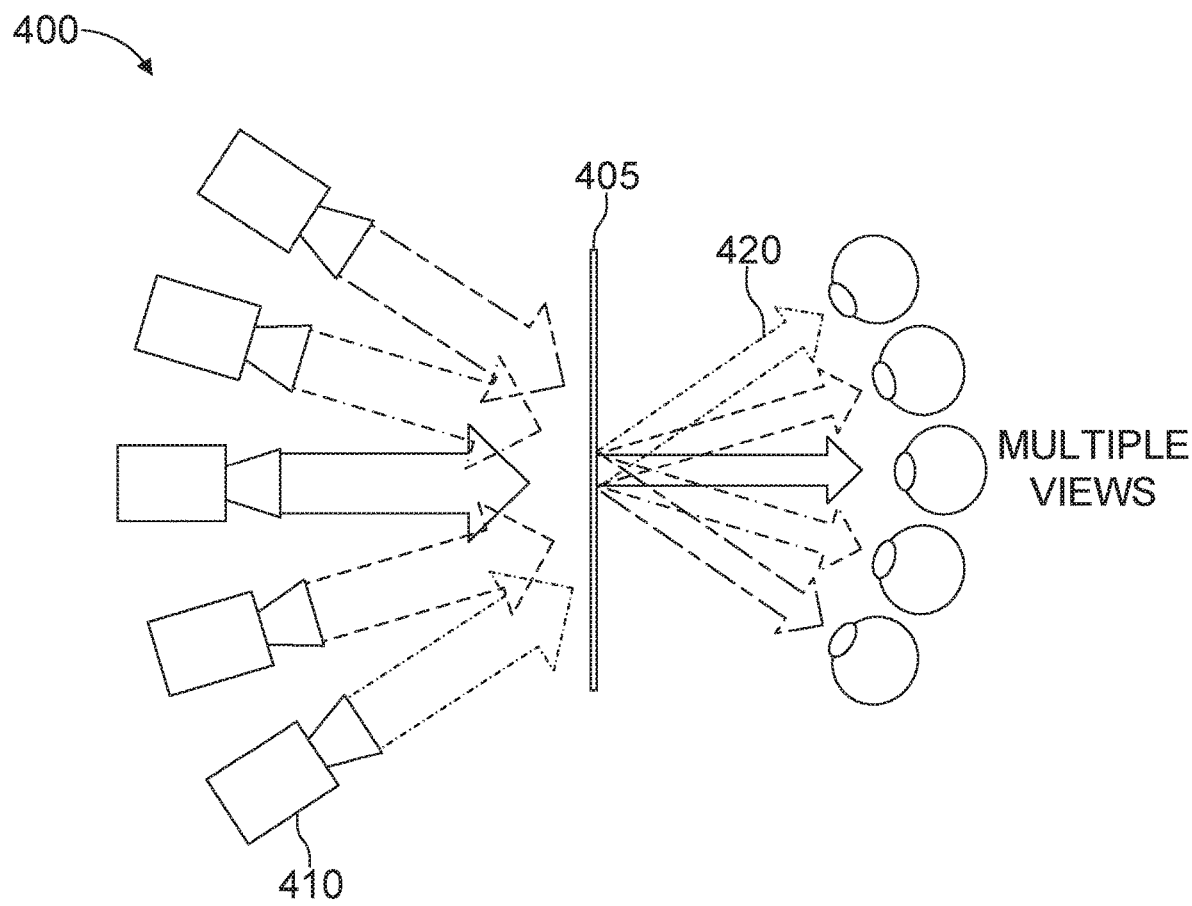
FIG. 4 is a schematic representation of an LF projection system with an array of projectors.
Figure 5:
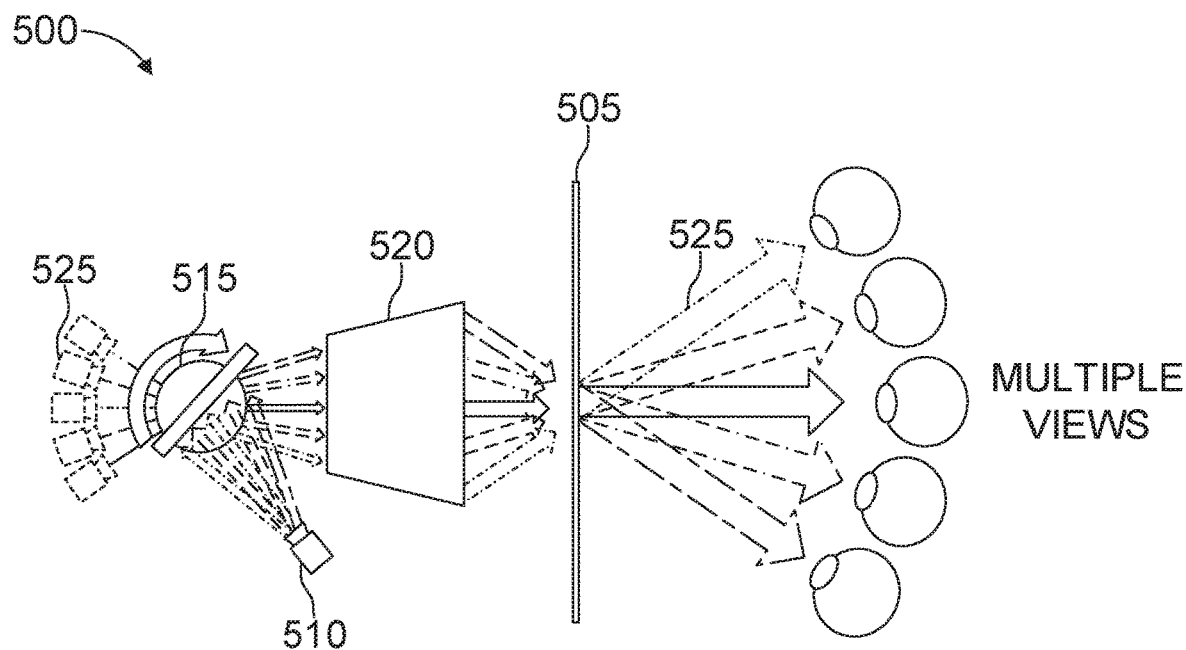
FIG. 5 is a schematic representation of an LF projection system based on a light field image engine (LFIE), in accordance with some embodiments.

FIG. 4 illustrates a schematic presentation of an LF projection system 400 with multiple projectors 410, and FIG. 5 illustrates a schematic presentation of an LF projection system 500 using a LFIE, in accordance with some embodiments set forth herein. One apparent difference is the amount of hardware used. Some projection systems (FIG. 4) make use of large arrays of separate 2D projector devices 410 that create the images (through screen 405) needed for the different views 420. Each of these devices use their own spatial light modulators (SLMs), control electronics, projection optics, etc.

In accordance with some embodiments, systems based on the LFIE (FIG. 5) have only one projector device 510 and one set of projection optics 520. As a rotating mirror 515 scans the images generated with the projector device 510, an array of virtual projectors 525 is "created" behind the plane of the mirror 515. The projector device 510 may include a DMD component, and as the DMD component may act as a sufficiently fast SLM, it can replace an entire array of projector devices (e.g., array of projectors 410 in FIG. 4). As such, through a screen 505 and with a single projector device 510 and a single projection optics 520, a plurality of views 525 may be generated. In other words, LFIE-based systems, in accordance with some embodiments, may utilize more temporal multiplexing instead of spatial multiplexing, and with such an arrangement achieving small size and relatively low cost that follow. The methods for such systems can also be expanded to other small-scale SLMs able to withstand high light intensities, and which are fast enough for the approach emphasizing temporal multiplexing.

Figure 14:
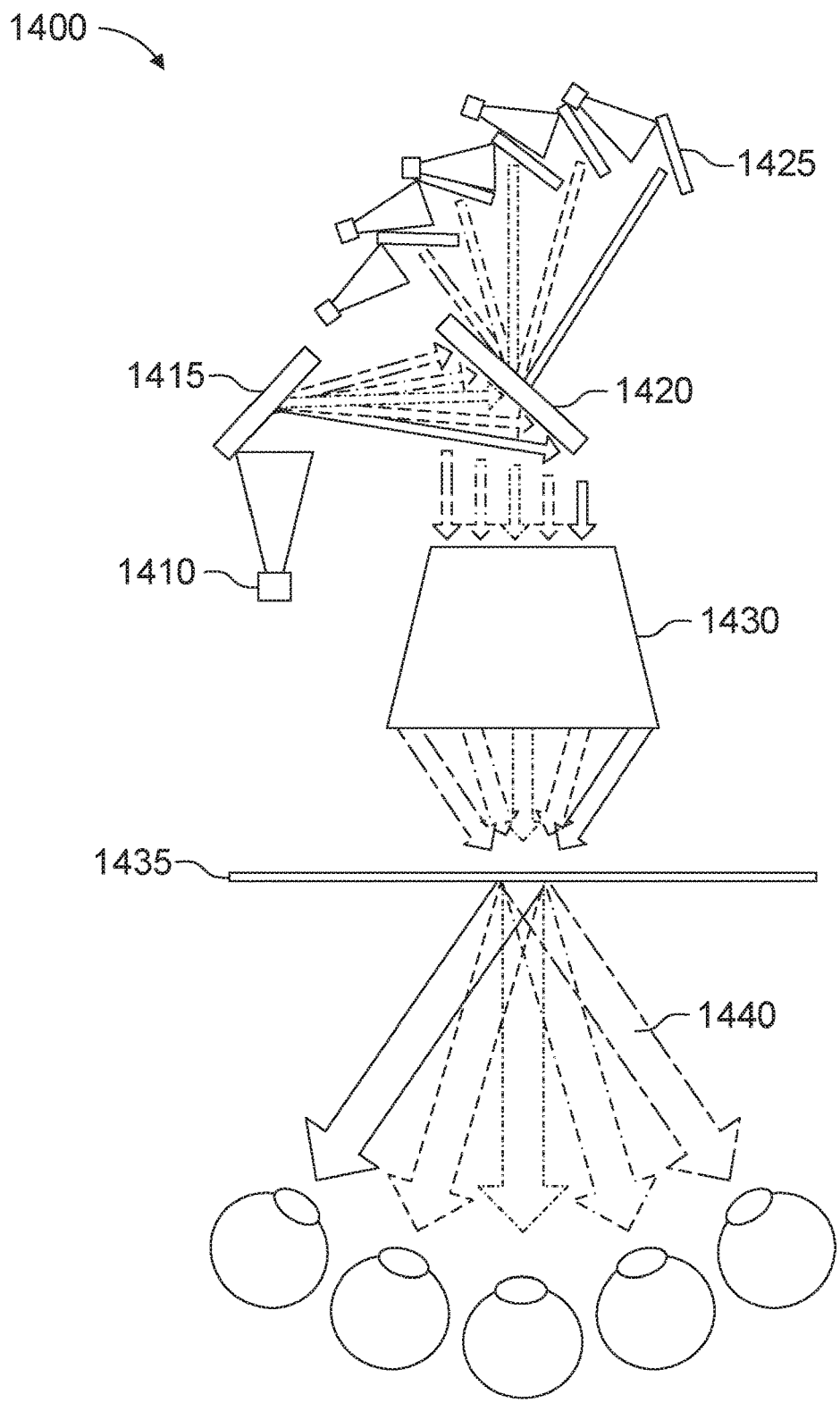
FIG. 14 depicts an overview of a Light Field projection system using a double DMD Light Field Image Engine (DDMD-LFIE), in accordance with an embodiment.

In accordance with some embodiments, as discussed in more detail below, systems based on a LFIE may utilizing a plurality of DMD components (see FIG. 14 and related discussion). For example, in accordance with some embodiments, the rotating mirror 515 of FIG. 5 may be replaced with a second DMD component, as shown in FIG. 14.

In various embodiments set forth herein, the LFIE may use a combination of temporal and spatial multiplexing. Generation of high quality light field 3D image calls for heavy multiplexing in the creation of a dense field of sub-images that form the perception of 3D visual content. In the LFIE, spatial multiplexing is done with a DMD component which modulates high pixel count images quickly. Temporal multiplexing is realized by the rotating mirror that sequentially scans the images into the angular space. The extremely fast switching speeds of LED/laser diode components are used in the creation of, for instance, a color image by sequentially switching the different color components on and off. Thus, some methods disclosed herein utilize both of these multiplexing schemes to full advantage to increase efficiency of the disclosed LFIE systems/devices.

In accordance with some embodiments, three optical functions (image modulation, generation of light, and projection in different viewing directions) may be separated to three separate optical components. This may permit optimization of the functions separately, as the components can be selected and optimized separately for each task. A system with the LFIE may thus be optimized for different use cases, making the approaches set forth herein highly versatile.

In accordance with some embodiments, a module containing all the described components of the LFIE can be built into a small package permitting integration of the image engine with various kinds of devices.

In accordance with some embodiments set forth herein, there are systems and methods for a LFIE which is capable of projecting a plurality of images in a plurality of angular directions. The LFIE effectively generates a light field for a 3D scene which can be viewed from multiple directions. Each viewer may have their own stereoscopic view of the same 3D content, and perception of a three-dimensional image may be generated. As a viewer moves around the projection screen, the image may be changed for each new viewing angle. It is possible to use the same LFIE either for multiple users or for a single user with enhanced performance by selecting the other modules of a full LF projection system appropriately.

In accordance with some embodiments, the LFIE creates the different images with a combination of a DMD, which acts as the pixelated spatial light modulator; a rotating mirror, which scans the images through the angular viewing range; and a light engine that generates the light visible in the images. By modulating the DMD matrix faster than the scanning mirror rotation cycle, a plurality of different images may be projected to different viewing angles. A full-color image can be generated by modulating the light output of the light engine in synchronization with the DMD.

Figure 6:
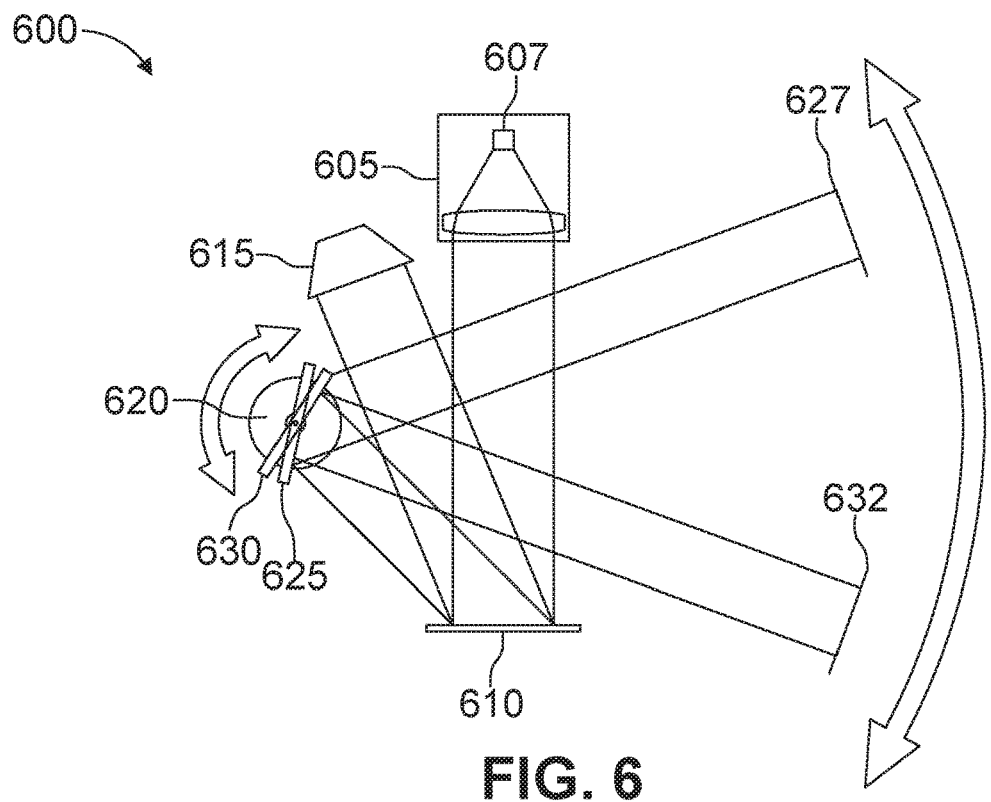
FIG. 6 is a schematic representation of a structure of an LF image engine, in accordance with some embodiments.

FIG. 6 illustrates a schematic presentation of the structure of an example LFIE 600. A light engine 605 may include a light source 607 (e.g., RGB LEDs or laser diode(s)) and illumination optics, and may generate a beam of light that is directed to a DMD component 610. The miniature mirrors acting as image pixels in the DMD 610 reflect the light either to the rotating mirror 620 or to a light trap 615 depending on the image content at a particular view direction. The rotating mirror 620 reflects the images in different angular directions, sweeping through the angular range dependent on the mirror rotation angle. The rotating mirror 620 may be, for example, a galvanometric-type device which makes a back and forth movement, or a polygon mirror that rotates continuously in one direction, or other component. In the embodiment of FIG. 6, the mirror 620 may be in a first position 625 and project an image in a first direction 627, and in a second position 630 may project an image in a second direction 632.

The light engine 605 may support full-color images by combining the output from separate components like LEDs or laser diodes emitting red, green, and blue light. The output of different colors may be synchronized to the DMD 610, and separate colored sub-images may be displayed in fast sequence by modulating the light engine 605 output, for example, by electrically switching the components on and off or by using a fast mechanical shutter. Switching times of the light emitting components may be calculated from the image engine target values set, for instance, relative to the number of views and scanning mirror angular rotation speed. In some embodiments, with white light illumination sources, the different colors may be produced in the light engine 405 with, for example, the use of a color wheel. In such a case, the colored output may be synchronized to the DMD 610 and the rotating mirror 620 with sufficiently high accuracy, and different color dithering methods may be considered during the design phase. Some embodiments may employ a spiral color wheel design developed for DMD components as disclosed in U.S. Pat. No. 6,642,969.

As the rotating mirror 620 changes the projection angle between successive red, green, and blue sub-images, an angular shift is introduced to the projected light fields. The colored sub-images may be combined to form a full-color image by using suitable optical elements in the projection lens or screen of the whole projection device/system. Such elements may be based on, for example, prism effect, chromatic aberrations, or diffraction, which are commonly used optical tools for selectively controlling the propagation direction of different colored light beams.

Figure 7:
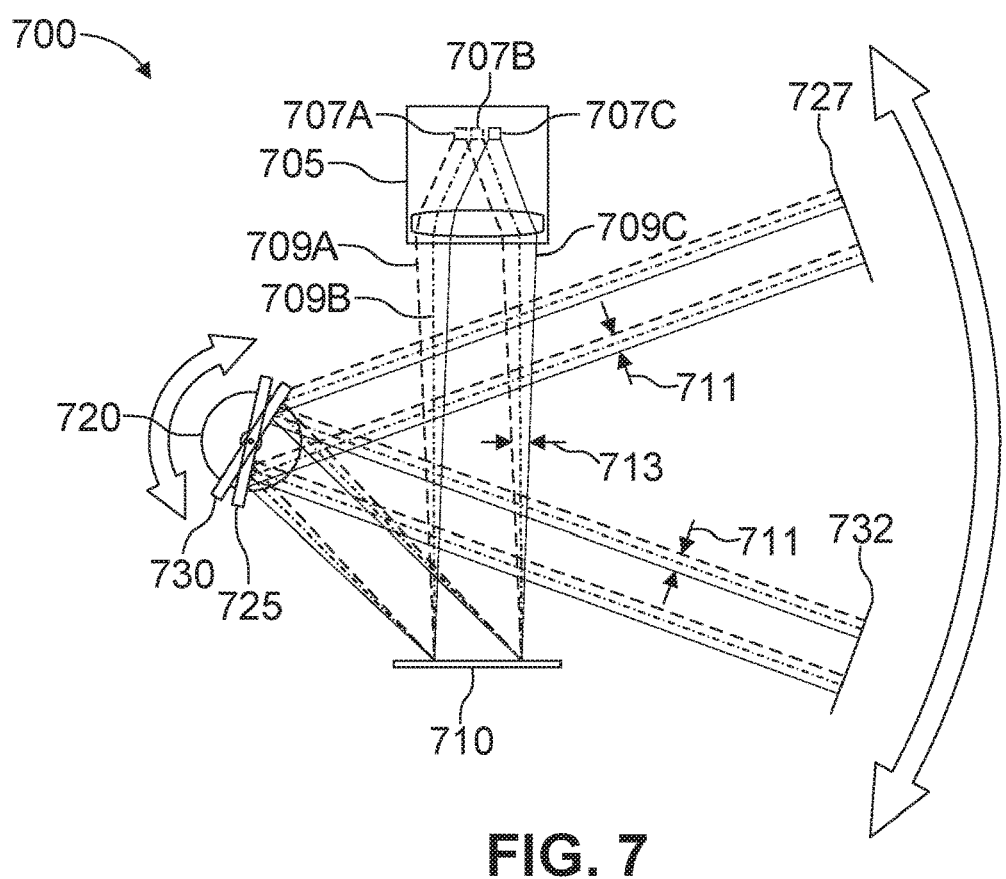
FIG. 7 is a schematic presentation of color image generation with a LFIE, in accordance with some embodiments.

One possible way to project all the colored sub-images in the same direction with the LFIE alone is to use an optical configuration as illustrated in FIG. 7, which depicts a schematic presentation of color image generation with an LFIE. If the light emitting elements 707a, 707b, 707c (e.g., red, green and blue LEDs) are positioned side-by-side inside the light engine 705 and projected to the DMD 710 with common optics, the spatial separation 711 may be transformed into angular separation 713 between the illumination directions. These angular differences may be used by synchronizing the timing of different color illumination beams 709a, 709b, 709c to the rotation of the mirror 720. The small angular differences caused by different LED positions results in small angular differences in projected sub-images caused by the movement of the rotating mirror 720 during the time interval between different color projections. This requires that the LEDs (or other light emitting elements 707) are activated in correct sequence to the mirror 720 rotation speed and direction. The angular spread 713 between different colored illumination beams 709a, 709b, 709c from the light engine 705 will transform into small spatial shifts 711 in the projected direction, but there are overlapping spatial areas where the three colored sub-images are projected to the same direction resulting in a full-color combined image. Overall, it depends on the design of the whole projection device/system and on the color rastering/dithering method whether it is better to have an angular or spatial shift between the colored sub-images output from the LFIE.

In the embodiment of FIG. 7, the mirror 720 may be in a first position 725 relative to each beam 709a, 709b, 709c, and project a sub-image for each beam in a first direction 727, and in a second position 730 relative to each beam 709a, 709b, 709c may project a sub-image for each beam in a second direction 732.

Light engine illumination output is selected so as to be adequate for the intended lighting conditions of various use cases. As the DMD component can withstand very high light intensities, the maximum power level of the light engine may be optimized for particular use cases. Higher power components may be used if the ambient lighting levels are high and/or if a larger number of views are needed. If head or viewer tracking is used in determining the position of one or more viewers, the switching of the lighting beam may also be synchronized to the mirror rotation in such a way that the image is projected only to the appropriate directions, potentially saving energy. In this case, the rotating mirror and DMD components may continue with the same movements, and control of an energy saving feature may be performed by switching the light engine off when the light therefrom would not be projected toward a user.

Figure 8:
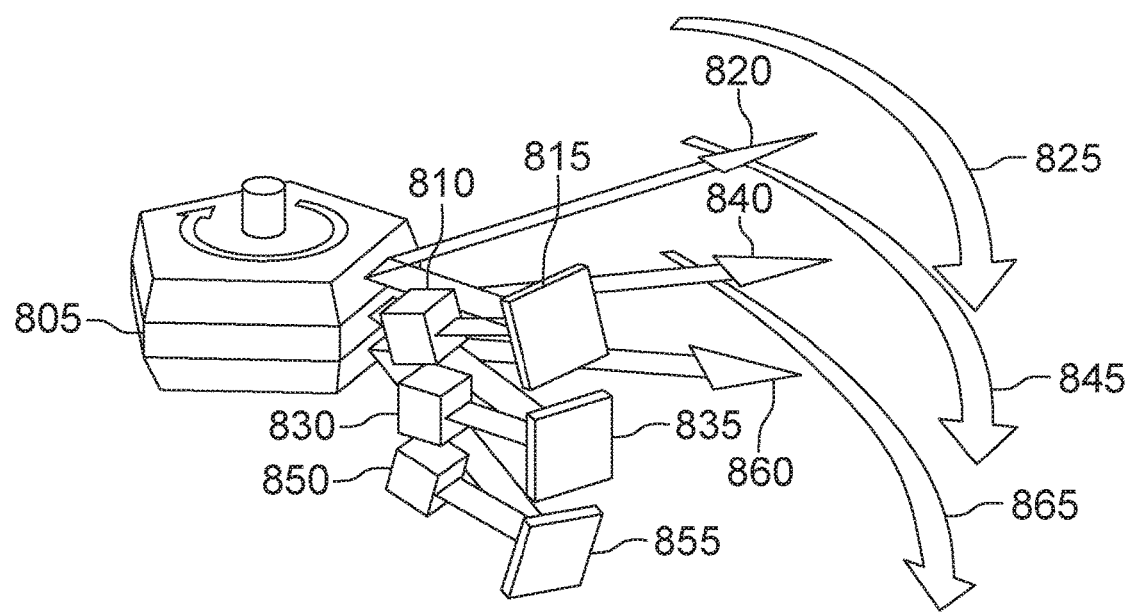
FIG. 8 illustrates a faceted rotating mirror used in simultaneous generation of multiple vertical views, in accordance with some embodiments.

In some embodiments, the LFIE design supports a multiview light field only in the horizontal direction. However, if the rotating mirror is replaced with a scanning mirror able to rotate in both the horizontal and vertical directions, images may be scanned to form a light field with unique views in both the horizontal and vertical directions. This may employ an extremely fast scanning component and may place higher demands on the system, for instance the light intensities required from the light engine as the emitted optical power is spread across a very large number of views. Vertical views may be created with a faceted mirror, an exemplary embodiment of which is illustrated in FIG. 8, which rotates in one direction, projecting the image(s) reflected by the DMD to more than one facet. In such a case, the single DMD may generate unique vertical images at different parts of the mirror matrix simultaneously by dividing the matrix into sections.

Figure 12A:
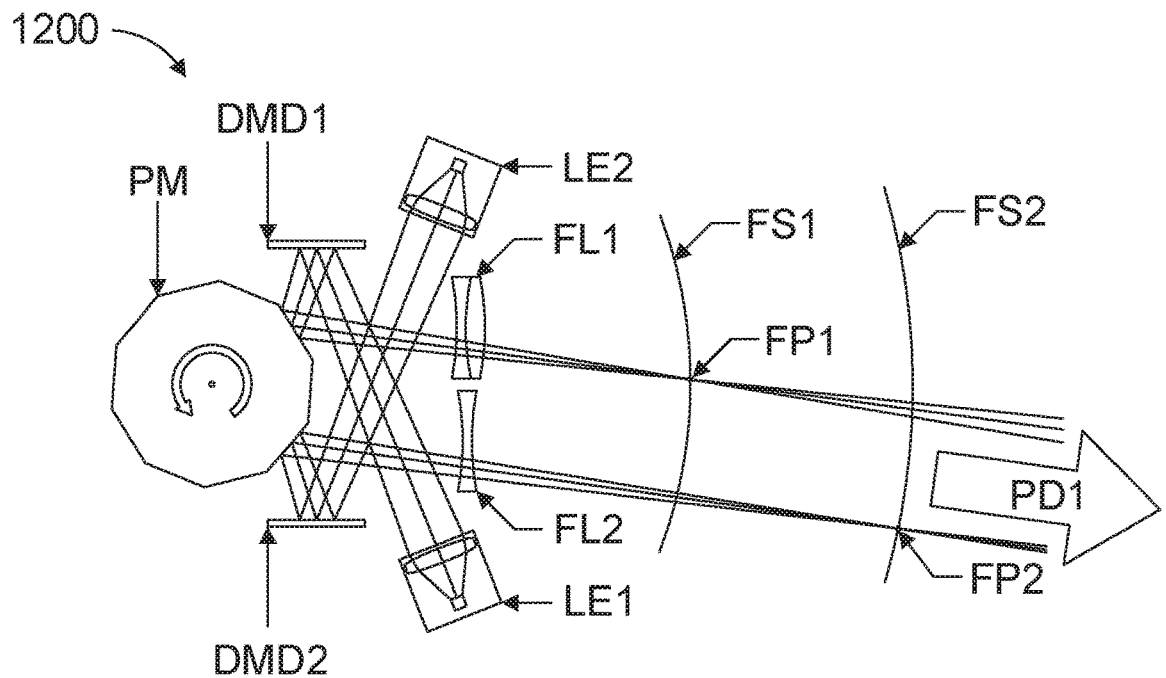
FIG. 12A illustrates components and structure of an LF image engine capable of projecting images to multiple viewing directions and to two different focal surfaces (FS), where projection directions (PD) are set by a rotating mirror in a position 1, in accordance with some embodiments.
Figure 12B:
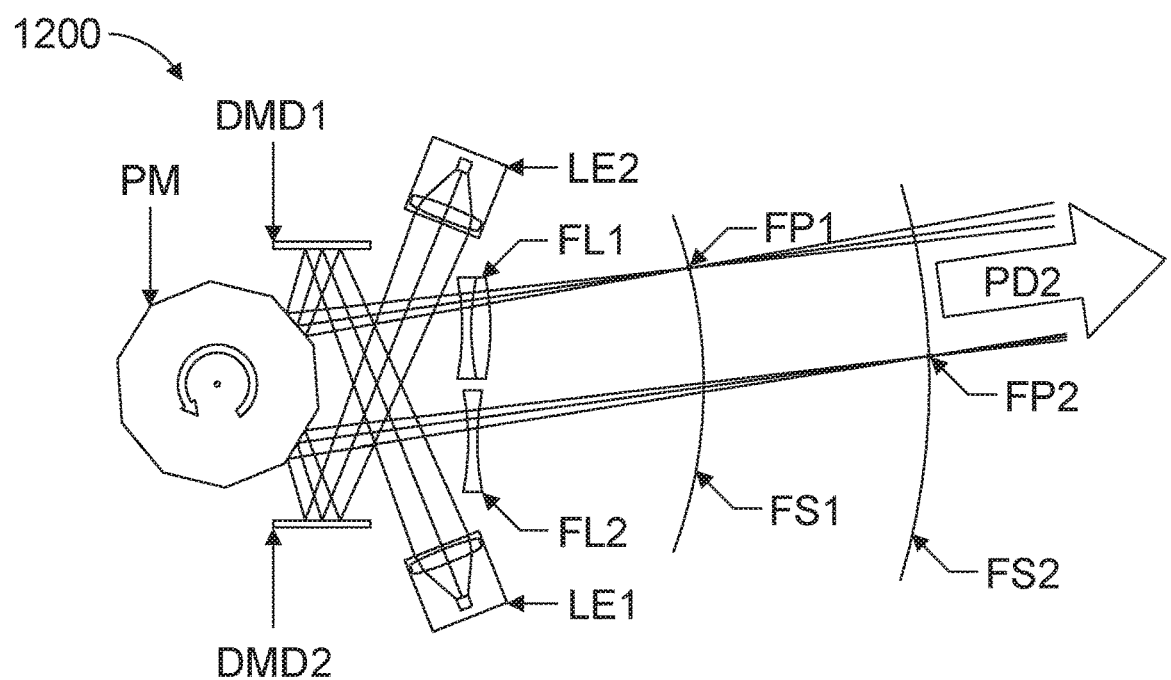
FIG. 12B illustrates the components and structure of the LF image engine of FIG. 10A, where projection directions are set by the rotating mirror in a position 2, in accordance with some embodiments.

In some embodiments, more than one image is projected to one or several directions simultaneously by using more than one light engine and DMD in one LFIE (an embodiment of which is illustrated in FIGS. 12A-12B). The beams generated by the light engines are modulated by the DMDs and directed to a common rotating mirror. The use of a common mirror ensures correct synchronization. In this construction, there is more than one optical path, which permits adding focusing optics to some or all of these optical channels. This allows projection of virtual images to different focal surfaces in the depth directions, enabling correct retinal focus cues for the 3D content.

In accordance with some embodiments, multiple light engines and DMDs may be used together with a single rotating mirror which has more than one facet exposed to one horizontal viewing direction, it is also possible to simultaneously generate multiple vertical viewing directions, as illustrated in FIG. 8. As a faceted mirror 805 (for example, with upper facet 806, middle facet 807, and lower facet 808) rotates, the middle facet 807 reflects the images generated with middle light engine (LE 2/830) and DMD (DMD 2/835) to the vertical projection direction in the middle (VPD 2/840) sweeping through the middle horizontal projection directions (HPD 2/845). As the similar light engines (LE 1/810 & LE 3/850) and DMDs (DMD 1/815 & DMD 3/855) produce simultaneously different images reflected from the facets above (806) and below (808) the middle facet 807, two other horizontal projection planes (e.g., horizontal projection directions at vertical projection directions 820 and 860, respectively) with unique views are formed above (825) and below (865) the central horizontal plane (845). By adding more facets to the mirror, and additional light engine and DMD modules, it is possible to also create multiple viewing positions in the vertical direction without further time multiplexing of the light engines.

Figure 9:
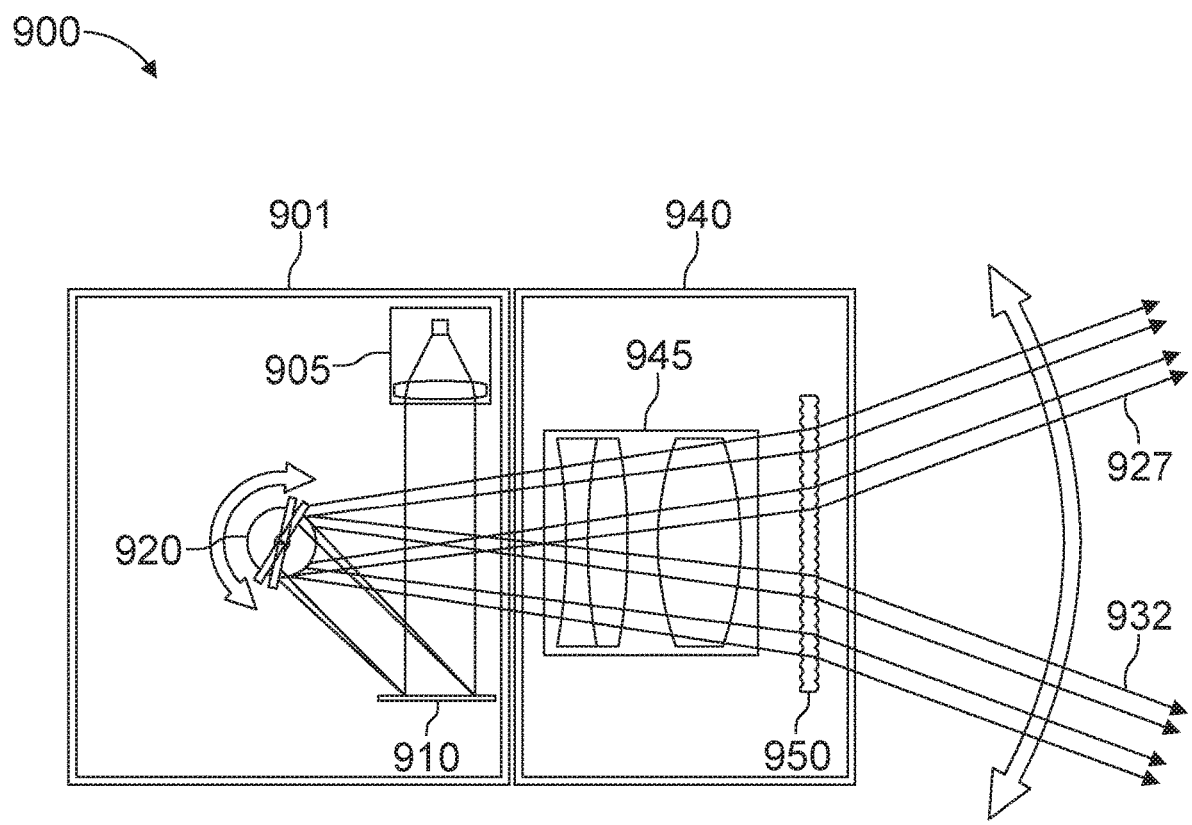
FIG. 9 is a schematic representation of a structure of an LF projector device, in accordance with some embodiments.

FIG. 9 illustrates a schematic presentation of a light field projector device 900 which contains the LFIE 901 (with light engine 905, rotating mirror 920, and DMD 910). In addition to the LFIE 901, the device 900 includes a projection module 940 that includes at least a projection lens (or other projection optics) 945. The purpose of this lens 945 is to project the images created by the DMD 910 to a screen 950 that is the visible component of the device 900 or system. One example of a suitable lens design type is the F-Theta lens, which is able to provide a flat image plane from light beams projected with evenly spaced angular intervals. The projection module 940 may also employ a relay lens that is used in combining the images travelling in different directions into an intermediate virtual light field image, which is then easier to project to the screen 950. With the mirror 920 in a first position, an image may be projected in a first direction 927, and in a second position an image may be projected in a second direction 932.

Figure 10:
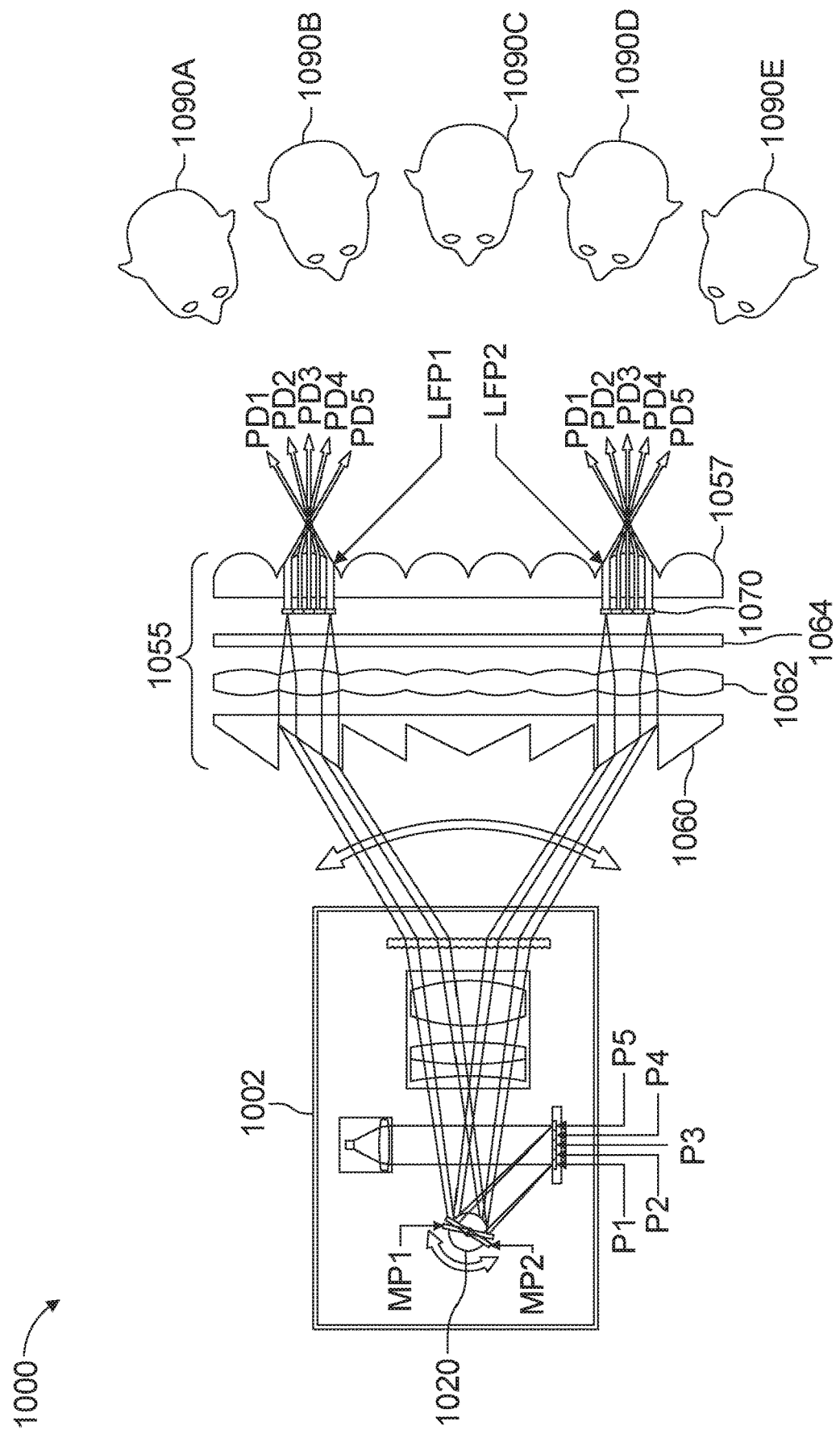
FIG. 10 is a schematic representation of a multi-user LF projection system optical construction with a screen portion visible to viewers, in accordance with some embodiments.

In some embodiments, the LF projector device containing the LFIE is used with a viewing screen. FIG. 10 illustrates a schematic presentation of a multi-user LF projection system 1002 with associated screen 1055 (which is the visible part of the system to the viewers 1090a, 1090b, 1090c, 1090d, 1090e), in accordance with one embodiment. As the mirror 1020 of the LF projection system 1002 rotates, a set of LF sub-images generated with the DMD 1010 is projected from the projection system 1002 to the screen 1055 at different angles. The screen 1055 has an element 1060 which turns the propagation directions of each sub-image towards the main viewing direction. This element 1060 can be, for example, a molded plastic Fresnel lens or foil with embossed microprisms. A separate focusing element 1062 can be used for bringing the pixel matrix 1070 of the DMD 1010 into focus behind a lenticular lens sheet 1057. This focusing element 1062 can be, for example, a molded array of microlenses or an embossed foil with diffractive structures. The focusing may be achieved, in some alternative embodiments, with a projection lens inside the projection system 1002, in which case the focusing element 1062 in the screen 1055 may not be necessary. The screen 1055 may also include a light diffusing element 1064 to homogenize the imaged virtual pixel matrix 1070, which may hide some or all image artifacts connected to the angle adjusting and focusing element features (e.g., fill-factor), as well as small discontinuities between different projected sub-images. If only horizontal views are desired for a particular use case, some of the screen light manipulating elements 1057, 1060, 1062, 1064, 1070 may be one-directional (e.g., grooves) which may result in lower costs, but if both horizontal and vertical views are created, one or more of those elements may be two-dimensional. In some embodiments, all necessary optical functions of the different screen elements may be incorporated into one holographic/diffractive sheet, which may even be flexible, thus permitting similar use cases for the light field projector 1002 to currently existing regular 2D projectors (e.g., home cinema).

A front part of the screen 1055 visible to the viewers, for example a lenticular lens sheet 1057, may act in a similar manner to a lenticular lens structure used in existing multiview autostereoscopic systems. The image of the pixel row (or matrix) 1070 behind the lenticular lens sheet 1057 may act as a light field pixel (LFP) analogous to how a set of LCD display pixels function as LF sub-pixels in standard multi-view displays. Different projection directions (PD) (or view directions) are created when the lenticular lenses 1057 project the virtual pixels to the viewing space(s) in front of the viewer(s). For example, in FIG. 10, pixel P1 is imaged through the system 1000 at one point in time to LFP1 as the rotating mirror 1020 is in position MP1 and the virtual sub-pixel is in turn projected in projection direction PD1 visible only to viewer 1090A positioned at a particular angle in front of the screen 1055. At another point in time, the rotating mirror 1020 has moved to position MP2, and the same pixel is imaged to LFP2 and from there projected in the same projection direction PD1, again visible to the same viewer 1090A, but at a different spatial position and at a later point in time. In a similar way, pixel P5 is first imaged to LFP1 and then to LFP2 at two different points in time, and then projected in PD5 visible only to viewer 1090E.

In current multiview systems, the number of sub-pixels and with it the number of projection directions is fixed to and limited by the number of pixels available in the display (e.g., LCD-panel). In a projector system based on the LFIE, as disclosed herein, the angular sweep and fast modulating mirror matrix of the DMD may create a denser "virtual" display behind a lenticular structure. It is also versatile, as the temporal multiplexing (i.e., angular sweep of the rotating mirror) and spatial multiplexing (i.e., modulation of the DMD pixels) can be combined in numerous different ways, such that the light field system spatial and angular resolutions may be optimized for different requirements, such as screen sizes, number of users, brightness levels, etc., that are all connected to the particular use case. For example, the same projector device could be used for showing a 3D light field image to a single user sitting at a 1 m distance from a screen, or to a group of people standing at a 5m distance from a large projection canvas (or screen). The change between these two use cases may be selection of different size screens, and possibly (somewhat) different rendering settings for the particular screen size, resolution targets, etc.

The 3D scene rendering arrangement may vary depending on the selected parameters for a given use case and hardware. For example, the whole micromirror matrix can be imaged onto one light field pixel on the screen, making it possible to generate as many individual views as there are pixels in the DMD component. In such a case, as the rotating mirror sweeps through its path, each LFP is generated one after another, each with a large number of views. If the DMD matrix is imaged behind several LFPs simultaneously, the LFP spatial resolution can be made higher, but with the cost of lower number of unique views. Some of these trade-offs can be made by changing the rendering settings without the need to change hardware due to optical functions being separated into different components in some embodiments. As the rotating mirror sweeps through its path, the DMD may also be modulated at different rates, making it possible to interlace or overlap areas into the virtual display behind the lenticular sheet. Context adaptive rendering methodologies may be used for improving, for example, image brightness and/or power consumption, such as discussed in U.S. Pat. No. 9,405,124. Furthermore, super-resolution algorithms may also be applied to the rendering scheme in order to increase spatial resolution otherwise limited by the properties of the DMD matrix and imaging system.

From the perspective of the viewers, the LFIE and projection optics can be positioned behind the screen for transmitted image or in front of the screen for reflected images. A back-illuminated screen may create a "projection TV"-like device which has its components in one package, whereas a front-illuminated screen may result in a product closer to the display arrangement in a home theatre system. The screen can also expand or reduce the angular range of the light field generated by the LFIE in order to make the 3D image viewable from larger or smaller angles. Such a screen can be constructed, for example, from two (or more) microlens or lenslet components that have different focal lengths. In such a design the structures are mounted in such a way that the distance between them is equal to the sum of their focal lengths (such as discussed in U.S. Pat. No. 9,405,124).

As the rotating mirror sweeps through the angular space continuously, it is possible to use the device for generation of a very dense light field. Perception of a 3D scene generally calls for at least two different viewpoints being projected towards the viewer—one view for each eye. This stereoscopic image condition is satisfied by the disclosed systems and methods, as the DMD device has high refresh frequencies and reflected images can be projected continuously to the viewing space. It is also possible to project more than one image to the pupils of a single viewer if the viewer is close enough and the DMD refresh frequency adequate. This may fulfil a "super-multiview" condition and provide the viewer a more natural viewing experience. As previously discussed, the LFIE can also be used for generation of more than one focal plane, resulting in virtual images at different depth distances from the viewers and more natural retinal focal cues.

Figure 11:
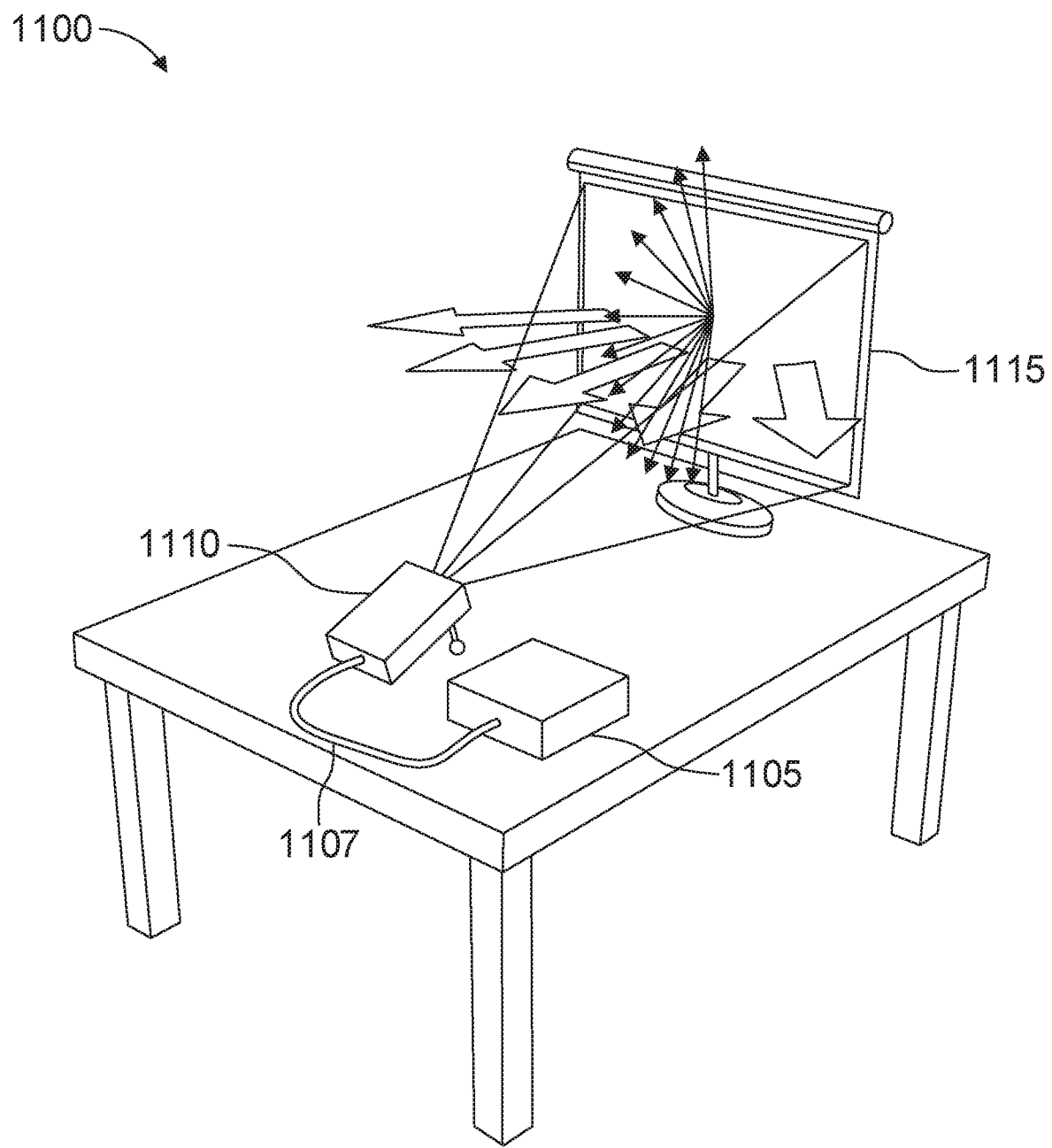
FIG. 11 is a schematic representation of an LF projection system utilizing an LF projector device including a LFIE, in accordance with one embodiment.

FIG. 11 illustrates a schematic presentation of a light field projection system utilizing an LF projector device including a LFIE. The system 1100 may include a playback device 1105 that provides 3D content to the LF projection system 1110, which in turn generates the LF image projected to a screen 1115. The projection system can be placed, for instance, on a table in front of a screen 1115. Such a screen 1115 may be mounted on an appropriate support structure (e.g., wall, stand, etc.), or placed on the same table or a different surface relative to the projection system 1110. The playback device 1105 calculates and transmits the display signals 1107 to the projection system 1110, which contains control electronics that activate the motor of the rotating mirror and control the DMD in synchronization with the mirror. The reflecting screen maintains, expands, or contracts the light field angular structure in the horizontal direction, so that the different views can be seen from different viewing positions around the table. The screen can also diffuse the reflected light in the vertical direction in order to make the images more uniform for viewers who have their eyes positioned at different heights. Providing the different viewpoints in the horizontal direction only is adequate for 3D image perception as the eyes are positioned horizontally.

In some embodiments, such as discussed in relation to FIG. 14 below, a second DMD component may be used instead of a rotating mirror to create a LFIE capable of addressing the on-off state and angular direction of each pixel separately. In such an arrangement, instead of just switching the pixels on and off, the second DMD scans the angular area in a smooth motion as the first DMD device switches the pixels on and off at a faster rate. In these embodiments, more than one mirror pixel in the first DMD can be used to illuminate the larger pixels of the second DMD. By coating some of the micromirrors of the first component with micro-optical features such as diffractive structures, images may be projected to different focal planes as the micro-optical features change the focal length of the whole projection system, thus creating a true light field with multiple directions and multiple virtual focal planes. The use of two DMDs makes this possible as the pixels of the first DMD may be mapped individually to the pixels of the second DMD.

In some embodiments, a variation of the LFIE with a light engine and rotating mirror (and possible DMD) may be used in generation of a very dense directional backlight to, for instance, an LCD screen. Also, the screen design set forth herein may complement a simplified system where the same time/spatial multiplexing scheme is used.

In some embodiments, an autostereoscopic 3D LF display projection system may be achieved using two identical LFIEs. If the two LFIEs are positioned to a distance of ~65 mm from each other, the two simultaneously projected light fields fit to two eye-boxes centered at the average interpupillary distance of human eyes. If a screen as described herein is used in reflecting or refracting both projected eye-boxes in multiple directions, a set of autostereoscopic views is created for multiple users. Such an arrangement may create a denser light field in both the horizontal and vertical directions, as the angular ranges of the produced light fields are limited to the small eye-boxes. Limited angular space may also have a lower datarate requirement for the rendering and control system. Additionally, an eye tracking system may be used for the recognition of user positions.

One possible structure of an example LFIE apparatus is shown in FIGS. 12A-12B. The example LFIE has two separate Light Engines (LE1 and LE2), Digital Micromirror Devices (DMD1 and DMD2), and Focus Lenses (FL1 and FL2), which form two different optical paths or image channels through the device 1200. The two illumination light beams generated by the LEs are directed first to the DMDs which perform image modulation and reflect the beams to two different facets of a single Polygon Mirror (PM). Image beams reflect from the PM facets and are directed through the FLs which in FIGS. 12A-12B are different (but do not necessarily have to be) for the two image channels enabling simultaneous projection of two different images with different focal surfaces (FS1 and FS2) in the same projection direction (PD1 and PD2). As the PM rotates, the angles between illuminated facets and image beams change from a first rotational position as shown in FIG. 12A to a second rotational position shown in FIG. 12B. As the rotating movement of the PM makes the transition between the projection directions continuous, two different and continuous focal surfaces (FS1 and FS2) are created as the Focal Points (FP1 and FP2) of the two optical paths sweep through the projection space. A true 3D light field image with multiple unique viewing directions and two focal surfaces is generated when the DMDs modulate the projected image beams with a refresh rate higher than the time it takes for the illuminated PM facets to rotate through the beam paths.

The number of unique viewing directions generated with the example LFIE is determined by the number of image modulation cycles which can be made with the DMDs within the time it takes for one PM facet to sweep through the designed projection angular range. The example image engines may be used for 3×8-bit full color projection by using red, green, and blue LEDs which are modulated in synchronization with the DMDs. If the example calculations discussed above are used as a reference, a full-color image refresh frequency of ~1360 Hz can be calculated for a micromirror component that has a 33 kHz binary frame rate. One existing component fulfilling this specification is the Texas Instrument DLP7000. A commonly used threshold value for flicker free-image at the center of vision and at fairly bright ambient lighting conditions is 60 Hz. From these two values, it can be determined that ~23 unique and flicker free full-color views can be generated with a single DMD. The number of views may be increased if less than 8-bit color depth or monochrome images are used, or if more than one DMD is used simultaneously and their projection angles are different. In the LFIE example shown in FIGS. 12A-12B, the second DMD is used for creation of a second focal surface in the depth direction, but it could also be used for doubling the number of projected views to ~46.

If the projection angle of a LFIE is designed to ±10 degrees and the entire system with the projection optics and screen is designed such that the angular spread is doubled, the angular difference between two views is ~1.8 degrees. This means that a viewer with a normal interpupillary distance of 65 mm may see a stereoscopic 3D image from a distance below 2 m. Several different viewers could also see the same 3D content stereoscopically from their own viewing directions. The viewers would also have two different focal surfaces in the depth direction that would enhance the 3D effect by providing natural retinal focus cues. Such an arrangement is illustrated in FIG. 13A.

FIG. 13B illustrates an alternative system based on the same LFIE as FIG. 13A, but designed for a single user and where the projection module compresses the angular spread of the projected light field in half, resulting in an angular difference of ~0.45 degrees between two adjacent views. If the viewer is positioned at a distance of ~0.5 m, the width of a single view viewing zone is ~4 mm, corresponds to the normal eye pupil size at moderate lighting conditions. This may permit projecting two different images inside the pupils of one viewer simultaneously, which fulfills the supermultiview condition and may provide even more realistic focus cues, especially for fast moving 3D image content. The system of FIG. 13B may also be used together with facial tracking.

In some embodiments, there may be a method of displaying a 3D multiview image with a light field image engine, comprising: outputting light from a light engine onto a digital micromirror device (DMD); operating the DMD as a pixelated spatial light modulator, to reflect at least some of the output light from the DMD to a rotating mirror; rotating the rotating mirror at a cycle rate to scan images represented by light reflected from the DMD through an angular viewing range; modulating the DMD at a rate faster than the rotating mirror cycle rate; and generating a full-color image by modulating the output light from the light engine in synchronization with the DMD.

In some embodiments, there may be a method of displaying a 3D Multiview image, comprising: performing synchronized temporal modulation of a plurality of color illuminators, wherein the output light of each color illuminator is incident on a pixelated separately controllable matrix of reflective elements; reflecting at least some of the light incident on the matrix of reflective elements to a movable mirror assembly; and sweeping the mirror assembly through an angle in a manner synchronized to both the color illuminator modulation and the controllable matrix of reflective elements. The method may include wherein light reflected from the matrix of reflective elements is incident on either the movable mirror assembly or a light trap. The method may include wherein image content is rendered, and presented to a display device in a temporally modulated manner to provide a plurality of separate views to be displayed over a plurality of windows no greater than the typical human inter-pupillary distance. The method may include wherein image content is rendered, and presented to a display device in a temporally modulated manner to provide a plurality of separate views to be projected to a holographic screen with a plurality of windows no greater than the typical human inter-pupillary distance.

In some embodiments, there may be a method of displaying a 3D Multiview image with a light field image engine projection system a first and second light engine, a first and second digital micromirror device (DMD), a rotating mirror, and a first and second focal lens, comprising: performing image modulation at the first DMD and reflecting at least part of a first light beam generated by the first light engine as a first image beam to a first facet of the rotating mirror, said first facet configured to reflect the first image beam through the first focal lens to a first focal surface; performing image modulation at the second DMD and reflecting at least part of a second light beam generated by the second light engine as a second image beam to a second facet of the rotating mirror, said second facet configured to reflect the second image beam through the second focal lens to a second focal surface distinct from the first focal surface, such that the first and second image beams are simultaneously projected in a first projection direction; rotating the rotating mirror such that the first and second image beams are simultaneously projected in at least a second projection direction, such that the first and second focal surfaces are continuous as focal points of each image beam sweep through a projection space; and modulating the first and second DMDs at a refresh rate higher than a rotation cycle rate of the rotating mirror, such that a 3D light field image having a plurality of unique viewing directions and two focal surfaces is generated. The method may include wherein image content is rendered, and presented to a display device by the light field image engine projection system in temporally modulated manner to provide a plurality of separate views for display over a plurality of windows no greater than the typical human inter-pupillary distance. The method may include wherein image content is rendered, and presented to a display device by the light field image engine projection system in a temporally modulated manner to provide a plurality of separate views for projection to a holographic screen with a plurality of windows no greater than the typical human inter-pupillary distance. The method may include wherein the rotating mirror sweeps through an angle in a manner synchronized to both the light engines and the DMDs. The method may include wherein the first DMD comprises a pixelated separately controllable matrix of reflective elements.

In some embodiments, there may be a light field image engine projection system for displaying 3D Multiview images, comprising: a light field image engine comprising at least two light engines, at least two digital micromirror devices (DMDs), and a rotating mirror; and a projection module comprising projection optics and an angle expanding element. The method may include wherein a first DMD is configured to perform image modulation and reflect at least part of a first light beam generated by a first light engine as a first image beam to a first facet of the rotating mirror, said first facet configured to reflect the first image beam through a first focal lens to a first focal surface. The method may include wherein a second DMD is configured to perform image modulation and reflect at least part of a second light beam generated by a second light engine as a second image beam to a second facet of the rotating mirror, said second facet configured to reflect the second image beam through a second focal lens to a second focal surface distinct from the first focal surface. The method may include wherein a first and a second image beam are simultaneously projected in a first projection direction. The method may include wherein the light field image engine is configured to rotate a first and second image beam with the rotating mirror such that the first and second image beams are continuously projected across a first and a second focal surface. The method may include wherein the DMDs are configured modulate a first and a second image beam at a refresh rate higher than a rotation cycle rate of the rotating mirror, so as to generate a 3D light field image having a plurality of unique viewing directions and two focal surfaces. The method may include wherein the light field image engine projection system is configured to receive 3D content from a playback device and generate a light field image on a screen.

In some embodiments, there may be a system comprising a light field image engine projection system comprising a first and second light engine, a first and second digital micromirror device (DMD), a rotating mirror, and a first and second focal lens, a processor, and a non-transitory computer-readable storage medium storing instructions operative, when executed on the processor, to perform functions including: perform image modulation at the first DMD and reflecting at least part of a first light beam generated by the first light engine as a first image beam to a first facet of the rotating mirror, said first facet configured to reflect the first image beam through the first focal lens to a first focal surface; perform image modulation at the second DMD and reflecting at least part of a second light beam generated by the second light engine as a second image beam to a second facet of the rotating mirror, said second facet configured to reflect the second image beam through the second focal lens to a second focal surface distinct from the first focal surface, such that the first and second image beams are simultaneously projected in a first projection direction; rotate the rotating mirror such that the first and second image beams are simultaneously projected in at least a second projection direction, such that the first and second focal surfaces are continuous as focal points of each image beam sweep through a projection space; and modulate the first and second DMDs at a refresh rate higher than a rotation cycle rate of the rotating mirror, such that a 3D light field image having a plurality of unique viewing directions and two focal surfaces is generated.

In accordance with some embodiments set forth herein, there are systems and methods for generating projected 3D light fields using a double-DMD light field image engine. Various embodiments take the form of an optical method. Other embodiments comprise a Double DMD Light Field Image Engine (DDMD-LFIE) that is capable of projecting multiple images into several angular directions. The DDMD-LFIE creates different images using a combination of two Digital Micromirror Devices (DMDs), which act as pixelated spatial light modulators, and a light engine that generates the light visible in the images. The DMDs are oriented in series and the second DMD scans micromirror tilt angles through a certain range. This modulation, combined with precise timing, allows for control of the angle/FOV that various 2D views of some 3D content are projected towards.

In many embodiments, the first DMD component has higher a resolution and smaller pixels than the second DMD. The first DMD is also modulated substantially faster than the second DMD. Because of the faster modulation speed, the first DMD is imaged on the second DMD many times during each cycle of the second DMD's angular sweeps. The described combination of DMDs can be used for projection of more than one image to a single viewing angle simultaneously. This temporal multiplexing allows for projection of virtual images to different focal surfaces, enabling correct retinal focus cues for the 3D content. Each viewer observes his/her own stereoscopic view of the same 3D content and perception of a 3D image is generated. As a viewer moves around a projection screen, the observed image changes for different viewing angles. A full-color image can be generated by modulating the light output of the light engine in synch with the DMDs.

The DDMD-LFIE is a core image generation module and can be used in many different kinds of goggle-free light field 3D display systems. In the present disclosure, some embodiments take the form of a light field projector or light field projection system. In addition to the DDMD-LFIE, a light field projection system further includes a module that contains at least one projection lens. The purpose of this lens is to project the images created by the DDMD-LFIE to a screen that is visible to viewers. In at least one embodiment, the light field projection system also comprises the screen. It is possible to use the DDMD-LFIE in a multiple user device/system, or in a single user device/system with enhanced performance—enhanced performance is obtained in combination with the other selected modules of the full LF projection system.

Embodiments described herein use a combination of temporal and spatial multiplexing. Generation of high quality light field 3D image calls for heavy multiplexing in the creation of the dense field of sub-images that form the basis of 3D visual content. In the DDMD-LFIE, spatial multiplexing is done with the first DMD component which is capable of modulating high pixel count images very fast. Temporal multiplexing is realized with the second DMD that scans the images into the angular space sequentially. Extremely fast switching LED/laser diode components and/or color wheels in the light engine provide further temporal multiplexing for the creation of, e.g., a color image by sequentially switching the different color components on and off. Thus, such embodiments are able to utilize both spatial and temporal multiplexing schemes. Precise timing and coordination between the various components (e.g., DMDs, laser diode) is coordinated by a master controller. One technical issue relates to the control of the second DMD micromirrors. One embodiment of the present system uses micromirrors that operate with a smooth and relatively slow angular sweep as compared to DMD devices that are used as on-off switches. This issue can be addressed by using fast control electronics and/or an alternative micromirror structure. Furthermore, the issue may also be addressed by using highly tuned timing between the two DMDs. Micromirror devices with angular control that can be used as the second DMD in example embodiments include those described in U.S. Pat. No. 7,782,523, entitled "Analog micromirror devices with continuous intermediate states" and in U.S. Patent Application Publication No. 2010/0033788A1, entitled "Micromirror and fabrication method for producing micromirror."

In one embodiment, the DDMD-LFIE comprises three separate optical components: (i) an image modulation means, (ii) a light generation means, and (iii) a projection means which sends the modulated light towards various directions. This design makes it possible to optimize the functions of each component separately as the components can be selected and optimized solely for each task. A system with the DDMD-LFIE can be designed for different use cases.

The illumination beam may be generated with a system utilizing, e.g., a halogen lamp and a color wheel. LEDs and laser diodes are also desirable components for the light engine because (i) they can be modulated quickly and (ii) the light emitted by these components is easily collimated and directed to the DMDs.

Image modulation (spatial multiplexing) can be carried out with, e.g., an LCoS (Liquid Crystal on Silicon) component. In addition to or instead of using a DMD, sequential image projection to different angles could be achieved by using tunable lenses, by rotating diffraction gratings or prisms, and through the use of galvanometric and polygon mirrors. An embodiment of the system may employ a MEMS-based single scanning component for the same purpose.

The creation of multiple focal planes can be realized by positioning an adjustable lens (e.g., liquid lens) in the projection optical path instead of making two separate optical paths with the micromirror surface structures. Adjustable lenses may be used alongside the presented construction as an additional way of creating multiple focal planes, which may further improve the image quality.

In general, the described methods and systems represent a small subset of optional optical and optoelectronic components that could be used in the realization of the three optical functions.

In an example construction of the DDMD-LFIE, as discussed below, a module containing all the described components can be built into a very small package making it possible to integrate the image engine into many kinds of devices. The DDMD-LFIE can be used, e.g., to replace projector arrays currently used in LF systems. As the components in the DDMD-LFIE are small, the cost of such modules can be brought down with high volumes. Simple construction is also beneficial for the reliability, setup and calibration of the whole system, as only very few components need to be fitted together.

FIG. 14 depicts an overview of an LF projection system using a double DMD Light Field Image Engine (DDMD-LFIE), in accordance with some embodiments. As discussed previously in relation to FIG. 5, in some embodiments the rotating mirror of FIG. 5 may be replaced with a DMD. Similar to the LF projection system of FIG. 5, the LF projection system of FIG. 14, in contrast to current systems such as depicted in FIG. 4, has only one projector device and one projection optics.

In the LF projection system of FIG. 14, the DDMD-LFIE generates a 3D light field that passes through a lens towards a viewing medium. The LF projection system of FIG. 14 comprises a light engine 1410, a first DMD 1415, a second DMD 1420, an array of first DMD virtual images 1425, a lens 1430, a holographic screen 1435, and multiple generated views 1440.

As the second DMD 1420 scans through the angular range, the array of virtual SLMs 1425 is created behind the plane of the second DMD 1420 from images of the first DMD 1415. Due to the fact that DMD switching is sufficiently fast, it can be used to replace a whole array of projector devices (e.g., array 410 in FIG. 4). In other words, the DDMD-LFIE-based system (such as in FIG. 14) may utilize more temporal multiplexing instead of spatial multiplexing, and with such an arrangement achieving small size and relatively low cost that follow. The methods for such systems can also be expanded to other small-scale SLMs able to withstand high light intensities, and which are fast enough for the approach emphasizing temporal multiplexing.

In some embodiments, the DDMD-LFIE uses higher-level multiplexing with the second DMD having individually addressable sub-pixels instead of having just one large scale component. This double SLM construction may also make it possible to utilize new image rendering methods like a tensor approach that may not be possible with a one-mirror system, such as previously discussed.

The double-DMD design set forth herein may project individually addressable sub-pixels towards viewers positioned inside a projection system FOV. In these systems, mirrors of the second DMD may sweep through the angular range of the beam projected from the LF projector device with a single smooth motion. This calls for control over the tilt angles as the mirrors swing back and forth. By using control electronics with precise timing and coordination, the two DMDs can be synchronized to each other such that the second DMD mirrors are pointed in the right directions when the first DMD pixels are used for modulating that specific view direction. The light engine also may have extremely fast switching speeds for precise timing between the components.

The sub-pixels inside the projected larger pixels can be used for multiple purposes. Various embodiments are described in the balance of this detailed description. Embodiments may be combined when optical hardware and temporal and spatial resolution allow for it. For example, in an embodiment the mirror surfaces of the first or second DMD are coated with micro-optical features. The individual sub-beams can be made to focus at different focal planes in the projected light field via a plurality of optical methods/systems taking advantage of the micro-optically modulated sub-pixels. If the first component pixels are modified with the structures, the alteration can be made unique for each micromirror separately, but if the modifications are done to the second component, different micro-optical sections are made inside each micromirror surface. It is possible to utilize a combination of both small and large mirror modifications together, e.g., coating the first DMD pixels with color filters to provide chroma modulation and coating the sub-pixel sections of each second DMD mirror with a range of polarizing films (controlling polarization and employing birefringent optics provides a means for focal plane modulation). Any modifications will change the mechanical properties of the micromirrors and this should be taken into account in the design of the component and drive electronics. For example, if the mirrors are coated with thin dielectric layers, the mass of the swinging part increases slightly and the modulation speed may be slowed down or electrical force driving the mirror raised up. However, if the micro-optical structure is etched (e.g., diffractive grating) to the surface of the mirror, its mass is somewhat decreased and the same electric force acting on the piece will cause faster movement.

One example optical sub-pixel modification for the first DMD is to coat the mirrors with very thin polarizing films. This would make it possible to control the polarization direction of each sub-beam, which in turn could be used for generation of multiple focal planes. If a projection lens is positioned in front of the projected sub-beams and the lens contains highly birefringent materials (e.g., calcite), which have a refractive index that is dependent on the polarization direction, several different beam focal planes can be created as the second DMD is imaged towards the viewers. The different focal planes can have unique image content as the smaller sub-pixels are modulated separately from the larger physical pixels of the second DMD. The use of a larger pixel matrix as common projector source allows the focal planes to be projected to the same directions contributing to pixel alignment of each depth layer. In addition to polarizing features, the pixels may contain e.g. holographic coatings or diffractive grooves that alter beam divergence and/or direction in such a way that the projection lens of the LF projector device is able to generate the successive focal planes in the depth direction. Other optics may be employed as well.

Figure 15:
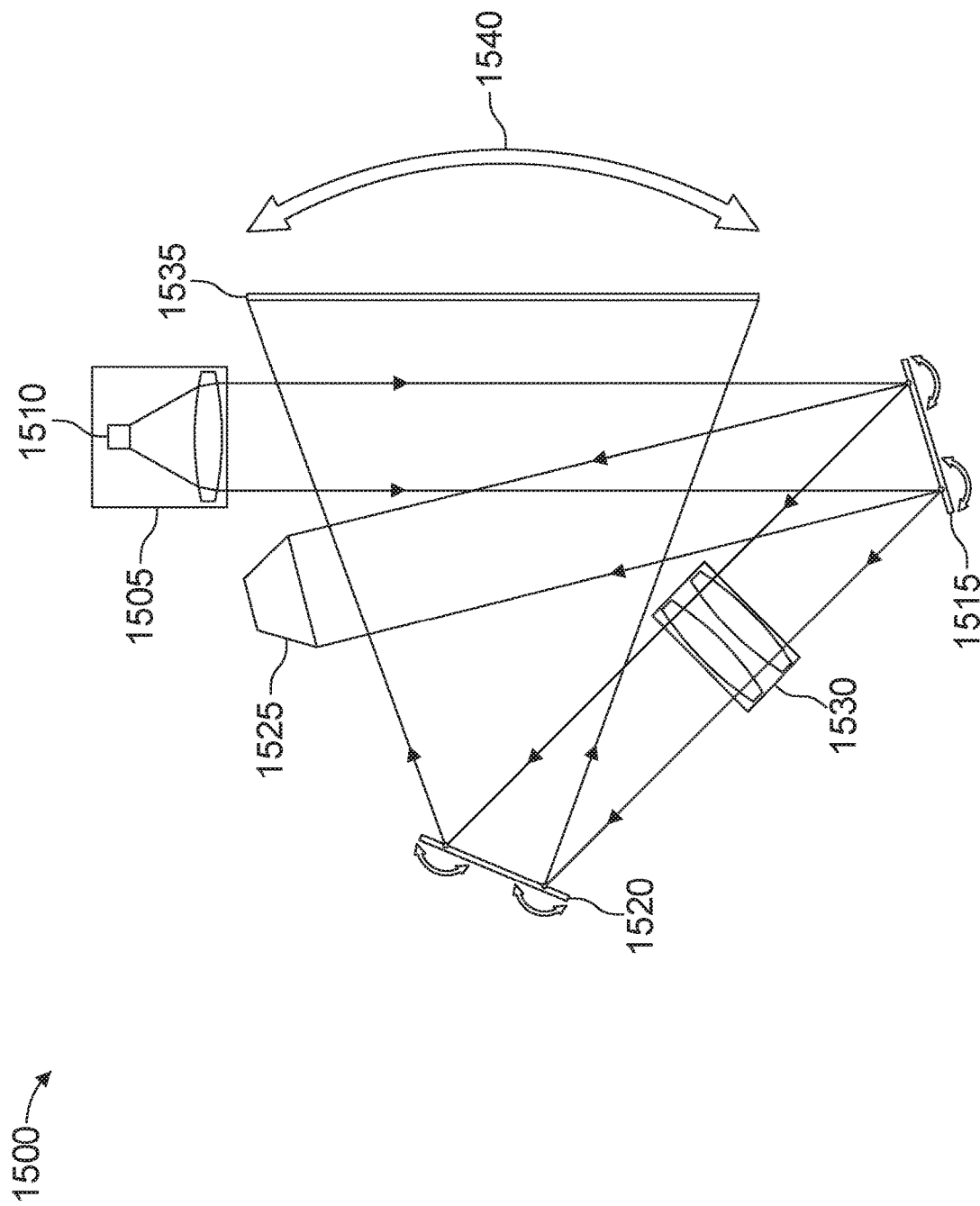
FIG. 15 depicts a schematic presentation of an example structure of a DDMD-LFIE, in accordance with an embodiment.

FIG. 15 depicts a schematic presentation of an example structure of a DDMD-LFIE 1500, in accordance with some embodiments. The basic structure of the DDMD-LFIE 1500 may include a light engine 1505 having a light source 1510 (e.g. RGB LEDs or laser diode(s)) and illumination optics. The light engine 1505 generates a beam of light that is directed to a first DMD component 1515. Miniature mirrors making up the first DMD 1515 act as image pixels and the first DMD reflects the incident light either towards a second DMD component 1520 or to a light trap 1525 depending on the image content needed at that particular time. A lens 1530 is positioned between the two DMDs that images the pixels of the first DMD 1515 onto the second DMD 1520, effectively mapping the pixels of the first DMD 1515 on top of the second DMD 1520. The second DMD 1520 reflects the images forward to slightly different angular directions as its micromirrors sweep through their angular range. The first DMD 1515 has more pixels than the second DMD 1520, and as the first mirror matrix is imaged on top the second one, so it is possible to generate a sub-matrix of individually addressable pixels inside the larger pixel of the second DMD 1520. The first DMD 1515 modulates the smaller pixels at a faster rate than the second DMD 1520 making it possible to project different sub-matrixes to different projected directions as the second DMD 1520 pixels are swept at a slower pace across the FOV 1540 of projected images 1535.

Physical characteristics of the second DMD 1520 are different from the characteristics of the first DMD 1515. An example embodiment of the DDMD-LFIE calls for accurate control over the scanning angle of the second DMD micromirrors instead of having just on-off states, found in most DMD components available today. This control may be achieved using precise timing circuitry to coordinate the dynamics of the micromirror with the timing of the first DMD. Relatively slow refresh speeds below 1000 Hz can be used because the mirror tilting action needs only be fast enough for human POV phenomena.

High light engine illumination output is best for bright lighting conditions and most general use case. As the DMD components can withstand very high light intensities, the maximum power level of the light engine can be optimized for the use case separately. Higher power components may be desired if ambient lighting levels are high and/or if a larger number of views are desired. In an embodiment, head or eye tracking is used in determining the position of one or several viewers, the switching of the lighting beam is synchronized to the DMDs so that the image is projected only to necessary directions, making it possible to save energy. The DMD components could continue with their standard movements and the light engine be switched on and off. In embodiments wherein the first DMD pixels are used for color generation, the light engine can be made with a single high-energy white LED. The illumination efficiency is lower as some of the emitted light is absorbed by the color filters.

One example DDMD-LFIE design supports a multi-view light field only in the horizontal direction. However, in some embodiments a row of primary DMDs is imaged on top of the second DMD instead of only a single first DMD. In such an embodiment, it is possible to project different images also to the vertical directions as the different spatial positions of the multiple primary DMDs are transformed into different angular directions. In this case, the DMD micromirror tilting angles and component sizes limit the number of primary DMDs that can be positioned side-by-side and imaged onto the secondary DMD.

In another embodiment that generates vertical views with the DDMD-LFIE, the micromirrors of the second DMD comprise a micro-optical structure (e.g., grating) that reflects sub-pixels imaged from the first DMD to different vertical directions. As the second DMD mirrors sweep through their angular range in the horizontal direction, the separate images projected to different vertical directions sweep through different vertical planes simultaneously. In addition to the two mentioned methods based on the DDMD-LFIE only, it is also possible to generate unique views in two dimensions by utilizing a screen as disclosed herein at the optical system level. This embodiment is described below in relation to a system level approach.

Figure 16A:
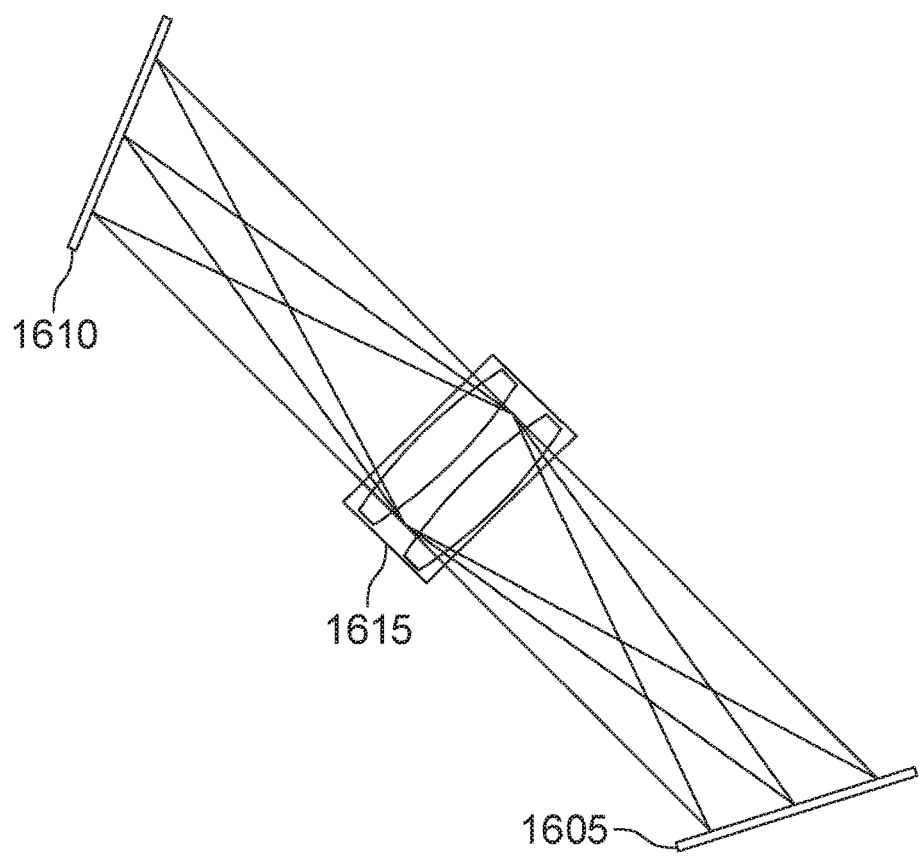
FIGS. 16A-16B depict various example magnification ratios between a first DMD and a second DMD, in accordance with an embodiment.
Figure 16B:
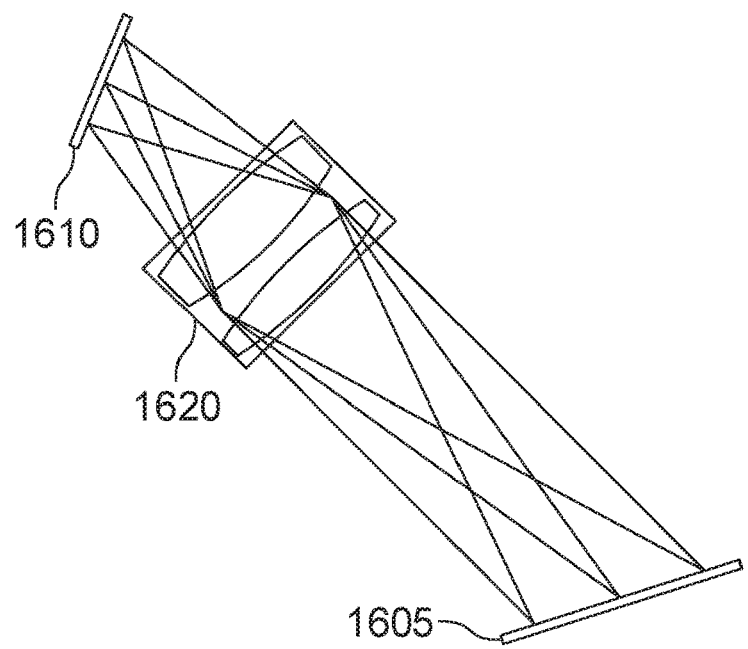

FIGS. 16A-16B depict various example magnification ratios between a first DMD and a second DMD, in accordance with an embodiment. FIG. 16A is an illustration of a first DMD 1605, second DMD 1610, and an imaging lens 1615 having a magnification ratio of 1:1. The size of the first DMD image is the same as the size of the first DMD component itself. In this case, the individual pixels of the first DMD have a size that is fitted to the size of the second DMD pixels. For example, if the second DMD has 30 µm×30 µm pixels and the first DMD has 15 µm×15 µm pixels, then four smaller sub-pixels would be imaged on top of one larger pixel of the second DMD. And if instead, the first DMD has a pixel size of 10 µm, then nine sub-pixels would be imaged on top of one pixel of the second DMD.

The first DMD can be imaged onto the second DMD with different magnification ratios. FIG. 16B is an illustration of a first DMD 1605, second DMD 1610, and an imaging lens 1620 having a magnification ratio that is not 1:1. In the embodiment shown in FIG. 16B, the magnification ratio differs from 1:1 and there is no longer a need to select pixel sizes of the two DMDs that complement each other. The image pixel size is adjusted via the imaging lens magnification ratio. For example, if the first DMD comprises a 4K matrix (4096×2160) with 20 µm pixels, it could be imaged on top of a second DMD having a Full HD resolution (1920×1080 pixels) and pixel size of 30 µm by using an imaging lens that has magnification ratio of 1:0.75. The 20 µm pixels of the first DMD would have an image size of 15 µm (20 µm×0.75), it follows that four smaller pixel images could be mapped on top of the single pixel in the Full HD matrix of the second DMD. In some optical arrangements, it may be possible to leave out the imaging lens altogether e.g., if the light engine is able to produce extremely well collimated beams and the image modulation made with the first DMD can be maintained in the projected beam all the way to the surface of the second DMD. However, the imaging lens in between the DMD adds beneficial design and component selection flexibility.

The first DMD is imaged a small spatial offset along the imaging optics axis direction away from the exact location of the second DMD surface. This allows the DDMD-LFIE to use the second DMD for pixel image positional scanning. Without the small spatial offset, the second DMD tilting mirrors would not be able to create adequate shifting of the virtual pixel positions. With no offset, the projection lens would re-image the pixels to almost exactly the same locations despite different mirror tilt angles. A suitable spatial offset in dependent on the second DMD mirror size and imaging optics Numerical Aperture (NA). If the offset is too large, the images of the first DMD mirrors will be blurred outside the second DMD micromirror apertures causing cross-talk between pixels. With larger second DMD pixels and smaller imaging optics NA, the offset distance can be made longer, resulting in a larger shift in virtual pixel positions as the second DMD mirrors tilt. An example design is presented in FIGS. 20A-20B, discussed below.

FIG. 17 depicts a schematic presentation of an example structure of an LF projector device 1700, in accordance with some embodiments. The LF projector device 1700 may include a DDMD-LFIE 1705 and a projection module 1740. The DDMD-LFIE 1705 may include a light engine 1710, a first DMD 1715, a second DMD 1720, and a light trap 1725. The projection module 1740 may include projection optics 1745 (e.g., lens) and an angle expanding element 1750. The projection optics 1745 may include a projection lens, to project the images created by the DMDs to a viewing surface. The projection optics 1745 may also use a relay lens that is used in combining the different LF images into an intermediate virtual light field image, which is then easier to project to the viewing surface with a reasonable projection lens design. The angle expanding micro-optical element 1750 may be used in the projection module 1740 to expand the FOV (1755), and project a larger picture from a shorter distance.

Figure 18:
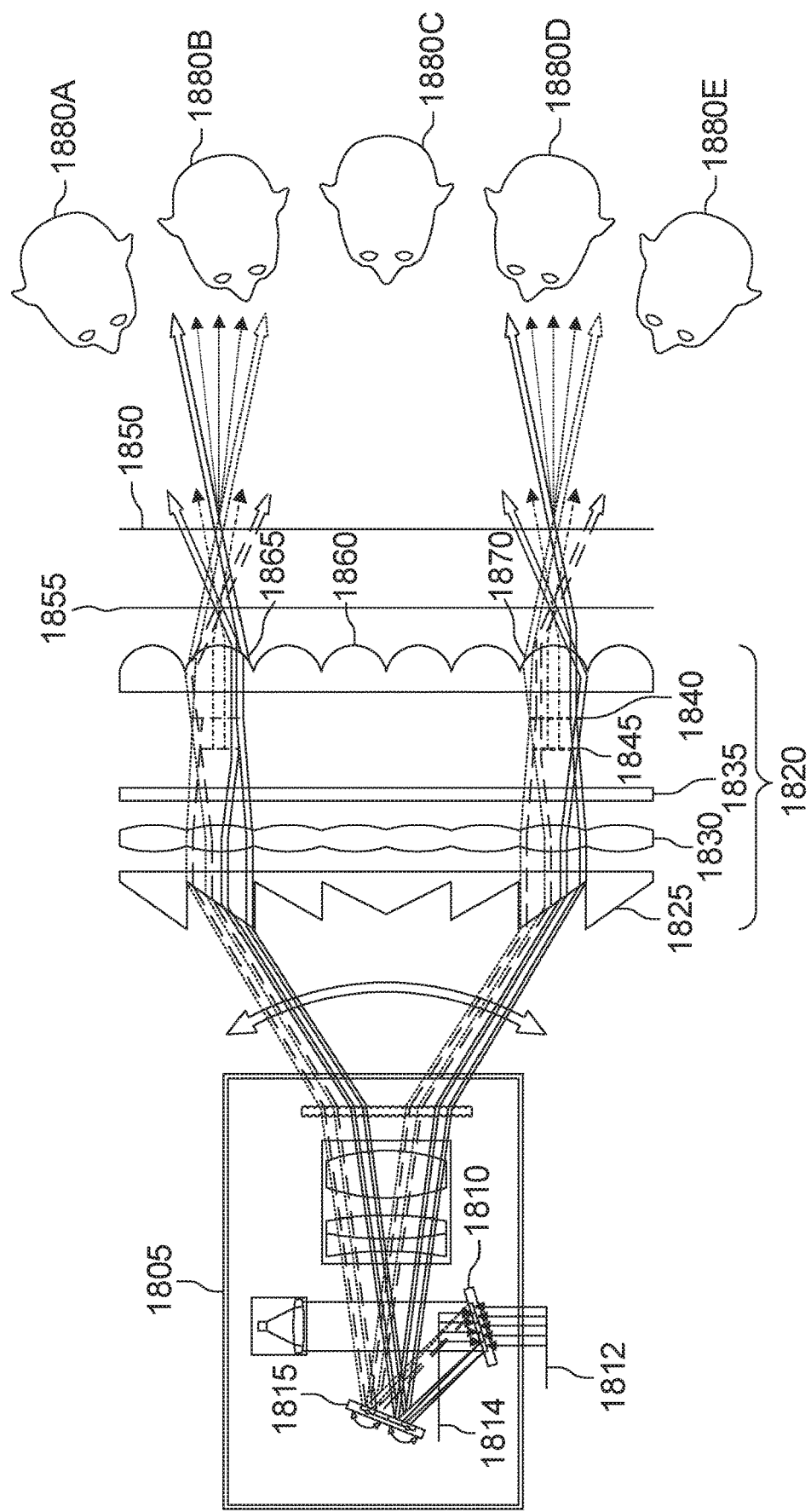
FIG. 18 depicts a schematic presentation of an example light field projection system employing the light field projector device of FIG. 17 and a transmissive rear-projection screen, in accordance with an embodiment.

FIG. 18 depicts a schematic presentation of an example LF projection system employing an LF projector device 1805 (such as the one depicted in FIG. 17, reproduced in part in FIG. 18) and a transmissive rear-projection screen 1820, in accordance with some embodiments. In order to use the LF projector device containing the DDMD-LFIE in a whole optical system for multiple viewers, a projection screen 1820 may be used. The screen 1820 may include an angle adjusting element 1825, a focusing lens element 1830, a light diffusing element 1835, and a lens sheet 1860.

A set of LF sub-images generated with the DMDs 1810 and 1815 is projected from the projector device 1805 to the screen 1820 at slightly different angles. The screen 1820 has an angle adjusting element 1825 that turns the propagation directions of each sub-image towards the main viewing direction. This element can be, for example, a molded plastic Fresnel lens or foil with embossed microprisms. A separate focusing element 1830 may be used to bring the pixels into focus behind a lenticular lens sheet 1860. This focusing element 1830 may be, for example, a molded array of microlenses or an embossed foil with diffractive structures. Focusing may also be carried out by a projection lens inside the projector device 1805 (see related discussion of FIG. 17), and in some cases the focusing element 1830 in the screen may not be required. A light diffusing element 1835 may homogenize the imaged virtual pixel matrix and help reduce (i) image artifacts connected to the angle adjusting and focusing element features (e.g., fill-factor), as well as (ii) small discontinuities between different projected sub-images. When only horizontal views are needed for a particular use case, some of the screen light manipulating elements may be one-directional (e.g., grooves) to reduce costs, but if both horizontal and vertical views are to be used, the screen structures should similarly be two-dimensional. In one embodiment, all the optical functions of the different screen elements may be integrated into one holographic/diffractive sheet. The sheet can be made flexible, for utilization in particular real world scenarios.

A front part of the screen 1820 (e.g., lenticular lens 1860) is visible to the viewers (1880A-1880E), as shown in FIG. 18. The lenticular lens 1860 may act analogously to a lenticular lens structure as used in standard multi-view autostereoscopic systems. The image of a pixel row behind the lenticular lens sheet (e.g., the images 1840 and 1845 of DMD pixel rows 1812 and 1814) behaves as a Light Field Pixel (LFP) analogous to a set of LCD display sub-pixels in a standard multi-view setup. Different view directions are created when the individual lenticular lenses (e.g., 1865 and 1870) of the lens sheet 1860 project the spatially separated virtual pixels to the viewing space in front of the viewers. When the DDMD-LFIE is used to produce more than one focal plane for the projected pixels, the different depth locations of the pixel focal planes are transformed into different virtual focal planes (e.g., first virtual focal plane 1850 and second virtual focal plane 1855) in the projected light field. This is depicted in FIG. 18, where a first pixel row 1812 on top of the first DMD 1810 is imaged behind the front microlens sheet 1860 as a row of virtual pixels 1840, which are then projected by the lens sheet 1860 towards the viewers (1880A-1880E) creating a first virtual focal plane 1850. In a similar manner, a second pixel row 1814, which in this example is interlaced with pixel row 1812 on the first DMD 1810, is imaged (1845) to another depth location behind the screen's front lens element 1860. Because the depth location of the image 1845 of the second pixel row 1814 is further away from the lens element 1860 than the first pixel row image 1840, a second virtual focal plane 1855 is created within the viewer space between the first virtual focal plane 1850 and the screen 1820.

Figure 19:
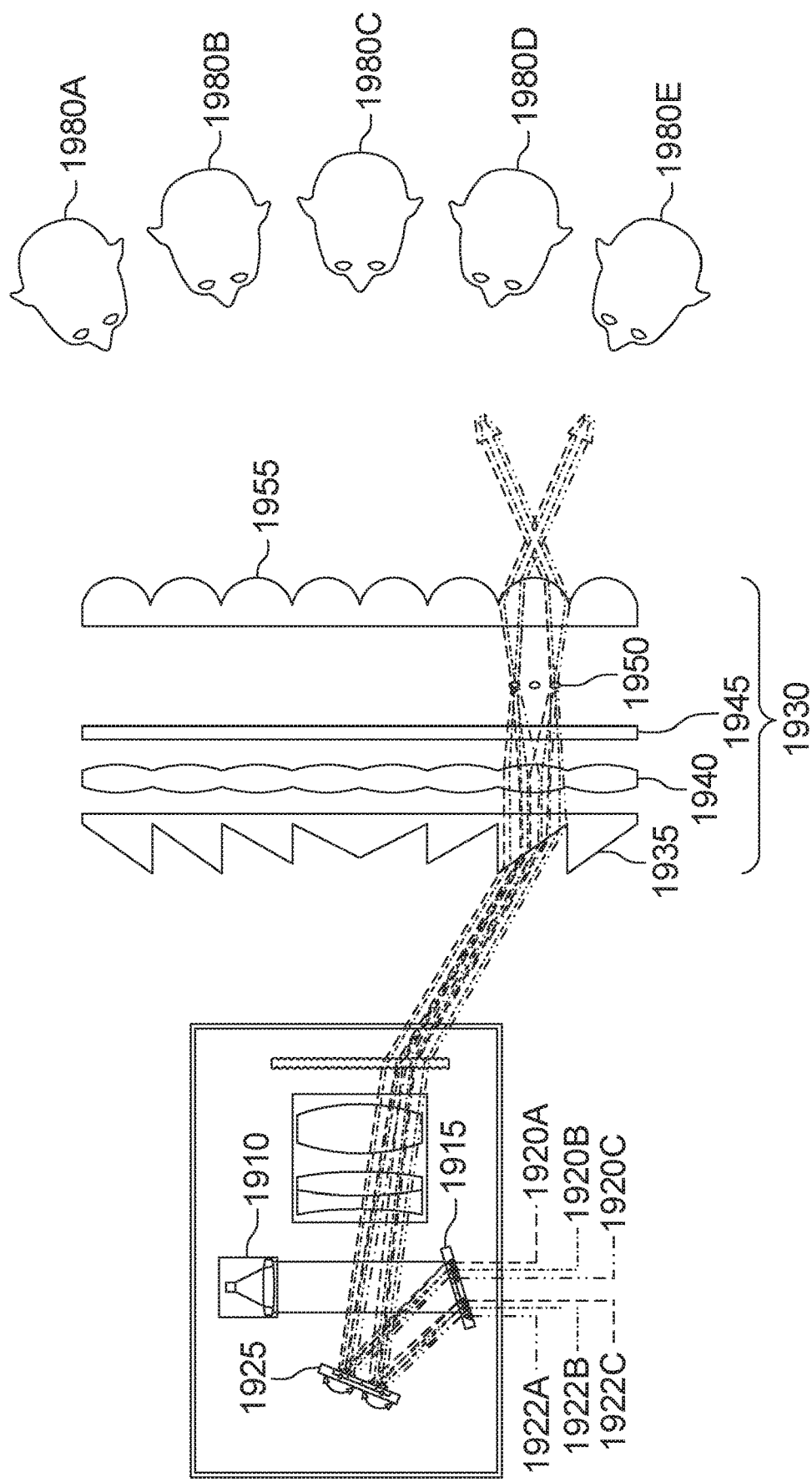
FIG. 19 depicts a schematic presentation of an example color combination method in the light field projection system of FIG. 18, in accordance with an embodiment.

FIG. 19 depicts a schematic presentation of an example color combination method which may be used with the LF projection system of FIG. 18, in accordance with some embodiments. This example color combination approach illustrates an alternative way for using a Double DMD structure at an LF optics system level. As shown in FIG. 19, a sub-pixel matrix is used for combining different colors into several full-color images. The light engine 1910 contains only one high-power white illumination LED and the first DMD component 1915 has micromirrors that are coated with red, green, and blue dielectric color filters that reflect only the three primary colors. As three neighboring, colored "pixels" (e.g., a red "pixel" 1920A, a green "pixel" 1920B, and a blue "pixel" 1920C) on the first DMD 1915 are imaged on top of a single larger micromirror on the second DMD 1925, the colors are all projected to the same direction simultaneously by the shared pixel on the second DMD 1925. Another set of sub-"pixels" 1922A-1922C may operate similarly. The projection lens positioned in front of the second DMD 1925 collimates the sub-pixels into separate beams that hit the projection screen 1930 at different locations. The first portion of the projection screen 1930 (e.g., angle adjusting, focusing, and diffusing elements 1935, 1940, and 1945, respectively) focuses the beams back into a row of pixels. In that process, it directs the beams of the individual colors to the same spatial positions forming a row of full-color pixels 1950 behind the lens sheet. Combining the three color pixels into one full-color pixel is accomplished either by using physical optical structures (e.g., prism, diffractive structure, etc.) or with the help of a color rendering scheme, wherein the different colored sub-pixels are activated at slightly different time intervals and the counter-balancing angular movement of the second DMD 1925 micromirror causes the sub-pixel images to overlap near the screen 1930. These full-color pixel images then act as the image generation elements (LFPs) behind the front lens sheet 1955. Each virtual pixel location, in the direction of the display plane, is transformed into an angle projected from the screen to one view direction. As the second DMD 1925 scans through its angular range, it also scans through the different projection screen positions and a full light field image is formed to multiple viewers (1980A-1980E).

The LF projector device of FIG. 17 may be employed with a reflective front-projection screen, as shown in relation to FIG. 11, in accordance with some embodiments.

In some existing multi-view systems, the number of sub-pixels and with it the number of projection directions is fixed to and limited by the number of pixels available in the display (e.g., LCD-panel). In the herein set forth projector systems and methods based on the DDMD-LFIE, the fast modulating mirror matrices of the DMDs create a denser "virtual" display behind the lenticular structure. Temporal multiplexing (e.g., angular sweeps of the second DMD micromirrors) and spatial multiplexing (e.g., modulation of the first DMD pixels) can be simultaneously applied in numerous different ways. The LF system spatial and angular resolution requirements are different for different sized screens, number of users, brightness levels, etc., and are fundamentally tied to the particular use cases. For example, the same projector device could be used for showing a 3D light field image to a single user sitting at a 1 m distance from the screen, or to a group of people standing at a 5m distance from a large projection canvas. The change between these two use cases may involve selecting a different size screen and entering corresponding settings for the screen size, resolution targets etc.

The 3D LF image rendering scheme is dependent on the selected parameters for the use case and hardware. Some of the possible trade-offs between system level performance parameters can be made by changing the rendering settings (without the need to change hardware). This is because distinct optical functions are carried out by different components. One example trade-off situation is between spatial resolution and a number of unique views. If more first DMD pixels are imaged on top of the second DMD mirror, it is possible to project more unique views or focal planes simultaneously, but at the cost of decreased spatial resolution—the total number of pixels available in the first component is limited. As the second DMD mirrors sweep through their path, the first DMD can simultaneously be modulated with different rates, permitting interlacing by altering the control signals for the micromirror components. Context adaptive rendering methods can be used for improving, e.g., image brightness and/or power consumption. Furthermore, various embodiments may apply super-resolution algorithms to the rendering scheme in order to increase spatial resolution that would otherwise be limited by the properties of the DMD matrixes and imaging system.

From the point-of-view of the viewers, the DDMD-LFIE and projection optics can be positioned behind the screen for transmitted images or in front of the screen for reflected images. The back-illuminated screen makes it possible to create a "projection TV"-like device that has all the necessary components in one package, whereas the front-illuminated screen enables a product closer to the display arrangement of a home theatre system. Screen designs set forth herein may expand or reduce the angular range of the light field generated by a DDMD-LFIE in order to make the 3D image viewable from larger or smaller angles. Such a screen can be constructed, e.g., from two microlens or lenslet components that have different focal lengths. The lens structures may be mounted so that the distance between them is equal to the sum of their focal lengths.

As the second DMD micromirrors sweep through the angular space continuously, the DDMD-LFIE generates a very dense light field. Perception of a 3D scene calls for at least two different viewpoints to be projected towards the viewer, one view for each eye. The example DMD device is capable of very high refresh frequencies and the reflected images can be projected continuously to the viewing space. In some embodiments, the system projects more than one image to the pupils of one viewer. In such embodiments, the person is close enough to the screen and the DMD refresh frequency is adequate. These embodiments fulfil the "super-multi-view" condition and can provide the viewer a more natural viewing experience. As mentioned previously, the DDMD-LFIE can also be used for generation of more than one focal plane, which would enable virtual images at different depth distances from the viewers and more natural retinal focal cues.

Requirements for the second DMD micromirror refresh rates are fairly low as this component is used only for scanning the images generated with the first DMD across the projection screen. The human eye can see a flicker-free image if the display refresh rate is ~60 Hz. This figure can be used as the minimum for the second DMD refresh rate as it sweeps across the display surface 60 times each second in order to create the appearance of a continuous video image. However, somewhat faster rates will be employed in most embodiments to create time for the color rendering. This, of course, can be adjusted according to the selected rendering scheme. 60 Hz is easily achievable with current DMDs. To control the micromirror angular sweeping, in one embodiment, high-frequency control electronics are connected to a DMD. In some embodiments, mirror tilt angles may be synchronized with the first DMD component. In another embodiment, the tilts can be applied in a step-wise fashion where the second component micromirrors are stopped at intermediate positions between extreme tilt angles.

The first DMD component may have a faster refresh rate than the second DMD. The first DMD may be used for the modulation of virtual pixels near the projection screen. The number of unique view directions and achievable spatial resolution depend on the speed at which the image can be modulated relative to the period of the sweep cycle of the second DMD.

Figure 20A:
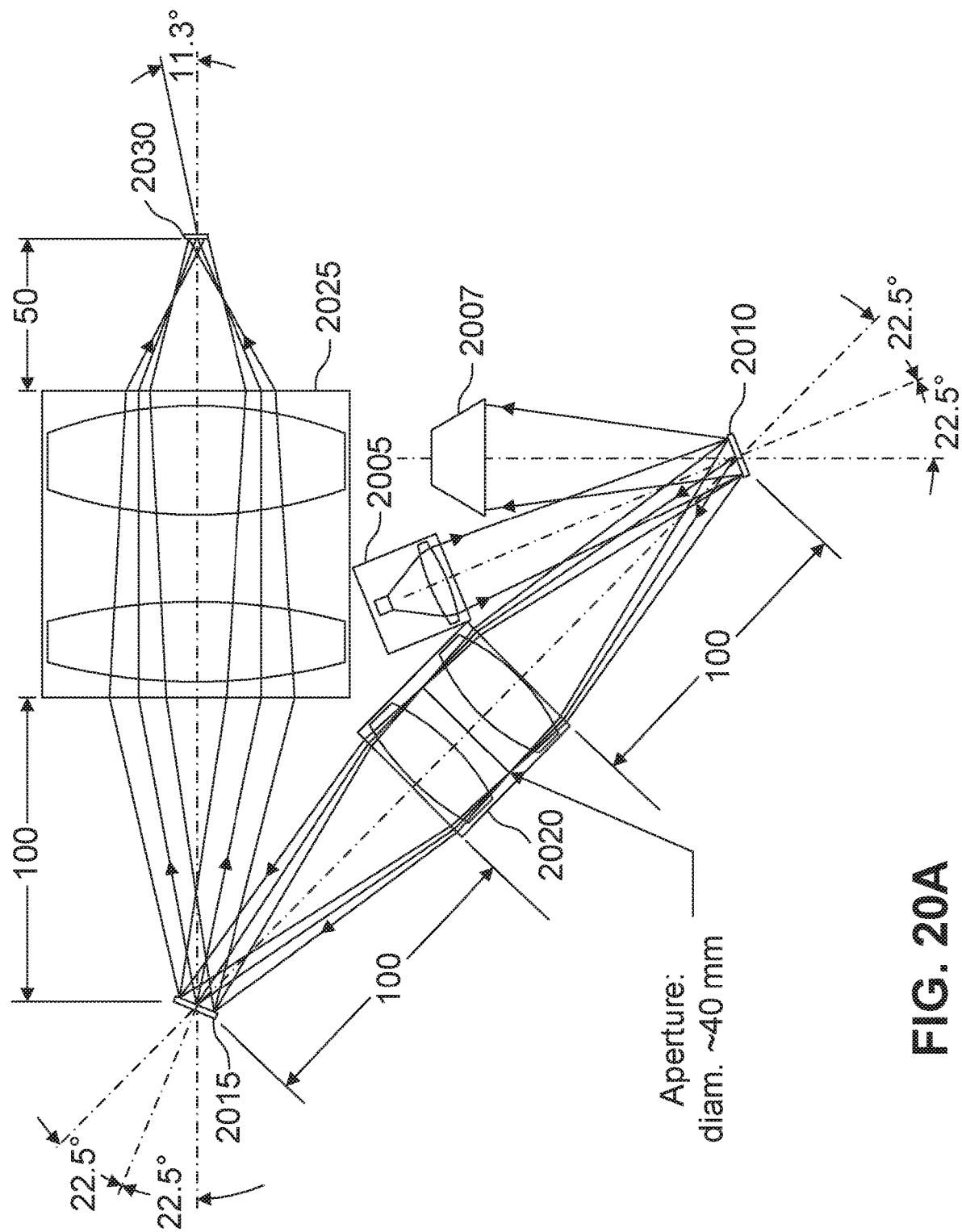
FIG. 20A depicts an example DDMD-LFIE, in accordance with an embodiment.

FIG. 20A depicts an example DDMD-LFIE for use in a full 3D LF projection system, in accordance with some embodiments. In the example projection system, the target screen size in this example corresponds to a 26" monitor (not shown) and a target spatial resolution on the screen surface is HD ready (e.g., 1280×720 pixels). The system uses two DMD (2010, 2015) components and a light engine 2005 that produces white light illumination. The first DMD 2010 micromirrors are coated with separate color filters and the pixels reflect red, green, and blue light when illuminated. A lens 2020 images the first DMD 2010 on top of the second DMD 2015, which then scans the pixel images through an angular range. A relay lens 2025 positioned after the second DMD 2015 makes an intermediate image of the pixel matrix, which can then be imaged with a separate projection lens onto a screen. This intermediate image plane 2030 is the interface between the DDMD-LFIE module and projection module.

A single viewer is positioned at a 1m distance from the screen. The screen directs the multi-view images generated with the DDMD-LFIE and projection optics towards the viewer in a rear projection manner. Multiple images from different view directions of the same 3D content are directed to the viewing zone of the single user, and the user is able to see a 3D stereoscopic image. Example rendering schemes may be used for the creation of the multi-view full-color images.

The first DMD 2010 may have a 4K matrix (e.g., 3840× 2160 pixels) of micromirrors with a pitch of 3 µm, and the second DMD 2015 may have a 720p High Definition (HD) matrix (e.g., 1280×720 pixels) with 9 µm pixel pitch. An array of nine micromirrors of the first DMD component 2010 is imaged on top of one single micromirror in the second DMD 2015. The surface areas of the mirror matrixes are the same (11.52 mm×6.48 mm), therefore the example imaging lens produces a magnification ratio of 1:1. This can be achieved e.g. with a lens that has a focal length of ~67.50 mm and aperture diameter of ~40.10 mm (f# 2.5) positioned at ~100 mm distance from the two DMD components. To provide space for the light engine and light trap, the first DMD is tilted by 22.5 degrees with respect to the optical axis of the imaging lens. The second DMD is tilted with the same magnitude angle, but in the opposite direction. This ensures that the tilted image plane of the first DMD is parallel to the surface of the second DMD and the smaller pixels are accurately mapped on top of the larger pixels. Still, the image plane is positioned at ~15 µm nominal distance from the mirror matrix surface in order to be able to shift the apparent positions of the smaller pixels with the tilting action of the larger mirrors. This is discussed further in the upcoming description of FIG. 20B.

The first DMD is illuminated with a light engine that includes a single high-brightness white LED and light collimation optics. The light engine generates an illumination beam that covers the whole micromirror matrix surface area and has a NA value of at least 0.21 in order to be able to fill the whole aperture of the imaging lens (f# 2.5) between the two DMDs. A micromirror tilt angle of ±11.25 degrees directs the reflected beams either to the aperture of the imaging optics or to the light trap 2007, depending on the image content.

A relay lens positioned after the second DMD generates an intermediate image of the pixel matrix, which is then re-imaged with a projection lens onto a screen. The relay lens used in the example system has a focal length of ~10 mm, the second DMD is positioned 100 mm from the relay lens, and the intermediate image is 50 mm from the relay lens, creating a magnification ratio of 1:0.5. The intermediate image is positioned on a virtual plane that is now tilted by ~11.3 degrees away from the optical axis of the relay lens. This tilt manifests because the second DMD surface is also tilted. This image plane can be used as an interface between the DDMD-LFIE module and a projection module. The same DDMD-LFIE can be used together with different kinds of projection lenses in order to create different kinds of LF projection systems. In one embodiment, an LF projection device containing the DDMD-LFIE module and projection module comprises a mounting option for interchangeable projection lenses suited for different use cases. This is possible because the intermediate image plane already contains the full 3D light field image information.

Figure 20B:
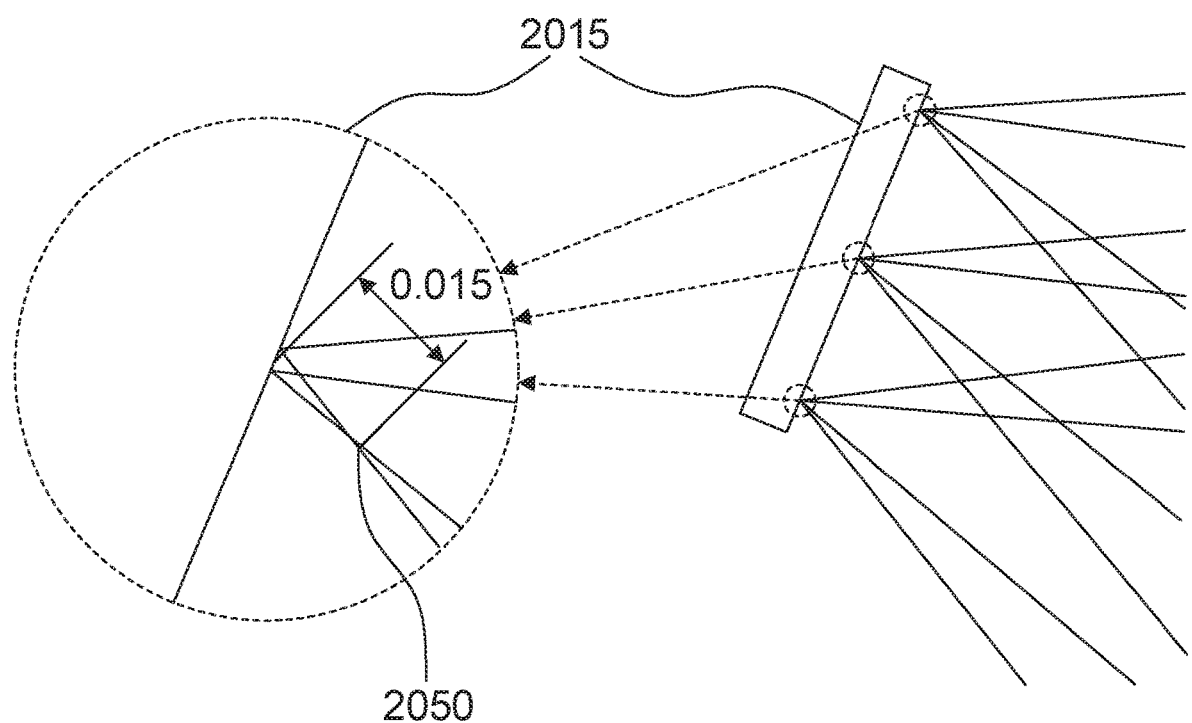
FIG. 20B depicts a zoomed in view of the second DMD of FIG. 20A, in accordance with an embodiment.

FIG. 20B depicts a zoomed in view of the second DMD of FIG. 20A, in accordance with an embodiment. It provides a close-up view of the first DMD image focal points 2050 at 15 μm distance from the surface of the second DMD 2015. The image plane is positioned at ~15 μm nominal distance from the mirror matrix surface. This causes the tilting action of the larger mirrors to shift the apparent positions of the smaller pixels. Without this small distance, the second DMD 2015 mirror tilting would not cause enough movement of the mirrored virtual positions of the first DMD mirrors at the center of the second DMD mirror 2015 as they would be too close to the rotation axis. The relay and projection lenses would image the virtual pixels to the exact same positions on the screen. This does not apply to the first DMD micromirrors that are imaged to the edges of the second DMD 2015 mirrors as there is always some distance between the image and mirror when the larger mirror tilts around its centrally located axis. This distance changes as the second DMD mirror 2015 tilts, but does not affect the optical quality as the mirror is flat and fully reflective. The distance between the first DMD image 2050 and second DMD 2015 surface is so small that the image blurring occurring on top of the second DMD 2015 mirrors does not affect the pixel mapping excessively as long as the Numerical Aperture (NA) for the light engine illumination and imaging lens is kept small enough. A suitable NA is in the range of ~0.21 for this particular example.

Figure 21:
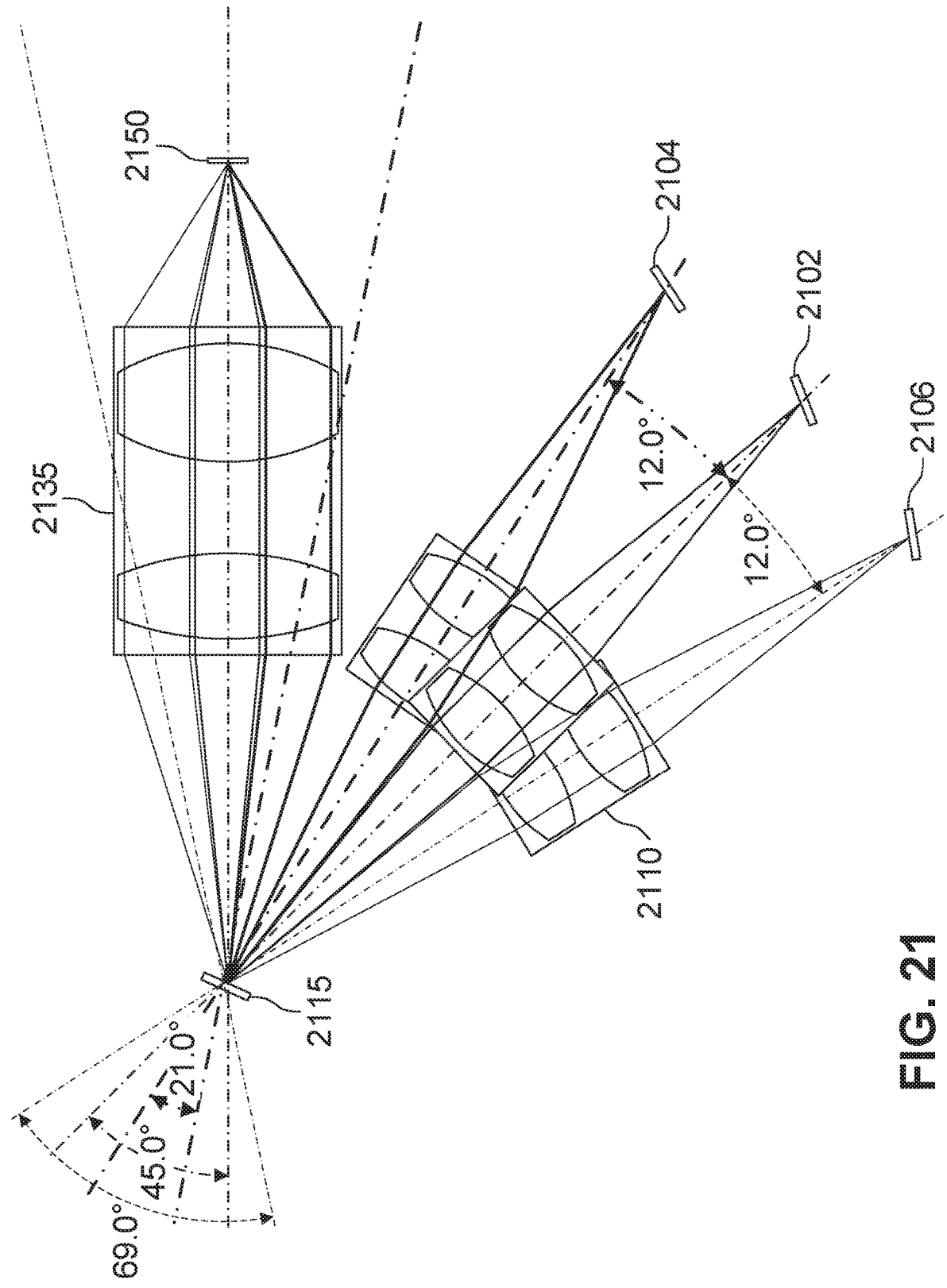
FIG. 21 depicts the DDMD-LFIE of FIG. 20A and various virtual images corresponding to various second DMD tilt amounts, in accordance with an embodiment.

FIG. 21 depicts the DDMD-LFIE of FIG. 20A and virtual images corresponding to various second DMD 2115 tilt amounts, in accordance with some embodiments. The DDMD-LFIE is depicted at three different stages of optical functioning. As the second DMD 2115 micromirrors tilt through their angular range, the virtual position (2104, 2106) of the first DMD 2102 micromirrors change. At extreme positions, the tilted beams fill the whole aperture of the relay lens 2135. The relay lens 2135 images the different virtual positions to the image plane 2150, and the spatial locations of image pixels correspond with the tilt angles (2104, 2106). This makes it possible to scan the image pixel locations through a small distance with the second micromirror 2115 rotations. In the presented example, a ±12 degree mirror tilt causes (in the intermediate image plane) one sub-pixel position to scan through a range of three side-by-side sub-pixels.

Figure 22:
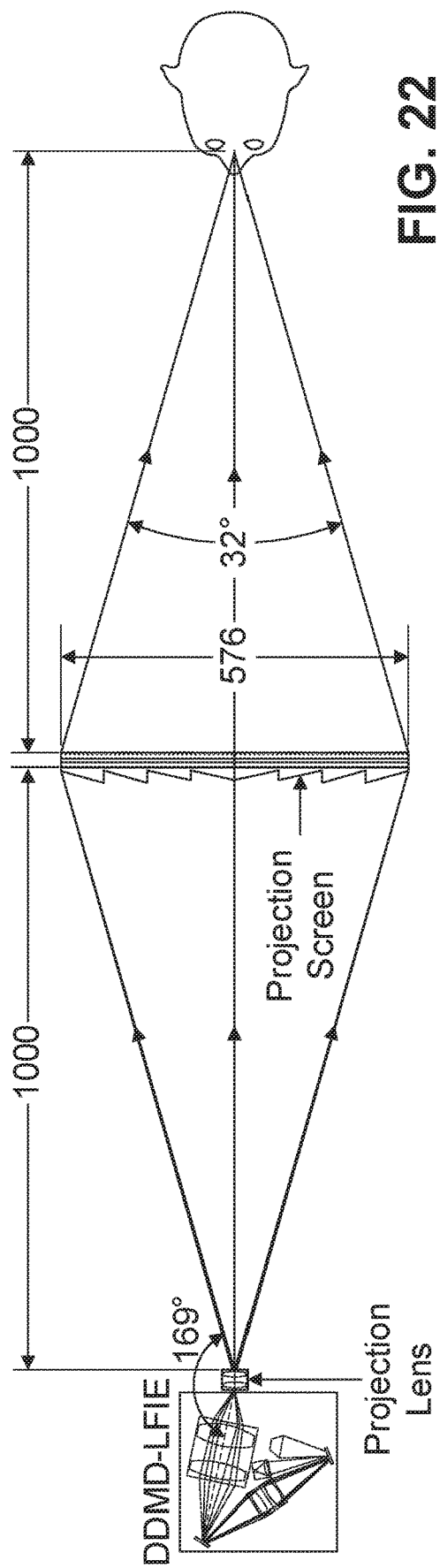
FIG. 22 depicts the DDMD-LFIE of FIG. 20A, a projection lens, and a projection screen, in accordance with an embodiment.

FIG. 22 depicts the DDMD-LFIE of FIG. 20A, a projection lens, and a projection screen, in accordance with an embodiment. In addition to the DDMD-LFIE, an example full 3D LF display systems uses a projection lens and a screen. FIG. 22 shows the schematics and geometry of one example projection system. A DDMD-LFIE generates a series of images that are imaged forward from the intermediate image plane to a projection screen with a projection lens. As the image plane produced with the image engine is tilted, the optical axis of the projection lens is tilted with respect to the relay lens optical axis. However, a micro-patterned diffuser or angle tilting element could be positioned here to straighten the optical path. If the projection lens has a focal length of ~10 mm, total magnification from the DDMD-LFIE and projection lens combination is approximately 50:1, achieved from the first DMD to the screen. This means that from a distance of 1 m, the projected image covers an area of 576 mm×324 mm, which corresponds to a 26" monitor. The screen in FIG. 22 has a 500 mm focal length Fresnel lens that re-focuses the projected beam to a 1 m distance in front of the screen. A single viewer positioned at this distance would see an image, which would span a horizontal FOV of ~32 degrees.

Figure 23:
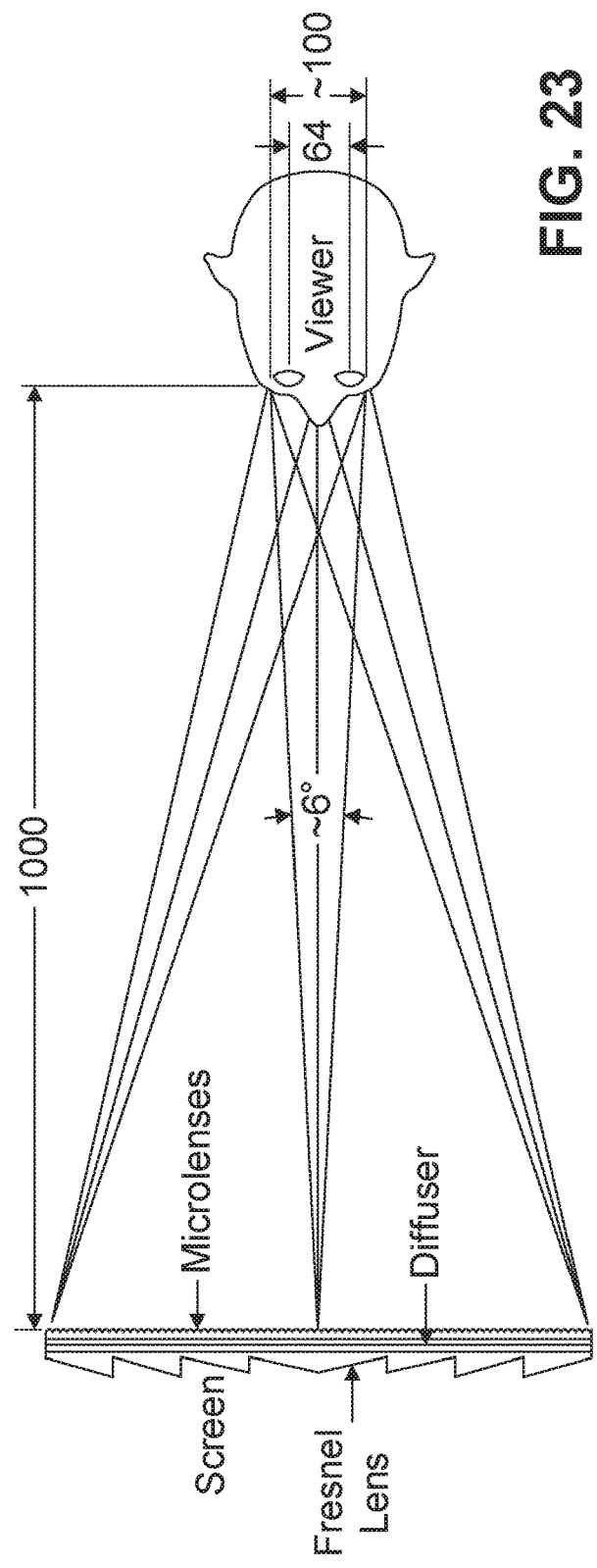
FIG. 23 depicts a schematic presentation of the structure and geometry of the projection screen of FIG. 22, in accordance with an embodiment.

FIG. 23 depicts a schematic presentation of the structure and geometry of the projection screen of FIG. 22, in accordance with an embodiment.

The projection screen comprises of three main parts: a Fresnel lens that directs the multi-view images to the viewer location, a holographic diffuser that diffuses the projected image pixels in the vertical direction but not in the horizontal, and a lenticular sheet that projects the pixel images to different angles in the horizontal direction. All of these components can be made very flat and stacked to form a screen, which can have total thickness below 10 mm. The system is intended for a single user only as the LF image is projected from the screen to a specific viewing window in front of the screen. The multiple views of the same 3D scene are generated only in the horizontal direction as the second DMD in the present example does not have ancillary scanning elements for the vertical direction.

FIGS. 24A-24B illustrate diffraction caused when an image is projected onto the projection screen of FIG. 22, in accordance with an embodiment. With the optical system's total magnification of 50:1, a single first DMD pixel will be imaged geometrically to the screen as a spot that has ~150 μm diameter. However, diffraction somewhat blurs the edges (the exterior tail ends) of this spot as shown in FIG. 24A. With the described f# 2.5 imaging system, the airy disc radius for green (550 nm) light is ~80 μm and the imaged spot's full-width-half-maximum value is ~220 μm. With blue (450 nm) pixels, the spot sizes are a bit smaller as the airy disc radius is ~60 μm and with red (650 nm) pixels the spot sizes are larger as the airy disc radius is ~100 μm. Neighboring pixels will be imaged to the screen with 150 μm pitch, which means that there will be some overlap between the spots as shown in FIG. 24B. The center location of a single spot on the screen will be shifted by ±150 μm when the second DMD micromirror tilts with an angle of ±12 degrees. This means that the single pixel image is scannable over the width of ~450 μm on the screen, equivalent to the combined width of three side-by-side pixels. The microlenses (lenticular sheet) at the front of the screen have a pitch of 0.45 mm, thereby covering the range of three neighboring pixels. These lenses form projector cell structures (or LF pixels) that are able to project pixel images to different directions. A 576 mm wide display would have 1280 of these projector cells side-by-side in the horizontal direction. This would make the presented optical system correspond to a 26" HD ready display with 1280×720 LF pixels.

In this real-world example, pixel images are projected to the screen microlens apertures as well-collimated beams with a ~0.004 NA and a ~220 nm diameter. In the example screen presented in FIG. 23, the microlens focal length is 4.5 mm and the pixel beams are projected out of the screen microlens aperatures with a divergence angle of ~3 degrees. At a 1 m distance from the screen, the beam generated from a single pixel will have maximum width of ~57 mm. A single pixel projected from a single location behind the lenticular screen can be viewed only inside this horizontal viewing window. As the average human interpupillary distance is ~64 mm, the single pixel projected from the screen to a single direction will be visible only to one eye at a time. When the second DMD micromirror scans the ±12 degree angular range, the projected pixel image will shift behind the microlens and the single pixel viewing window at 1 m distance in front of the screen will shift ~±30 mm from the central position. The total angular range covered by the single beam width and scanning range is ~6 degrees. This means that the image of a single pixel can be viewed inside a total viewing window that has ~100 mm horizontal width. This width can easily contain both eyes of a single viewer and it forms the total viewing window. A stereoscopic 3D image is formed by projecting two different images from the same 3D content to the two eyes separately. The presented system and optical method allows for this via the restricted single pixel viewing windows that can be scanned through the width of the two eyes.

In one embodiment, a full color image rendering method for the present system is carried out using color filters (e.g., dielectric thin films) processed on top of the first DMD micromirrors. Three different colors (red, green, and blue) are reflected from the mirrors under white LED illumination. The different color filters are processed on successive micromirrors side-by-side in the horizontal matrix direction. In the vertical direction, the color filters have different reflectance values. As an example, the reflectance values could be arranged such that if the first pixel reflects light with a relative intensity of 1, the second pixel reflects with an intensity of 5, and the third with an intensity of 25. This arrangement makes it possible to use, for example, only two different illumination intensity levels of the white LED for the creation of relative intensity value series of 1, 2, 5, 10, 25, and 50 from the colored array that has 3×3 pixels. In a similar way, four different LED intensity levels (1×, 2×, 3×, 4×) can be used to create a relative intensity series up to a value of 310 (1+5+25=31; 1*31+2*31+3*31+4*31=310). This means that when these intensity intervals are combined by activating the correct first DMD pixels in the correct sequence at the right times, the appearance of a single LF pixel on the screen can be switched between 310 different intensity levels and three different colors.

The herein described hardware-based rendering scheme teaches that a full 24-bit color image can be created with four second DMD mirror scans (or two back-and-forth scans) if the light engine is configured to produce four different illumination levels back-to-back in synchronization with the second DMD movement. A suitable scanning frequency for the second DMD is 120 Hz (two micromirror back-and-forth tilts between extreme values). The frequency creates a flicker free image for the human eye and combines the different colors within the POV timeframe. If a time delay of ~2.1 ms is introduced between successive activations of the first DMD colored sub-pixel micromirrors, the second DMD mirror horizontal sweeping action will cause differently colored sub-pixel images to overlap on the intermediate image plane and on the projection screen, creating a full-color virtual pixel. The white LED may be modulated between four intensity levels with a frequency of 240 Hz in order to synchronize it with the second DMD component. Both of these frequency values are well within the operating ranges of currently available components.

In embodiments wherein the system uses a multi-view rendering scheme, the sweeping movement of the virtual pixel behind the screen lenticular lens is used to generate multiple unique 2D images projected to slightly different viewing angles from the screen. As each pixel of these 2D images has been projected from a single LF pixel, they all have the same spatial resolution as the projector cell structure (1280×720). The higher resolution of the first DMD is not visible to the user as the three colored sub-pixels are combined temporally. In the horizontal direction and in the vertical direction the screen diffuser surface facilitates the integration of different reflected sub-pixel intensity values.

When the micromirror tilting action uses temporal multiplexing, the system is no longer limited by the spatial resolution of the DMDs. The number of unique views that can be generated with the example DDMD-LFIE is determined by the number of image modulation cycles that can be made with the first DMD considering the human visual system Persistence-Of-Vision (POV) phenomena and LED intensity modulation for color rendering. One currently existing DMD component having a 33 kHz binary frame rate is the Texas Instrument DLP7000. With this component as many as 138 (33000 Hz/(4 (sweeps)*60 Hz)) different 2D views of the same scene could be projected to the single user viewing window and it could be filled with views that are spatially offset only by ~0.7 mm (100 mm/138) from each other at the specified 1 m viewing distance. This means that at least 2 different views could be projected into the pupil of a single eye (minimum diameter 2 mm) within the human visual persistence timeframe, fulfilling the SMV condition for a single user.

Several different kinds of rendering schemes can be used together with the presented display structure and optical method. Depending on the selected rendering scheme, the realized display device can be either a multi-view display with a very dense grid of angular views or a true light field display with multiple views and focal planes.

In the multi-view rendering scheme each LF pixel projects one pixel of each 2D view from the same 3D scene. In this structure, the LF pixels are formed by the DMD pixel images projected near to the single lenses in the front lens sheet of the screen. The number of available sub-pixels (and number of generated views) in a single LF pixel depends on, e.g., the screen design (single lens size), number of DMD pixels and achievable modulation speed of the first DMD. In this rendering scheme, all pixels in one 2D directional image are created with virtual sub-pixels that are at the same relative positions inside the LF pixels. For example, all the upper right corner LF sub-pixels are projected towards a view that is positioned at lower left corner from the display center. The multi-view image field can be made denser by modulating the images in synchronization to the angular scanning action of the second DMD. As the first DMD modulates the smaller pixels at a very fast rate, the virtual sub-pixels of the screen LF pixel can be created without spatial limitations as the pixel row projected by the second DMD sweeps across the FL pixel aperture. This rendering scheme alone would not be able to provide the correct focus cues for the eyes as there would be only one rendered focal plane for each virtual sub-pixel depth layer. However, this scheme would be more straightforward to implement as the rendering would call for only a series of 2D views at small angular intervals. Since the hardware can be used for the creation of more than one virtual sub-pixel depth layer near the screen, it is also possible to generate more than one focal plane in the viewing space and provide the depth cues with this hardware based approach.

In a second, more demanding, true LF rendering scheme, the goal is to create several focal points or planes for the viewer(s) to observe, in front of or behind the physical display surface in addition to the multiple viewing directions. In this embodiment, the hardware does not have to be able to provide the multiple focal planes as they are created purely through the rendering method. This employs a different rendering approach compared to the approach discussed in the multi-view case because at least two projected beams will be generated for each 3D object point or voxel. For all voxels that are between the display and observer, the convergence beams should cross in front of the display at the correct voxel distance. Similarly, voxels positioned closer to the display than the observer have a beam pair virtually crossing behind the display. In the case where the 3D object pixels are exactly at the display surface, only one beam may be used. The crossing of the (at least) two beams is able to generate a focal point (or plane) that is not at the display surface only. In other words, the beams can create the desired true light field.

Because true LF rendering may involve heavy calculations, 3D data may be filtered/cropped to certain discrete depth layers that are close enough for the observers visual system to have a continuous 3D depth experience. Covering the visual range from ~50 cm to infinity would take about ~27 different depth layers, based on the estimated human visual system average depth resolution. The depth layers can be displayed temporally in sequence according to distance or they can be mixed and adapted on the basis of the image content. Observer positions could also be actively detected in the device and voxels rendered to only those directions where the observers are located. Active observer eye tracking by near infrared (NIR) light with cameras around or in the display structure may be employed for this task. In this rendering scheme, the multiple focal planes are created with the control software and the number of planes can be increased or reduced based on the need by configuring the software accordingly. From a hardware point-of-view, the main factors limiting the number of depth planes are the refresh rate of the first DMD and quality of single light beam collimation achievable with the combination of the DMD pixel size, device projection lens, screen lens sheet single lens aperture size and lens sheet optical quality.

The presented optical method can be applied to many different sized displays with different number of pixels. Selection of the right rendering scheme is dependent on the hardware limitations and use case. For example, in a wall-sized advertisement display in a well-lit area, the high light intensity means the single virtual pixels behind the screen lens sheet may be in the on-state for an extended period of time in order to provide higher brightness. This may lead to larger virtual LF sub-pixels as the second DMD sweeping action spreads the pixel images over a larger area and the projected beams coming out of the screen may have too large beam divergence for the true LF rendering scheme to work properly. A display may need to be viewable only from a large distance by multiple simultaneous viewers. In such a case, a multi-view rendering scheme would be more appropriate, as the long distance between viewers and the display suggests that the viewer's perception of depth will be less accurate and a dense multi-view display may create the 3D effect well enough. Another example is a smaller display for a single user created with a very dense virtual pixel layer. The virtual layer may comprise a large number of very small pixels with lower light intensities. In this case, a more complex, true LF rendering scheme may be utilized. The spatial resolution may be sufficient, and the large number of focal planes can be calculated for a single user direction and eyebox without demanding an excessive amount of computational power and data transfer speed.

One performance trade-off situation associated with both the true LF rendering scheme and the optical hardware is found concerning spatial/angular and depth resolutions. Given a limited number of DMD pixels and switching speed, one must choose whether to emphasize high spatial/angular resolution with the cost of lower number of focal planes or to have more focal planes for better depth effect with the cost of a more pixelated image. The same relationship applies to the data processing at the system level, as more focal planes call for more calculations and higher data transfer speeds. The human visual system naturally compresses depth information as objects get further away because depth resolution decreases logarithmically. At the same time, the eyes can resolve only larger details as the image plane moves further away. This makes it possible to design rendering schemes that produce, e.g., different pixel resolutions at different distances from the viewer, lowering the processing requirements for image rendering. All of these discussed tradeoffs connected to the rendering scheme can further be adapted on the basis of the presented image content, enabling, e.g., higher resolution or image brightness.

In order to render a full-color picture, three differently colored pixels may be combined. As described in the previous chapters the optical systems described herein can be used for this purpose. However, in some cases hardware properties may put restrictions on this process and another color rendering scheme is used. One scheme is to use the sweeping movement of the second DMD micromirrors as an added advantage by activating the differently colored sub-pixels at slightly different locations at slightly different times from each other. If the time intervals between red, green, and blue pixel activation are chosen correctly, the mirrors have just enough time to tilt to positions where all the three colored pixels are projected to the same direction. The sweeping motion of the mirror is counter-acted/balanced out by the synchronized sequential activation of spatially separated sub-pixels. The colors can be combined in the projector screen LF pixel by temporal multiplexing which introduces a small and imperviable time gap between the different colored image projections.

In some embodiments, there may be a method comprising: generating a light source at a light engine, wherein the light source is incident upon a first individually controllable pixel matrix of reflective elements; modulating the first individually controllable pixel matrix to redirect incident light towards either a second individually controllable pixel matrix of reflective elements or a light trap; modulating the second individually controllable pixel matrix to sweep its reflective elements across an angular range and redirect incident light towards a projection module at slightly different angular directions; and projecting the incident modulated light towards various directions via the projection module. The method may include wherein the light engine comprises one of RGB LEDs, laser diode(s), and illumination optics and is temporally modulated to render various RGB color combinations. The method may include wherein the light engine generates a white light source. The method may include wherein modulating the first pixel matrix is synchronized with angular orientations of the sweeping reflective elements in the second pixel matrix. The method may include wherein the first pixel matrix has more pixels than the second pixel matrix, and the first pixel matrix is imaged on top of the second mirror to generate a sub-matrix of individually addressable sub-pixels inside each larger reflective element of the second pixel matrix. The method may include wherein the second pixel matrix projects different sub-matrixes to different directions using a combination of temporal and spatial multiplexing. The method may include wherein the first pixel matrix is modulated at a higher frequency than the second pixel matrix. The method may include wherein the first and second individually controllable pixel matrixes are Digital Micromirror Devices (DMDs), and wherein: the first DMD has a larger resolution and modulation frequency than the second DMD; and the second DMD has precise spatial-temporal control over the slower modulated sweep angles. The method may include wherein the second pixel matrix projects different sub-matrixes to different directions as the reflective elements of the second pixel matrix sweep across the angular range at a relatively slower speed. The method may include wherein the light reflected by the first DMD passes through and imaging lens located between the two DMDs. The method may include wherein the first DMD is imaged at a small spatial offset from the second DMD surface to create adequate shifting of virtual pixel positions when the second DMD is modulated. The method may include wherein the projection module comprises a reflective screen. The method may include wherein the projection module comprises a transmissive screen. The method may include wherein the projection module comprises a lens. The method may include wherein the projection module further comprises an angle expanding element. The method may further include a relay lens combining different LF images from the second pixel matrix into an intermediate virtual light field image, wherein the virtual light field image acts as an interface between a Double DMD Light Field Engine and the projection module. The method may include wherein the reflective elements of the first DMD are coated with various polarizing films, modulating the first DMD further comprises controlling the polarization direction of each sub-beam, and a birefringent projection lens that images different polarization directions to different focal planes. The method may include wherein projecting the incident modulated light comprises projecting the incident modulated light onto a screen. The method may include wherein the screen comprises an angle adjusting element, a focusing lens element, a light diffusing element, and a lenticular lens sheet. The method may include wherein the sub-pixel matrix is used for combining different colors into several full-color images.

In some embodiments, there may be a method of displaying a 3D Multiview Image comprising: synchronized temporal modulation of a plurality of color illuminators having output light incident on a pixelated separately controllable matrix of reflective elements, wherein the reflected light becomes incident on a movable mirror assembly, or a light trap; the mirror assembly sweeping through an angle in a manor synchronized to both the color illuminator modulation, and the controllable matrix of reflective elements; and outputting the light reflected from the mirror assembly via a projection module. The method may include wherein image content is rendered, and presented to the display device in a temporally modulated manor so as to provide a plurality of separate views displayed within a plurality of visible-windows, each window being no larger than the typical human inter-pupillary distance. The method may include wherein image content is rendered, and presented to the display device in temporally modulated manor so as to provide a plurality of separate views to be projected to a holographic screen with a plurality of visible-windows, each window being no larger than the typical human inter-pupillary distance.

In some embodiments, there may be a Double DMD Light Field Image Engine comprising: a light generation means for providing a light source; an image modulation means, carried out at least in part by a first DMD and a second DMD, for modulating the light source; a projection means for sending the modulated light from the second DMD towards various directions; and a synchronization means for coordinating precise timing between the modules that carry out the image modulation. The Double DMD Light Field Image Engine may include wherein the image modulation means is carried out at least in part by modulating the light source at the light generation means.

Optical Functioning of Light Collimation Mirrors. Example embodiments presented in this disclosure make use of very small light collimating mirrors. Beams generated with light-collimating mirrors are typically very sensitive to positional errors. As a general rule, the better collimation quality is needed the more sensitive the system becomes. Parabolic shapes are usually ideal for collimating point sources, but they also have tight tolerances for positional errors and are prone to very large off-axis aberrations that occur with, e.g., extended sources. In some cases, if a collimated beam is desired, some aberration compensation may be performed, e.g., in the form of positional shift.

Mirror shapes can be manufactured in the small scale with many different methods, and there can also be different mirror designs that perform the same basic optical function. For example, some mirrors may have a traditional continuous shape that follows a parabolic equation, where the optical component is much thinner in the middle than at the edges. Such shapes are usually manufactured by grinding and polishing either directly to a glass or metallic substrate or to a mold that is then used for replication of the shape to plastic of glass materials. Some mirrors may have a Fresnel-type design in which the curved shape is divided into different zones or Fresnel rings. The basic idea is to make the component more flat, which is beneficial for the manufacturing of such shapes by replication. There are many different replication techniques that are able to produce the fine surface quality and shape accuracy required in optics. For example, injection molding and UV-embossing can be used for high volume manufacturing of extremely accurate optical shapes either as plastic pieces or even on plastic foils with roll-to-roll production lines. Some mirrors may appear totally flat on a macroscopic scale, but may feature a diffractive micro-structure on the surface to retain the same beam-collimating optical functionality. There are different manufacturing methods like, e.g., electron-beam lithography or reactive-ion etching that can be used for making the nanometer-scale structures needed in diffractive optics designs. These shapes can also be replicated with, e.g., UV-curable materials that can be deposited on top of any surface that has adequate adhesion to the material, making it possible to coat different surfaces with very thin optical structures.

Overview of a Mirror-Based 3D Display. Discussed herein are structures and methods for creating a 3D picture based on the use of small light-collimating mirrors and very small light-emitting elements. In an example embodiment, the light-emitting elements are bonded to a transparent window as a sparse array. They generate cones of light that hit collimating mirrors, and well-collimated beams of light are reflected back. As the light emitting components (e.g., μLEDs) are very small, they occupy only a relatively small portion of the substrate surface area on top of the mirrors, and most of the light in the beams goes past the emitters and exits the structure through the transparent window. A series of beams reflected from a single mirror towards different directions may be generated by using rows of light emitters with static mirrors or by using single emitters with angle scanning mirrors. When the size of the mirror is small enough, the emitter(s) and a single mirror can form one multidirectional display pixel (MDP) that is capable of projecting multiple well collimated beams to different directions. In some embodiments, a full multiview 3D display is made by covering the whole display surface area with the described structures. A single beam emitted from a single MDP is visible only to one eye at any given time. The 3D picture can be formed by modulating the light emitter output according to the image content at different view directions, and a series of unique stereoscopic views is generated.

Example embodiments provide a flat and good quality multiview 3D display that may be suitable for mobile device use. Energy conversion efficiency from electricity to usable light can be optimized with the presented structure more easily than with other existing solutions, which makes it possible to save energy and extend the operational time of mobile devices. Simplicity of the optical structure makes it much easier to control the chain of component manufacturing and assembly tolerances that are critical in high quality optical systems. An example structure can also be made very flat, which is beneficial when there is a need for a compact display solution.

In some example embodiments, light from small emitters is directly reflected from mirrors towards the viewer(s) instead of travelling through multiple transparent optical components that absorb and reflect some of the emitted light. The multiple microlens, diffuser and lenticular sheet components commonly used in current multiview displays develop optical aberrations that deteriorate the emitted beam collimation and lower overall display quality as beams get more divergent, and stray light causes crosstalk between neighboring pixels. Example structures described herein use mirrors, making it possible to produce collimated beams with a structure in which only one surface is constructed to high optical accuracy.

Example methods may also make be used to build a display structure that can be used in both horizontal and vertical orientations. This feature is commonly used in current 2D mobile displays that can be rotated freely and adapt to the user's needs. The described image scanning function and rendering scheme can be naturally adapted for any display orientation without losing any image quality. Furthermore, the presented methods utilizing scanning micromirrors are capable of producing a very dense multi-view picture that fulfills the SMV condition enabling a high-quality 3D experience.

Example Mirror-Based 3D Displays. One example method of creating a 3D picture is based on the use of small light-collimating mirrors and very small light emitting elements. FIG. 25 depicts a schematic of a structure in which multiple directional light beams are created with a combination of µLED rows and static light-collimating mirrors, in accordance with some embodiments. In this structure, the µLEDs are bonded to a transparent substrate (window) as a sparse array 2510, and electrical contacts are made with transparent conducting materials, such as indium tin oxide (ITO) commonly used in current touchscreens. The substrate material (e.g., window 2515) may be optically clear plastics like polycarbonate and PMMA or glass material like borosilicate with low coefficient of thermal expansion. The substrate 2515 may be either flat or contain micro-optical features that further modify the emitted light beam divergence, propagation direction, etc. Light emitted from a single µLED hits a collimating mirror 2520, which may be manufactured, for example, from UV curable material with a mold in a roll-to-roll process and coated with a metallic (e.g., aluminum or silver) mirror surface. A well-collimated beam of light is reflected back from the mirror 2520 in the direction of the light emitters (e.g., arrays 2510). The mirrors 2520 may be separated from each other with light absorbing separation walls 2525, which may reduce crosstalk between the beams. These walls 2525 may be made, for example, as punctured sheets of black plastic material attached on top of the array of mirrors 2520.

As the µLEDs are very small components, they occupy only a relatively small portion of the substrate 2515 surface area on top of the mirrors 2520, and most of the light in the beams goes past the emitter components and exits the structure through the transparent substrate window. If the activated µLED 2510 is on the optical axis of the mirror 2520, the beam propagates to the direction of the optical axis. But if the activated light emitting component 2510 is at an off-axis position, the beam exits the structure at an angle. With a row of µLEDs 2510, it is possible to generate a series of beams reflected from a single mirror 2520 towards different directions by activating the appropriate light emitting components in the row above. When the size of the mirror 2520 is small enough, the µLED row 2510 and single mirror 2520 can form one Multidirectional Display Pixel (MDP), which is capable of projecting multiple well-collimated beams in different directions.

Figure 26:
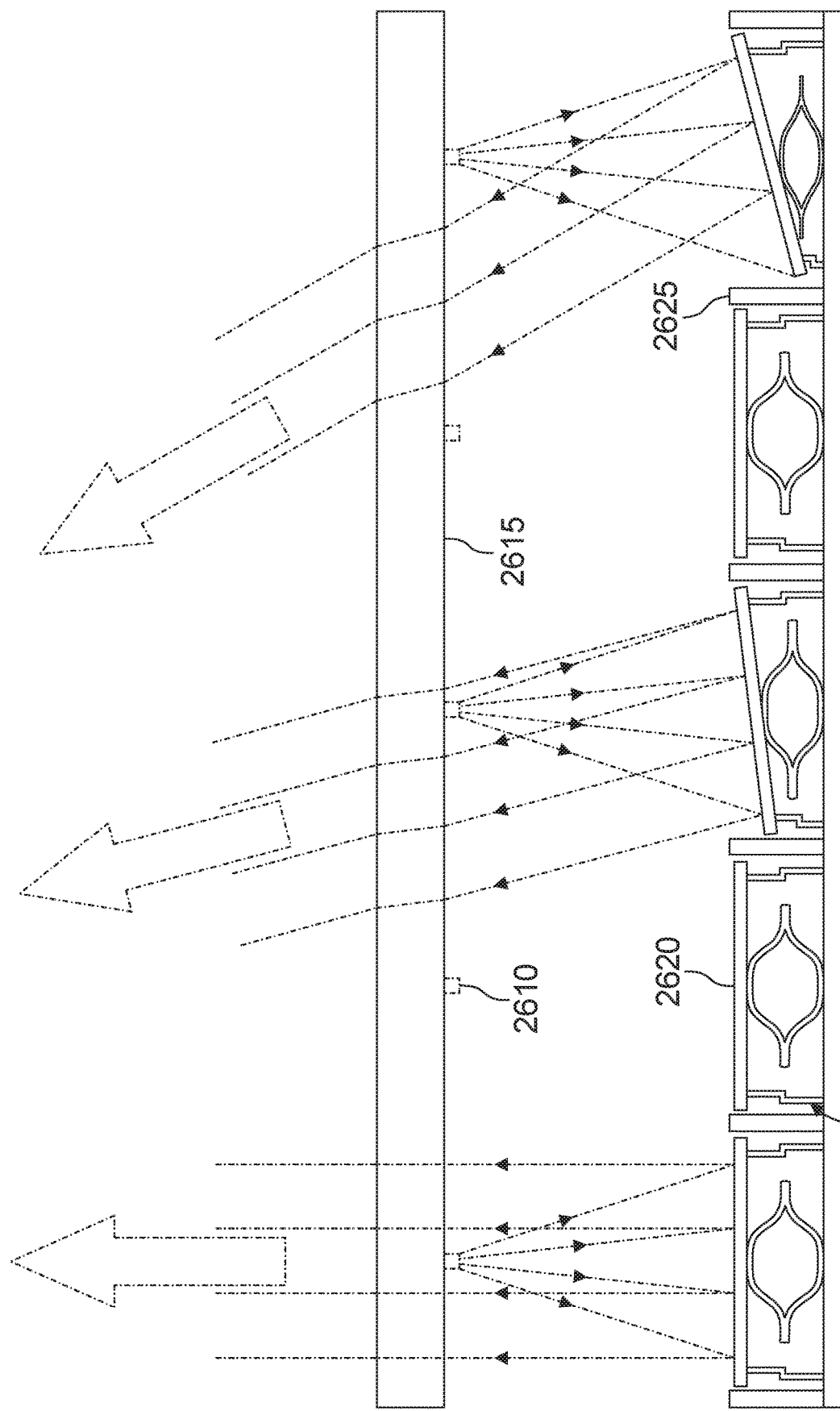
FIG. 26 is a schematic illustration of a structure in which light-collimating tilting mirrors are used together with an array of μLEDs for the generation of multiple images to different directions.

An alternative MDP structure that can be used for the creation of multiple views to different directions is shown in FIG. 26, in accordance with some embodiments. A matrix of scanning micromirrors 2620 may be used together with a matrix of single µLEDs 2610 positioned on the optical axis of the mirrors 2620 at the focal distance, and each MDP containing only one emitter 2610. The light collimating mirrors 2620 may be diffractive structures etched directly on top of a flat silicon surface and processed with a metallic mirror coating. A mirror actuation mechanism 2630 may be provided to control the directions of each respective mirror. The mirror actuation mechanism 2630 may be, for example, electrothermal bimorph actuators such as those previously discussed. In accordance with some embodiments, an actuated mirror structure may be capable of projecting beams to ±30 degrees from the display surface normal in both the horizontal and vertical directions. The intensity of the µLEDs 2610 may be modulated according to the image content as the micromirrors 2620 tilt. One benefit of this structure, when compared to the previous static mirror case presented in FIG. 25, is the fact that the active mirrors 2620 can also be moved up and down in addition to tilting. This makes it possible to compensate for any optical aberrations caused by source large horizontal offset in respect to the mirror optical axis.

In some embodiments, a full multiview 3D display is constructed by covering the whole surface area with the described MDPs. All beams exiting the optical structure are preferably well collimated in order to limit the visibility of a single beam to only one eye at a time. Average interpupillary distance between adult humans is ~64 mm, which is the upper limit for beam size at the designated viewing distance. When the visibility of each single µLED component is limited to a single eye at a time, it is possible to create the stereoscopic effect, as unique 2D images are projected to different eyes either by activating the appropriate µLEDs (static mirrors) or by activating the components at the correct time (active mirrors). If only two images are used, they may be produced with very wide beams that are visible only to one half of the facial area of a single user, but the 3D effect would be of lower quality. Quality of the display can be increased by increasing the number of views with more than two light-emitting elements per each mirror and/or by showing more than two images sequentially. The more views there are inside the viewing window, the better is the illusion of a 3D image as the transition between views becomes smoother and the user is able to "look around" the object by moving his/her head or the display device. This motion is natural to make with handheld devices. In embodiments in which two μLED rows are used to form a cross-shaped pattern on top of a single mirror, or those in which the active mirror is tilted in both directions, it is also possible to generate different views equally to both horizontal and vertical directions enabling display view rotation.

Light intensity of each display pixel is preferably controllable through a certain dynamic range in order to make a display with good image quality. There are several different methods that can be utilized for this purpose. One approach is to continuously adjust the electric current flowing through each light-emitting component and thus adjust the brightness of the pixel according to the image contents. Another possibility is to adjust the component brightness digitally by pulse-width modulation (PWM). LEDs in general are components that can be switched extremely fast, and adequate dynamic range for a flicker free image can be easily achieved with this method. It is also possible to use a separate optoelectronic element like LCD on top of the structure for the pixel brightness adjustment. LCDs adjust the amount of light transmitted through each pixel by rotating the polarization direction of passing light between two polarizing elements. The described emitter-micromirror structure may be used with an LCD stack with the polarizers by placing it on top of the substrate window. The LCD would selectively block or pass the light reflected from the mirrors synchronized to the sequential activation of μLEDs directed to individual view directions. One disadvantage of LCDs is their relatively low refresh frequency, which limits the amount of directional 2D images that can be generated. This means that an image rendering method based on direct adjustment of the light emitting elements would be the preferred choice for a display with high number of views. However, the additional LCD could offer an alternative suitable for some use cases.

Figure 27:
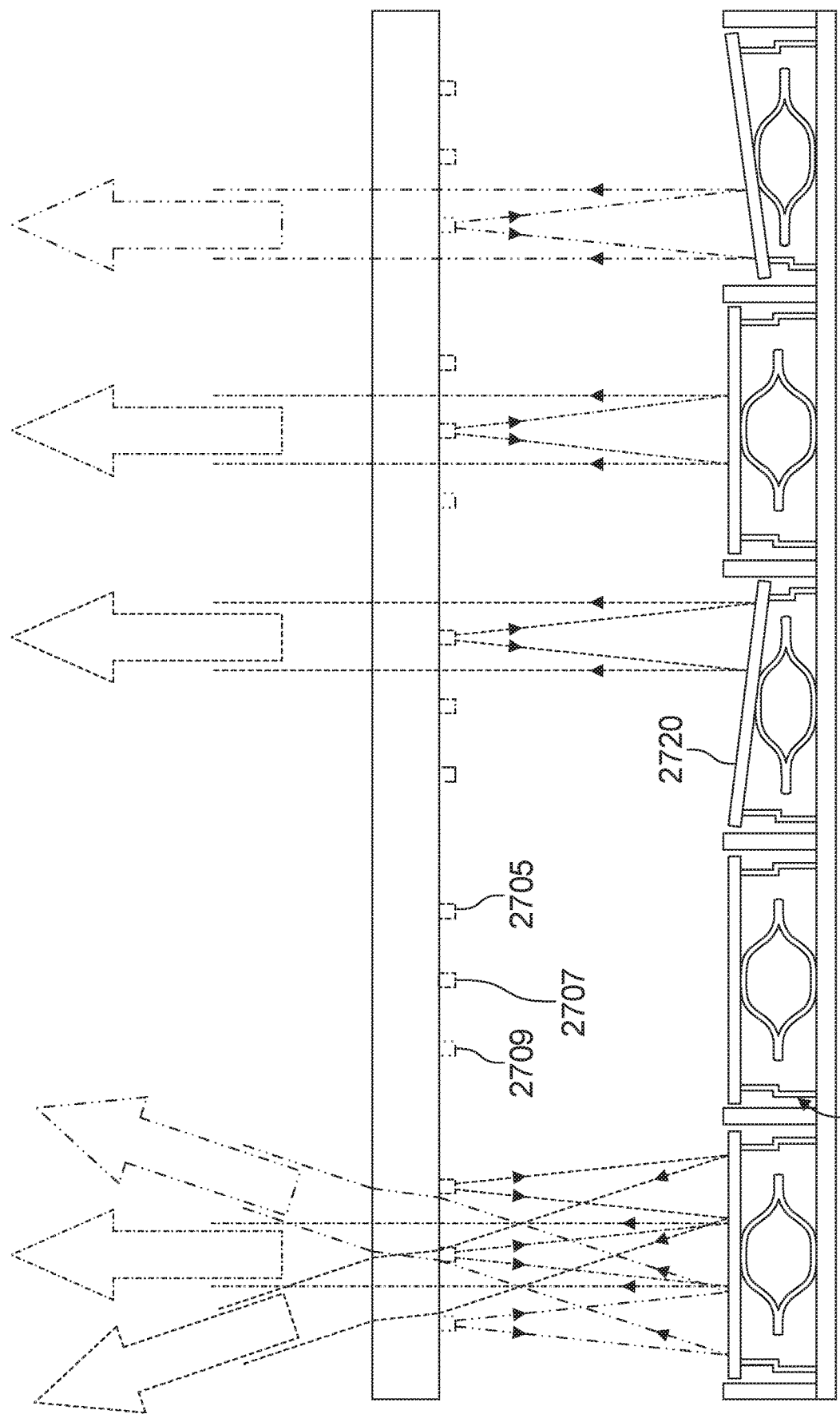
FIG. 27 is a schematic illustration of a structure in which light-collimating tilting mirrors are used together with an array of RGB μLEDs for generation of full-color images.

In some embodiments where a tilting micromirror structure is used together with single-color light emitters, additional steps may be employed to create a colored image. FIG. 27 is a schematic illustration of a structure which can be used in a method for combining the colors from a μLED array that has separate red (2705), green (2707), and blue (2709) chips. As the different colored chips (2705, 2707, 2709) are physically at different locations, the light will be reflected from the collimating mirrors 2720 in somewhat different directions. However, in some embodiments, the mirror tilting may be synchronized with the activation of the different colors, and the colored LEDs may be activated with a small time interval, using the tilting of the mirror 2720 to compensate for angular shift induced by the spatial separation. In this way all three colors may be projected in all directions by introducing a small time shift between different color light source activation in the color rendering scheme. With static mirrors, this approach cannot be used, but instead the full-color image may be generated with clusters of very small red, green, and blue μLEDs. In this case the colored light output is combined into one RGB controllable source with, for example, integrated plastic elements molded on top of the clusters as described above.

In some embodiments, other light sources (e.g., OLEDs) that can be miniaturized may be used in the MDPs as an alternative to μLEDs. However, μLEDs currently are very small and have high brightness. The small size is beneficial as larger light sources may add more occlusion on top of the mirrors, and the larger sources may also call for larger mirrors in order to achieve the same level of beam collimation. Larger mirrors may also mean larger pixel sizes on the display, which is seen as lower spatial resolution. The optical properties achievable with a given source-mirror pair directly connects light emitter size to the achievable display size/resolution. If the light emitting element and collimating mirror have rectangular shapes and the width of the light emitting element is, for example, 10% of the width of the mirror, the light emitting elements would cover only 1% of the area on top of the mirrors. This means, as an example, that if the size of a μLED is 5 μm, the mirror size could be ~50 μm without the array of sources obstructing the emitted light excessively. The ~50 μm mirrors have approximately the same size as 5 inch full HD mobile phone display pixels. This example calculation shows that the μLEDs are a useful option for the mobile device use case. As noted above, a three-color 9-piece μLED matrix can be built inside an area of 10 μm×10 μm, making it possible to build, for example, mobile device displays in the 5"-10" size range.

Achievable beam collimation level is a significant factor for the suitable viewing distance of the display. The beams emitted from single pixels should cover only the area of approximately one eye. If the beam would have too large divergence, it would be visible with both eyes simultaneously preventing formation of the stereoscopic image. The theoretical lower limit for beam divergence comes from the eye pupil size as only a few beams hitting the pupil simultaneously is adequate for fulfilling the SMV condition. In practice however, the lower limit is set by the achievable size of the light emitter and size of the mirror that determines the pixel size of the display. These two parameters define the achievable beam divergence and feasible viewing distance. With very small sources, beam divergence can also suffer from diffraction effects that place a hard physical limit to the achievable spot size at the viewing distance.

TABLE 1

Calculated maximum feasible viewing distances of different sized displays

| Emitter Size [μm] | Viewing Distance [mm] with Different Full HD Display Sizes | | | |
|---|---|---|---|---|
| | 5" (50 μm pixel) | 10" (100 μm pixel) | 25" (250 μm pixel) | 50" (500 μm pixel) |
| 2 | 1250 | 2500 | 6250 | 12500 |
| 5 | 500 | 1000 | 2500 | 5000 |
| 10 | 250 | 500 | 1250 | 2500 |
| 20 | 125 | 250 | 625 | 1250 |

Table 1 lists a set of calculated values for maximum viewing distances that are feasible with different size light emitters and displays based on geometric analysis only. To calculate the values in Table 1, it is assumed that the micromirror size is the same as the display pixel size and that the light emitting element is positioned at the same distance from the mirror than what is the mirror aperture size, making the system f-number 1. The mirrors are assumed to be ideally parabolic and the light emitting element is placed at the correct focal distance making the beam collimation as good as possible. Viewing distance was set to the distance where the generated beam size has a diameter of 50 mm. With this size, the beam fits comfortably over the area of only one eye at a time. For example, it can be seen from the table that if a 5 µm emitter is used in a 5" mobile phone display structure, the full HD display could be viewed from ~0.5 m distance, which corresponds well to the normal viewing distance of such devices. This value represents the approximate maximum distance and the device could be used at a closer range as the diverging beam size would be smaller closer to the display surface. Similarly, a 50" TV screen should be viewed at ~1.25 m distance if the emitter size is as large as 20 µm. This distance is generally too short for comfortable viewing experience and a better choice for the emitter size would likely be between 5-10 µm. Some other values for the maximum viewing distance could be obtained with different optical f-numbers, but as most of the possible light emitters have a fairly large NA, the small f-number is desirable from the illumination efficiency point-of-view. If the system f-number and/or emitter NA are very large, a lot of light could be wasted as it misses the mirror aperture. This also would mean more crosstalk between pixels and stray light in the system that has the effect of lowering the image contrast.

Figure 28A:
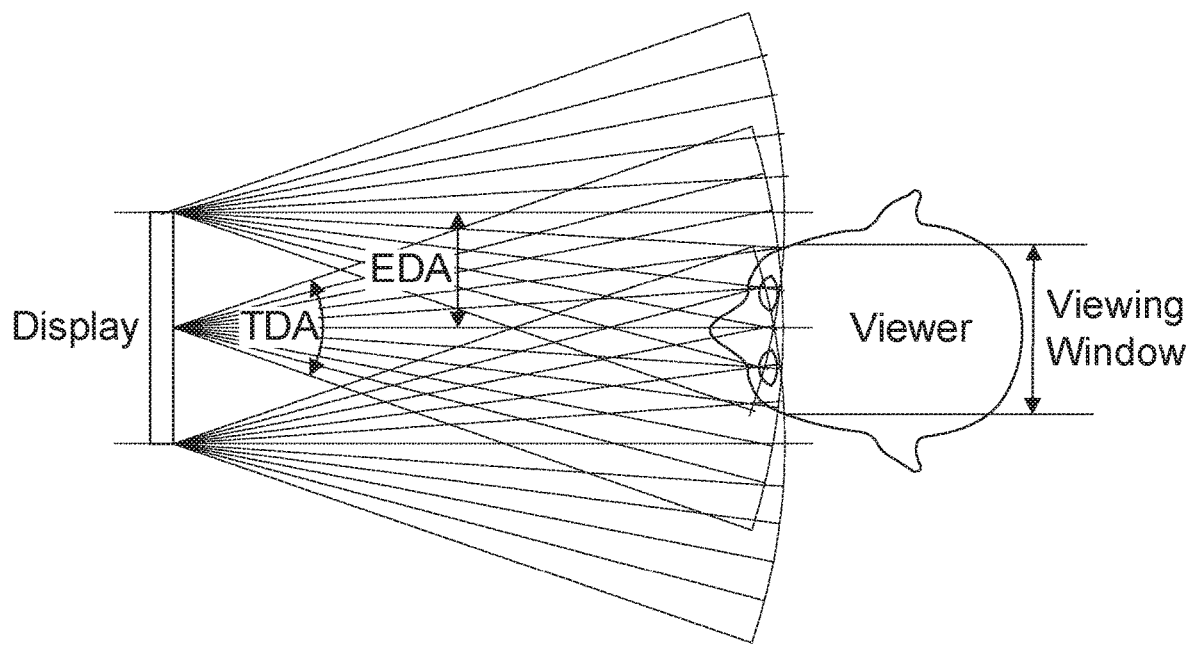
FIGS. 28A-28B provide illustrations of viewing geometry in two display cases: with parallel emission direction angles (FIG. 28A) and with converging emission direction angles (FIG. 28B).
Figure 28B:
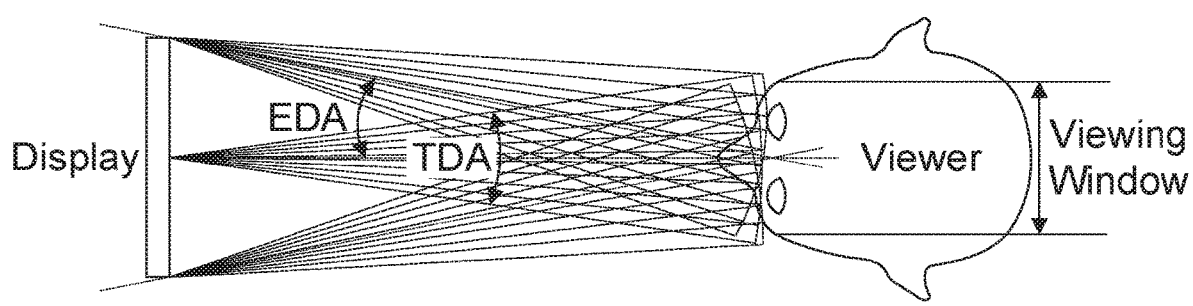

In order to make a full display, the small MDPs are repeated over a finite display area. As the single MDP generates a limited set of beams that have very limited angular extent, it will also have a limited total divergence angle (TDA). This parameter measures the total FOV of one MDP and it is visible only inside this particular angular range. If the display is large, it is beneficial for the TDAs of the MDPs located at the edges of the display to have an adequate overlap region. Without overlapping areas, the edges would not be visible simultaneously, making the whole display image only partially visible. FIG. 28A shows the viewing geometry in a case where the overlapping TDAs form a viewing window around the viewer facial area. Another option is to tilt the emission direction angles (EDAs) of the MDPs located at the display edges towards the display central line. This option, illustrated in FIG. 28B, has the potential for denser views as the TDAs can be narrower. In example embodiments, this may be achieved by shifting the nominal positions of light sources slightly inside MDPs and by increasing the value of this shift towards the display edges. In alternative embodiments, this tilting is performed optically by placing an extra optical element on top of the window or by integrating these beam tilting features to the window itself.

In example embodiments, 3D rendering may be implemented as follows. In the case of a fixed mirror, each MDP has pixels that are dedicated to some specific view directions. The pixels dedicated to one specific direction are activated for the formation of that particular directional 2D view of the one 3D scene. All of the possible views may be generated simultaneously as the display is based on spatial multiplexing only. In the case of tilting active micromirrors, the images projected to different directions may be created sequentially by activating the pixels in synchrony with the mirror tilting angle and image content in different directions. This multiplexing scheme may be based mainly on temporal multiplexing. In some embodiments, hardware combines the previous two cases by adding more than one pixel on top of the tilting mirrors. This makes it possible to realize the color rendering idea presented previously, but also to increase the angular density of views.

Figure 29A:
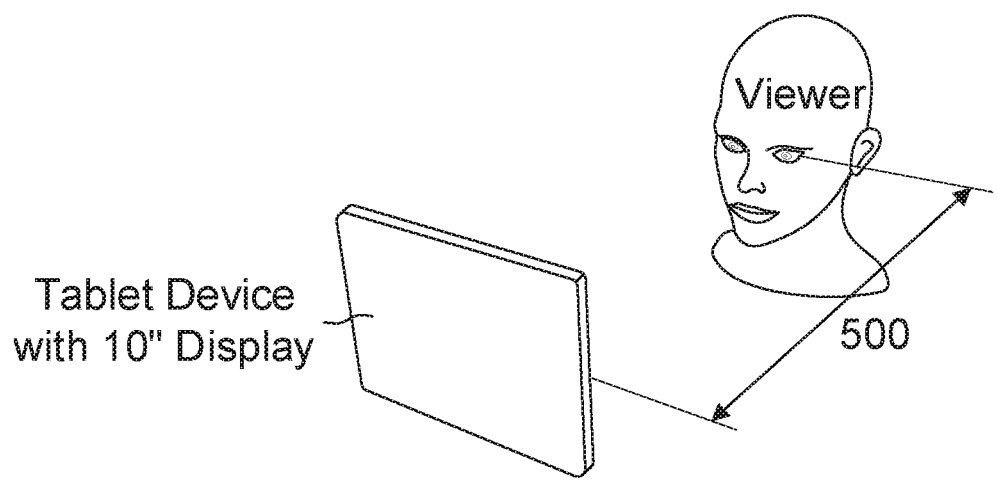
FIGS. 29A-29B provide a schematic illustration of a use case for an example embodiment in which a tablet device with 10"3D multiview display and eye tracking module is viewed from a distance of 500 mm.
Figure 29B:
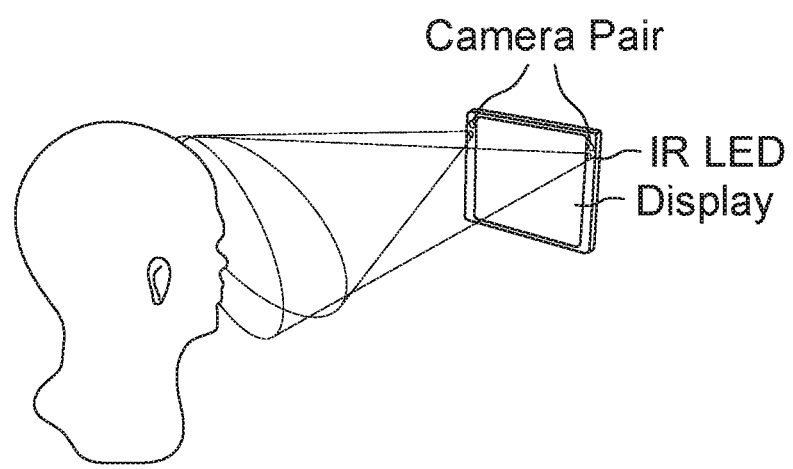

Example Use Case for Mirror-Based 3D Display. FIGS. 29A-29B illustrate an example use case for display systems described herein, in accordance with some embodiments. In this use case, a tablet device with a 10" multiview 3D screen is placed at 500 mm distance from a single viewer. The device has a stereoscopic camera pair and infrared (IR) LEDs that illuminate the facial area of the viewer. The cameras are used for accurate eye tracking that operates to determine the 3D locations of the viewer's eye pupils and, in some embodiments, direction of gaze. This information is used for projecting a stereoscopic 3D image to the eye directions only, which saves energy as the illumination is directed to the eye pupils instead of the whole surrounding space. This also considerably reduces the amount of information to be calculated for the image data and rendering.

Figure 30:
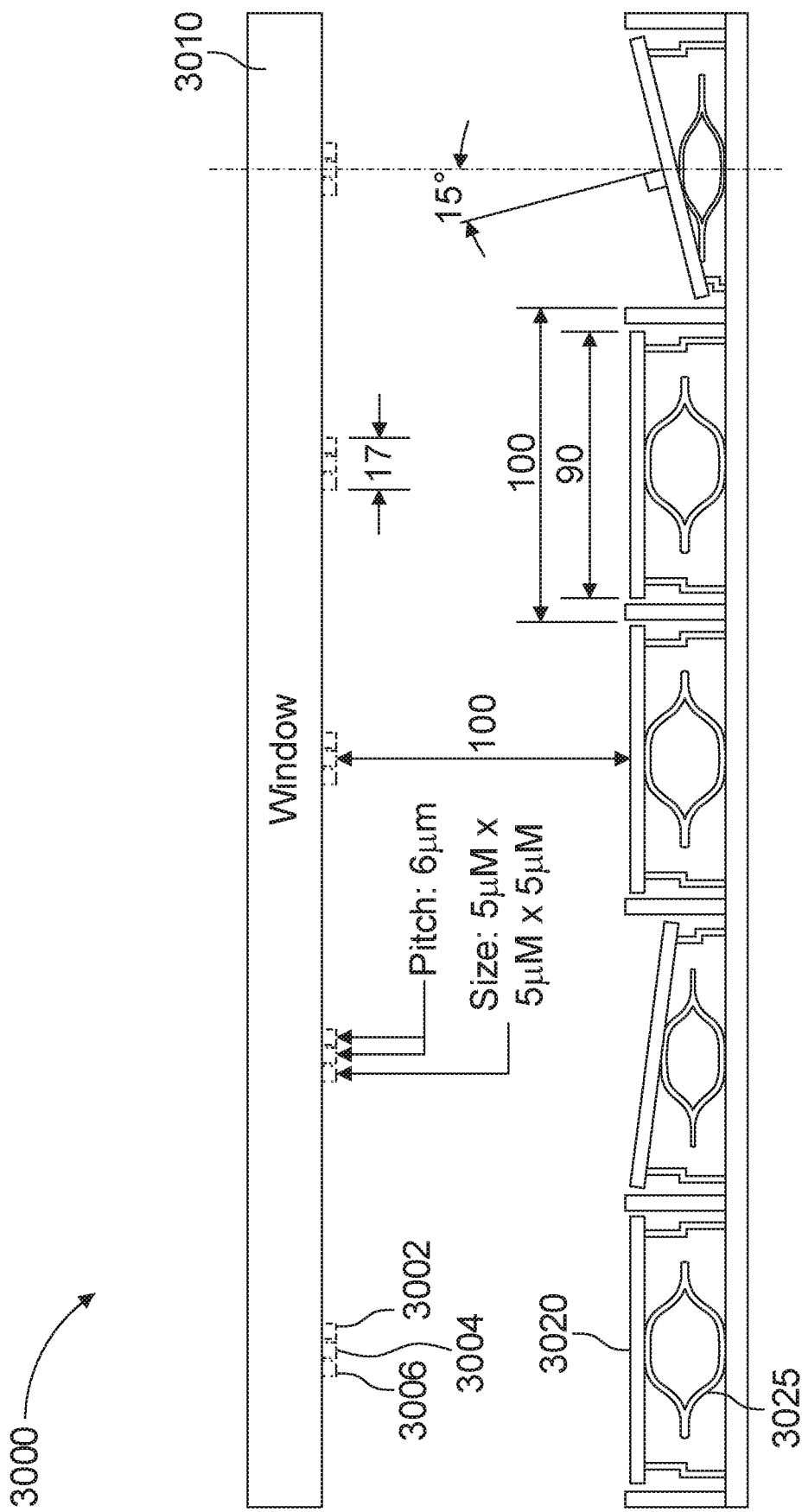
FIG. 30 is a cross-sectional view of a portion of a display device illustrating physical dimensions of such a device (in μm) in one example embodiment.

FIG. 30 is a cross-sectional view of a portion of a display device 3000 illustrating the physical dimensions of such a device (in µm), in accordance with some embodiments. The display structure 3000 is based on active tilting mirrors 3020 moved with individually-controlled electrothermal bimorph actuators 3025. Light emitting components (e.g. µLEDs) 3002, 3004, 3006, are bonded to a thin borosilicate glass window substrate 3010 on top of each mirror 3020. Electrical contacts are made from transparent ITO by etching. The light emitting components (3002, 3004, 3006) may form a cross-shaped pattern, such as where one green µLED (3004) is in the middle surrounded by two red (3002) and blue (3006) components in both vertical and horizontal directions. The size of each µLED may be 5 µm×5 µm, and the µLEDs may have a pitch of 6 µm. The µLEDs may be positioned at 100 µm distance (d1) from the mirrors. Light extraction efficiency of the µLEDs may be increased by shaping the chips using techniques described above, which may also make the emission directional, with most of the optical power contained inside a ±24° emission angle. This NA value of ~0.4 is large enough for covering most of the single mirror aperture from the 100 µm distance, and also small enough for not wasting light excessively outside the aperture. The micromirrors in this example may have a diffractive pattern that makes their optical functionality resemble a parabolic mirror with focal length of 100 µm. The pattern is replicated to the mirror surface with UV embossing and processed with pure aluminum mirror coating. Single mirror aperture size is 90 µm×90 µm (d2) and they are in a 1920×1080 matrix (full HD) with 100 µm pitch. Each mirror can be tilted by ±15° (α1) in both vertical and horizontal directions, such that the beams may project through a total range of ±30° in both directions. The mirrors can also be moved up and down with the actuators through the total range of ~5 µm, to compensate for the beam focusing optical aberrations occurring at extreme tilting angles of the mirror.

Figure 31A:
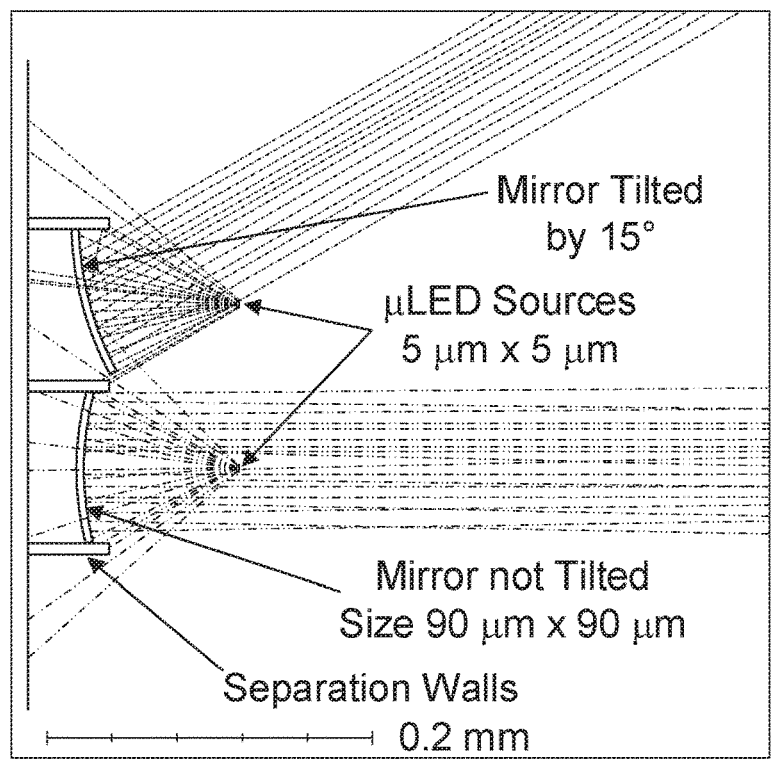
FIGS. 31A-31B illustrate the geometry used in raytrace simulations, where
Figure 31B:
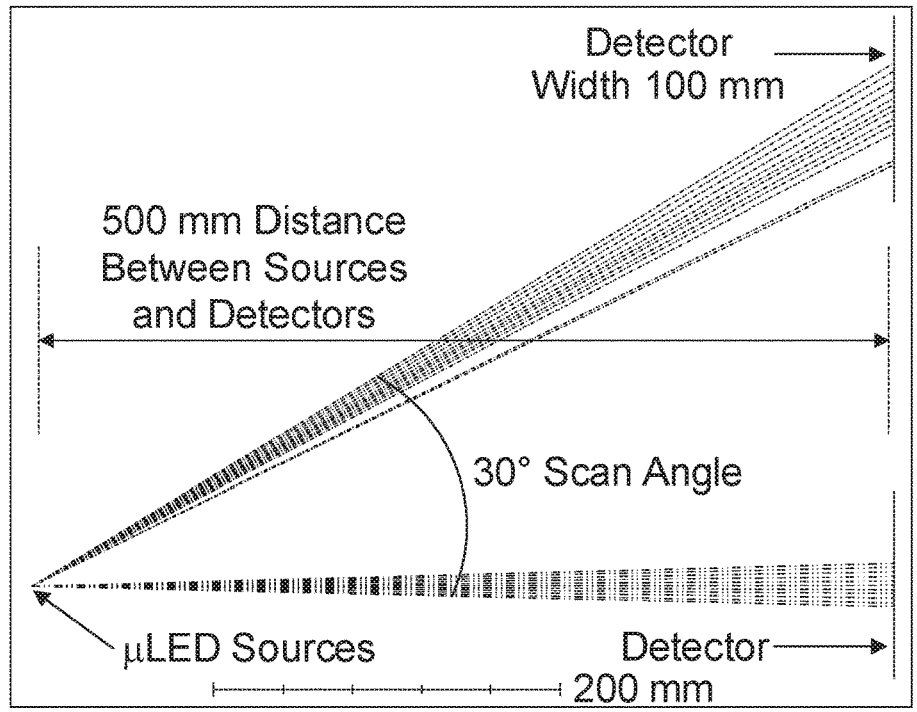

In order to test optical functioning of an example embodiment, a set of raytrace simulations was performed with commercial optical simulation software OpticsStudio 15.5. FIGS. 31A-31B illustrate the simulation geometry. In the simulation, two small light sources were placed at ~100 µm distance from two identical parabolic mirrors, which had 100 µm focal lengths and rectangular 90 µm×90 µm apertures. One mirror was left to the nominal position where mirror vertex surface normal was pointing to the direction of the source, and the other mirror was tilted by 15°, which resulted to a beam that was reflected to an angle of 30°. In addition to tilting, the second mirror surface was moved 3 µm closer to the source from the nominal position determined by focal length. Two 100 mm×100 mm detector surfaces were placed at 500 mm distance from the sources. The light sources had rectangular 5 µm×5 µm apertures. Angular divergence of both sources was set to a Gaussian distribution with full-width-half-maximum (FWHM) value of ±24°.

Simulation results were prepared at a central direction and at 30° scanning angle. At the central position, the beam generated with the mirror from the 5 μm size μLED has divergence of ~3°, which means that the spot size of the single pixel at the 500 mm viewing distance is ~25 mm. Diffraction has only a minor effect to the beam collimation angle as the system f-number is low. At the maximum 30° beam tilting angle, the optical aberrations make the beam quality worse and result in a divergence value of ~5°. This is achieved when the micromirror is moved 3 μm closer from the nominal position towards the μLED in order to compensate for some of the optical aberrations caused by off-axis geometry. It follows that a spot size of ~50 mm is obtained at the edge of the FOV when the remaining optical aberrations and geometrical factors are considered. This value is still well under the average human interpupillary distance, and all of the display pixels are visible only to one eye at any given time inside the 60° total scanning range of each pixel.

Figure 32:
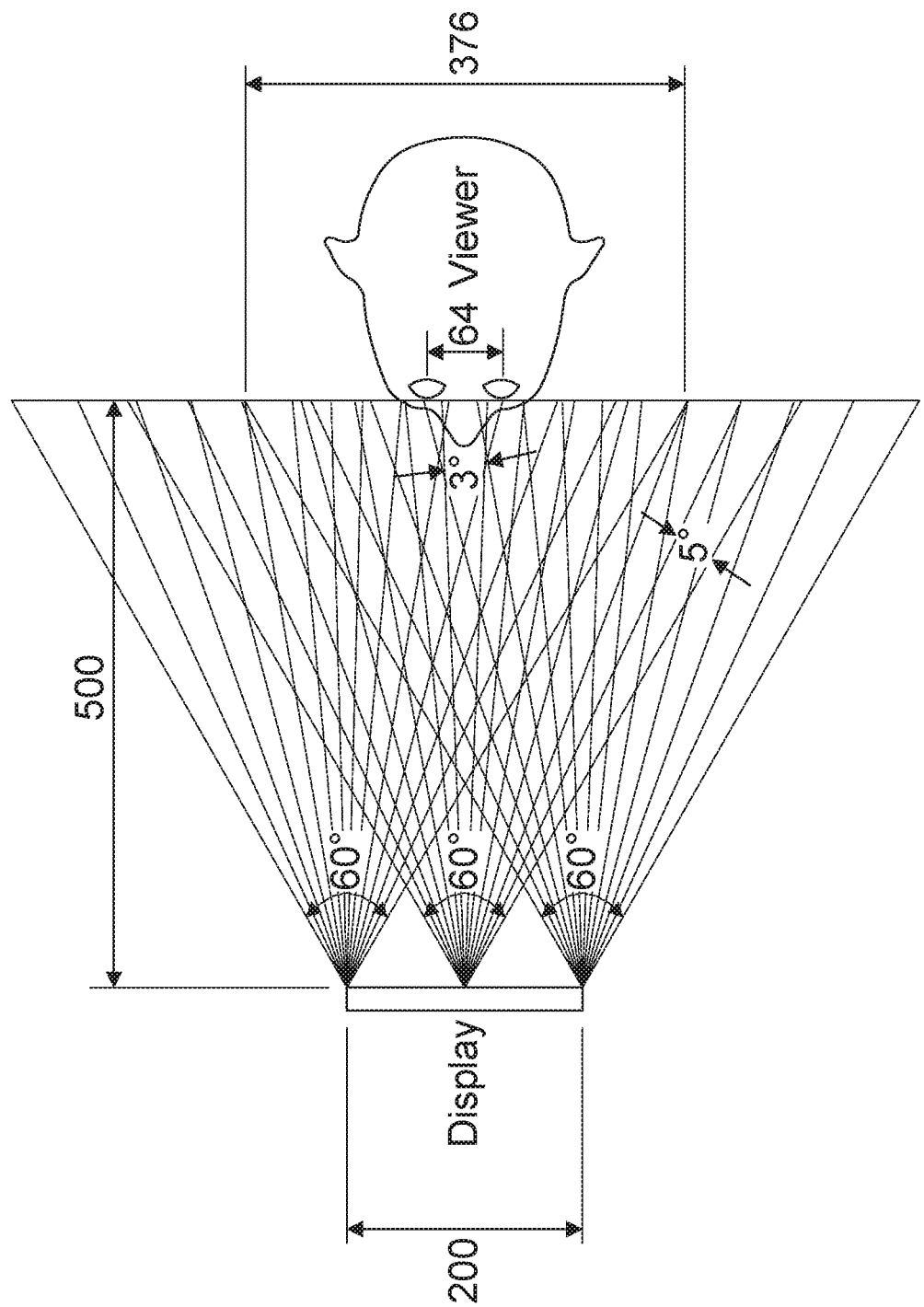
FIG. 32 illustrates the viewing geometry of an example use case.

FIG. 32 shows schematically the viewing geometry of the example use case. In an embodiment, a 200 mm wide (d1) display 3210 may have a total scanning range of up to 60° of each pixel, as discussed for the simulation results. At a user distance of 500 mm (d2), as shown the total angular extent of pixels even at the display edges overlap at the centerline of the display without any additional beam tilting optics or arrangements, and a 376 mm-wide viewing window 3230 is formed. This size is adequate for a single viewer (with example pupil spacing of 64 mm (d3)), and may permit considerable tilting of a tablet device and ease of use. The numbers set forth here are maximum values that this particular example structure may be capable of producing. In some cases, by utilizing, e.g., eye tracking, it may not be necessary to use all of the presented scanning range, as light can be directed to the two eye pupils only. Eye tracking may allow considerable energy savings, and also permit projecting more views to a single eye as the mirrors scan across the eye pupils with smaller tilting range.

In some embodiments, image rendering is performed by modulating the μLED intensities according to image content and mirror tilting angle. In some embodiments, all of the mirrors are tilted simultaneously first towards one eye pupil and then towards the second eye pupil. In such embodiments, a stereoscopic effect may be generated by presenting only two different images. However, in other embodiments, the 3D picture quality may be enhanced by modulating the pixels faster as the mirrors scan through the eye pupils and project more than one image to each eye inside the 60 Hz flicker-free-image POV timeframe. Color rendering may be performed by introducing a small time-delay between the activation of red, green and blue pixels when the mirrors scan the projected beams to each eye. A mirror tilt of ~1.7° may be used for two neighboring pixels at 6 μm distance from each other to be projected to the same direction. This means that if the green μLED is in the middle of the five μLED cluster, the blue pixel image can be overlapped with the green spot by tilting the mirror by +1.7°, and red spot overlap can be achieved by tilting the mirror by −1.7°. As the mirror is a reflecting component, no color aberrations occur with the different μLEDs. And as the μLEDs are bonded to a cross-shaped pattern, the color combination and 3D image scanning can be made in both vertical and horizontal directions allowing rotation of the mobile display.

If the mirror tilts used for the color rendering are considered and mirrors scan through the range between two eye pupils, the total angular extent of the pixel beam scanning action is ~11°. If, for example, the mirror back-and-forth tilting frequency is set to a value of 60 Hz, an angular velocity of ~0.8 ms/degree is obtained for the beam scanning. This means that a suitable time delay between the red, green and blue μLED activation is ~1.3 ms in order to make the different color beams to overlap. The μLEDs could be driven with 240 Hz refresh frequency, which would allow projection of two different images during each mirror one-directional sweep, and a total of four images (two for each eye) inside one full mirror back and forth cycle would be generated. Also other refresh frequencies could be used with the μLEDs in order to generate different number of images to the single eye or, e.g., in order to use different μLED duty cycles for the image intensity rendering with the PWM method.

Using Directional Backlight. In some embodiments, small light collimating mirrors and very small light emitting elements are used to form a directional backlight module. In some embodiments, the directional backlight module is used together with a spatial light modulator (SLM) such as an LCD panel to form a 3D multiview display.

Very small light sources (e.g., μLEDs) may be bonded to a transparent substrate as a sparse array and placed on top of a collimating mirror. A well-collimated beam of light may be reflected back from the mirror to the direction of the light emitters. As the light sources are very small, they occupy only a relatively small portion of the substrate surface area on top of the mirrors, and most of the light in the illumination beams goes past the emitter components and exits the structure through the transparent substrate window. With a row or matrix of sources, a series of beams may be generated and reflected from a single mirror towards different directions by activating the appropriate light emitting components.

A full multiview 3D display may be constructed by placing a SLM on top of the directional backlight module, and by covering the whole display surface area with the described backlight cell structures. In embodiments in which single-color μLEDs are used, they may be overcoated with a thin phosphor layer that converts the emitted blue or UV light into a more continuous white light spectrum. The LCD display positioned on top of the backlight module can be used for selectively blocking the directed beams at different spatial positions over the display surface. In an example embodiment, rendering of a 3D image is performed by showing the different 3D scene angular projection images sequentially and by activating the appropriate light emitters in the row according to the image direction. As each light source above a single micromirror is generating light that is emitted to one specific direction, the single projection images are visible to only one single viewing direction, making it possible to generate pairs of stereoscopic images.

An example method uses small light-collimating mirrors and very small light emitting elements that form a directional backlight module. This backlight module can be used together with an SLM (e.g., a LCD panel) to form a 3D multiview display. In one embodiment, the backlight structure may be as in FIG. 25, described above, which illustrates one example structure in which multiple directional light beams are created with the combination of μLED rows and static light-collimating mirrors. The μLEDs are bonded to a transparent substrate (window) as a sparse array, and electrical contacts are made with transparent conducting materials such as indium tin oxide (ITO). The substrate material may be an optically clear plastic like polycarbonate and PMMA or a glass material like borosilicate with low coefficient of thermal expansion. The substrate may be flat or may contain micro-optical features that further modify the emitted light beam divergence, propagation direction, etc.

Light emitted from a single µLED hits a collimating mirror that can be manufactured e.g. from UV curable material with a mold in a roll-to-roll process and coated with metallic (e.g., aluminum or silver) mirror surface. A well-collimated beam of light is reflected back from the mirror to the direction of the light emitters. The mirrors are separated from each other with light absorbing walls that reduce crosstalk between the beams. These walls can be made, e.g., as punctured sheets of black plastic material attached on top of the mirror array.

As the µLEDs are very small components, they occupy only a relatively small portion of the substrate surface area on top of the mirrors and most of the light in the beams goes past the emitter components and exits the structure through the transparent substrate window. If the activated µLED is on the optical axis of the mirror, the beam propagates to the direction of the optical axis. But if the activated light emitting component is at an off-axis position, the beam exits the structure at an angle. With a row of µLEDs, it is possible to generate a series of beams reflected from a single mirror towards different directions simply by activating the appropriate light emitting components in the row above. When the size of the mirror is small enough, the µLED row and single mirror can form one multidirectional backlight pixel (MBP) that is capable of projecting multiple well collimated beams to different directions.

Figure 33:
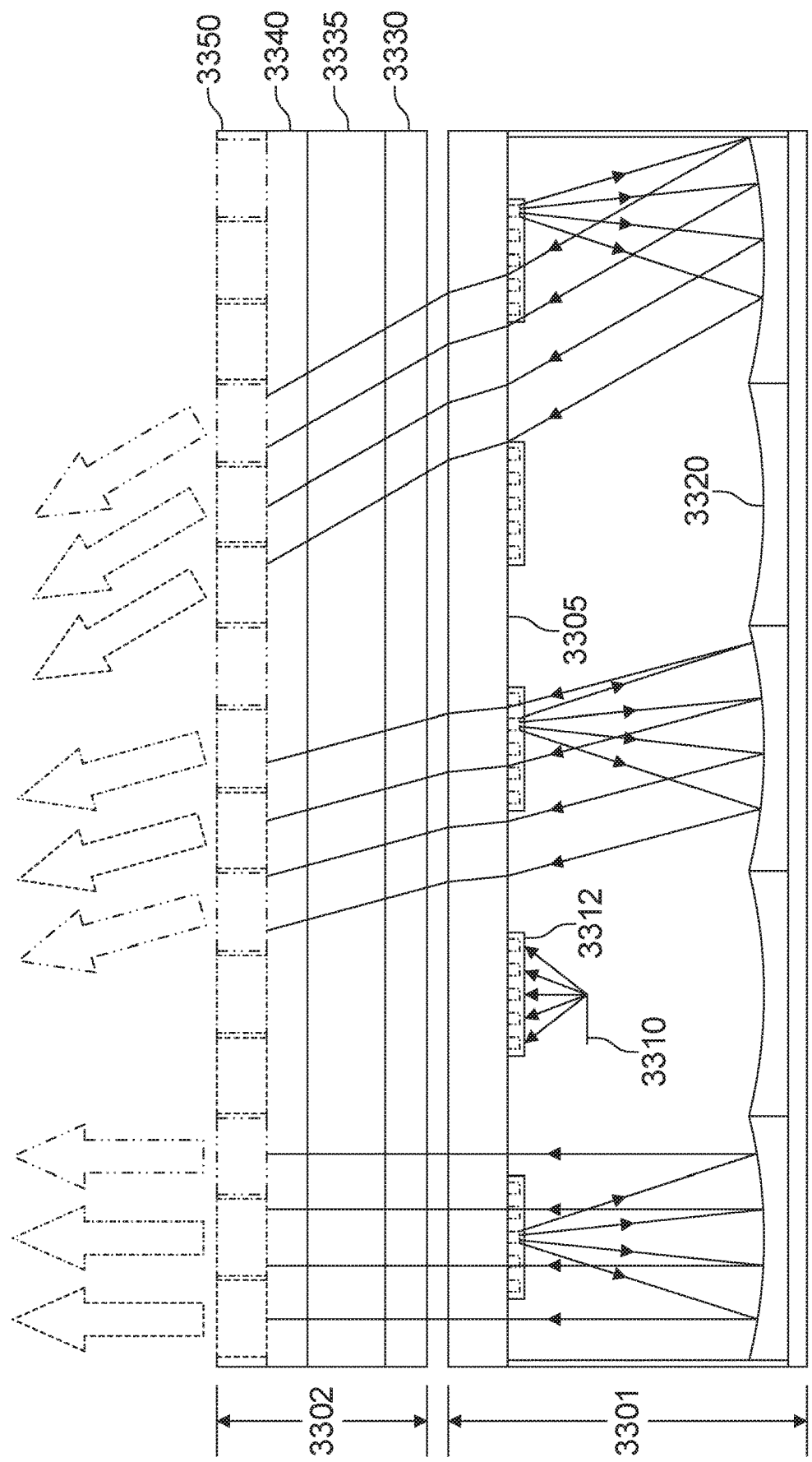
FIG. 33 is a schematic cross-sectional illustration of a structure used as a directional backlight module to an LCD screen in accordance with some embodiments.

In some embodiments, a full multiview 3D display 3300 is constructed by placing a SLM 3302 on top of the directional backlight module 3301 and by covering the whole display surface area with the described MBPs. FIG. 33 presents one example structure of such a display system 3300. The light is generated in a dense linear array 3310 of small light emitting elements. In embodiments in which single color µLEDs are used, they may be overcoated with a thin phosphor layer 3312 that converts the emitted blue or UV light into a more continuous white light spectrum. If the layer 3312 is thin enough, an active µLED is still visible through the layer and white light is emitted from one specific spatial position on top of the micromirror 3320. The parabolic micromirrors 3320 collimate the light into highly directional beams that pass through the transparent window 3305, which acts as the topmost layer of the backlight module 3301. The SLM 3302, such as an LCD display, is positioned on top of the backlight module 3301 and used for selectively blocking the directed beams at different spatial positions over the display surface. Rendering of a 3D image is performed by showing the different 3D scene angular projection images sequentially and by activating the appropriate light emitters in the row according to the image direction. As each µLED in the row above a single micromirror 3320 is generating light that is emitted to one specific direction, the single projection images are visible to only one single viewing direction.

In some embodiments, color filters 3350 are used for generating a full-color image from the white backlight as illustrated in FIG. 33. In alternative embodiments, full-color images are generated with separate red, green and blue backlight components, in which case there may be no need to use the color filters in the LCD structure. As described above, currently-achievable µLED sizes and bonding accuracy enable three-color pixels that are under 10 µm in size. In this approach, one issue to be addressed is the color separation in the directional illumination beams caused by the different spatial positions of the light emitters. Integrated optics may be used to address this, as light mixing lightguide structures can be integrated directly on top of a µLED cluster.

One use of the backlight module is to provide controllable directional illumination for the 3D display SLM, which acts as the image modulation component. As the two modules have separate optical functions, they can also be somewhat separately optimized for different use cases and better manufacturability. For example, the size of the MBPs can be much larger than the size of the display pixels. However, this calls for spatially even illumination of the individual SLM pixels in all illumination directions. This can be difficult to achieve as different edge effects are commonly found from illumination structures that are in array format. This potential problem can be avoided by reducing the size of the MBPs below the threshold of human visual acuity or by fitting them to the size of the display pixel.

One issue to be addressed regarding matching the backlight and SLM modules relates to the method of producing color. As discussed above, different methods for generating color are used in different embodiments. For example, color images may be generated using a three-color backlight or using a module that provides a wider white light spectrum. One potential issue is that color filters 3350 transmit light differently when the light is coming from different angles. Filters based on material absorbance do this due to the different attenuation lengths connected to layer thickness and geometry, whereas filters based on dielectric layers generate different transmission properties due to light interference differences connected to incidence angles. Both of these filter types can be optimized for specific angular range and wavelengths, and the properties of these filters are taken into consideration in the structure of the display system. In the case of white light illumination, the different view directions are created by shining the LCD color filters 3350 from different directions, and the absorption lengths in the color filter material layers become different. This may cause somewhat different colors to appear in the view directions, and color calibration with LCD pixel transmissions may be performed. In some embodiments, the phosphor material 3312 applied on top of the µLEDs is fine-tuned in order to compensate for this effect. As the µLEDs emitting light to different directions are located at different spatial positions, the phosphor materials 3312 with slightly different color characteristics may be applied selectively.

All beams exiting the optical structure are preferably well collimated in order to limit the visibility of a single beam to only one eye at a time. Average interpupillary distance between adult humans is ~64 mm, which serves as an upper limit for beam size at the designated viewing distance. When the visibility of each display pixel is limited to a single eye at a time, a stereoscopic effect is created as unique 2D images are projected to different eyes. In some example methods, this is done by activating the appropriate µLEDs in synchronization with the LCD. In some embodiments, only two images are used, and they are produced with very wide illuminating beams that are visible only to one half of the facial area of a single user. In other embodiments, quality of the display may be increased by increasing the number of views with more than two light emitting elements per each mirror and/or by showing more than two images sequentially. The more views there are inside the viewing window, the better is the illusion of a 3D image as the transition between views becomes smoother and the user is able to "look around" the object by moving his/her head or the display device. This motion is natural to make with handheld devices. In embodiments in which two or more µLED rows are used to form a cross-shaped or rectangular pattern on top of a single mirror, different views may be generated equally to both horizontal and vertical directions enabling display view rotation.

One factor limiting the number of views in such a multiview 3D display is the switching speed of the SLM. Current LCD panels are relatively slow components for this purpose as the available displays only exhibit refresh rates of ~240 Hz. If a flicker-free image is desired to all view directions, this would allow only four unique views, as the commonly accepted threshold value for the human eye is 60 Hz. However, in embodiments in which eye tracking is used, this may be an adequate refresh rate as the minimum number of views needed for an autostereoscopic 3D image is only two, and the eye tracking may be used to determine the exact location of the viewer. In this case the LCD would produce only those images that are used for the two eye directions. In some embodiments, four views are used for improving the stereoscopic effect as it would allow two slightly different images for both eyes and the SMV condition would be fulfilled.

Light intensity of each display pixel is controllable through a desired dynamic range in order to make a display with good image quality. With LCDs, the light intensity is adjusted by controlling the amount of light passing through each pixel with the help of two polarizers 3330, 3340 and electrically-controllable liquid crystal (LC) material layer 3335 that twists the polarization state of the passing light. In some embodiments, a combination of backlight intensity adjustment and LCD pixel absorbance is used in order to achieve a higher contrast ratio. In an example backlight structure, this may be done by continuously adjusting the electric current flowing through each light emitting component. In alternative embodiments, component brightness is adjusted digitally by pulse width modulation (PWM). LEDs in general are components that can be switched extremely rapidly, allowing for adequate dynamic range for a flicker-free image. In some embodiments, the size of the backlight module MBP is the same as the size of the LCD pixel. In such embodiments, a pixel-level intensity adjustment made with the combination of backlight module and LCD may be performed. This approach may be utilized for larger dynamic range pixels. This approach may also allow faster display panel switching speeds as the intensity adjustments would be partially handled by the backlight module.

Any suitable light source (e.g., OLEDs) that can be miniaturized may be used in the MBPs as an alternative to μLEDs. However, the μLEDs are currently preferred for this purpose as they are very small and have high brightness. The small size is beneficial as bigger light sources would add more occlusion on top of the mirrors, and larger sources would also call for larger mirrors in order to achieve the same level of beam collimation. Larger mirrors would also lead to larger MBPs that are thicker, which can be seen as a negative feature especially in the case of mobile devices. If the light emitting element and collimating mirror have rectangular shapes and the width of the light emitting element is, e.g., a tenth the width of the mirror, the light emitting elements would cover only 1% of the area on top of the mirrors. This means, as an example, that if the size of a μLED is 5 μm, the mirror size could be ~50 μm without the array or sources obstructing the emitted light excessively. The ~50 μm mirrors have approximately the same size as 5" full HD mobile phone display pixels. This example calculation shows that the μLEDs are a realistic option for the mobile device use case, and the size of MBPs could be fitted to the size of the LCD pixels enabling e.g. higher dynamic range pictures. As described above, a three-color 9-piece μLED matrix can be built inside an area of 10 μm×10 μm, making it possible to build, e.g., mobile device displays in the 5"-10" size range with pixel-level fitting of the two modules.

Achievable backlight illumination beam collimation level is relevant in determining the suitable viewing distance of the display. The beams emitted from single display pixels preferably cover only the area of approximately one eye. If the beam were to have too large divergence, it would be visible with both eyes simultaneously, interfering with the formation of the stereoscopic image. A lower limit for beam divergence comes from the eye pupil size, as only a few beams hitting the pupil simultaneously is adequate for fulfilling the SMV condition. In practice however, the lower limit is set by the achievable size of the backlight module light emitter and size of the mirror elements. These two parameters describe the achievable beam divergence and feasible viewing distance. With very small sources, beam divergence can also suffer from diffraction effects that place a hard physical limit to the achievable spot size at the viewing distance.

TABLE 2

Calculated maximum feasible viewing distances with different backlight modules

| Emitter Size [μm] | Viewing Distance [mm] with Different Backlight Module Collimating Mirror Sizes | | | |
|---|---|---|---|---|
| | 50 μm mirror | 100 μm mirror | 250 μm mirror | 500 μm mirror |
| 2 | 1250 | 2500 | 6250 | 12500 |
| 5 | 500 | 1000 | 2500 | 5000 |
| 10 | 250 | 500 | 1250 | 2500 |
| 20 | 125 | 250 | 625 | 1250 |

Table 2 lists a set of calculated values for maximum viewing distances that are feasible with different size light emitters and small collimating mirrors based on geometric analysis only. In calculating the values for Table 2, the assumption was made that the light emitting element is positioned at the same distance from the mirror as the mirror aperture size, making the system f-number 1. The mirrors are assumed to be ideally parabolic and the light emitting element is placed at the correct focal distance making the beam collimation as good as possible. Viewing distance was set to the distance where the generated beam size has a diameter of 50 mm. With this size, the beam fits comfortably over the area of only one eye at a time. For example, it can be seen from the table that if a 5 μm emitter is used together with a 50 μm micromirror, the display could be viewed from ~0.5 m distance, which corresponds well to the normal viewing distance of mobile devices. This value represents the approximate maximum distance and the device could be used at a closer range as the diverging beam size would be smaller closer to the display surface. Some other values for the maximum viewing distance could be obtained with different optical f-numbers, but as most of the possible light emitters have a fairly large NA, the small f-number is desirable from the illumination efficiency point-of-view. If the system f-number and/or emitter NA are very large, a lot of light could be wasted as it misses the mirror aperture. This also would mean more crosstalk between pixels and stray light in the system that lowers the image contrast.

To make a full display, the small MBP structures are repeated over a finite display area. As the single MBP generates a limited set of beams that have very limited angular extent, it will also have a limited total divergence angle (TDA). This parameter represents the total FOV of one MBP, and it is visible only inside this particular angular range. If the display is large, care is taken that the TDAs of the MBPs located at the edges of the display will have an adequate overlap region. Without overlapping areas, the edges would not be visible simultaneously, making the whole display image only partially visible. FIG. 28A shows the viewing geometry in an embodiment in which the overlapping TDAs form a viewing window around the viewer facial area. In an alternative embodiment, the emission direction angles (EDAs) of the MBPs located at the display edges are tilted towards the display central line. This option, illustrated in FIG. 28B, has the potential for denser views, as the TDAs can be narrower. In some embodiments, this is achieved by shifting the nominal positions of light sources slightly inside MBPs and by increasing the value of this shift towards the display edges. Alternatively, this tilting may be performed optically by placing an extra optical element on top of the window or by integrating these beam tilting features into the window itself. In a further alternative method for addressing the overlap issue, the whole display surface may be provided with a specific curvature for a predetermined viewing distance. This last option is described in greater detail with respect to the use case described below.

In an example rendering scheme, each MBP has light emitting components that are dedicated to some specific view directions. The matrix of emitters dedicated to one specific direction are activated and synchronized with the SLM for the formation of that particular directional 2D view of the one 3D scene, and the images projected to different directions are created sequentially. This multiplexing scheme may be based on temporal multiplexing only. In alternative embodiments, a more complex rendering scheme may be used that, e.g., utilizes the redundancy of image content in 3D scenes in order to achieve a brighter picture or save energy.

Example Use Case for Directional Backlight. An example use case for a directional backlight embodiment is described with respect to the viewing conditions illustrated in FIG. 34, generally similar to FIGS. 29A-29B. A tablet device with a curved 10" multiview 3D screen is placed at 500 mm distance from a single viewer. The device has a stereoscopic camera pair and IR LEDs that illuminate the facial area of the viewer. The cameras are used for accurate eye tracking that is capable of determining the 3D locations of the viewer eye pupils and, in some embodiments, direction of gaze. This information is used for projecting a stereoscopic 3D image to the eye directions only, which saves energy as the illumination is directed to the eye pupils instead of the whole surrounding space. This also considerably reduces the amount of information to be calculated for the image data and rendering.

Figure 35:
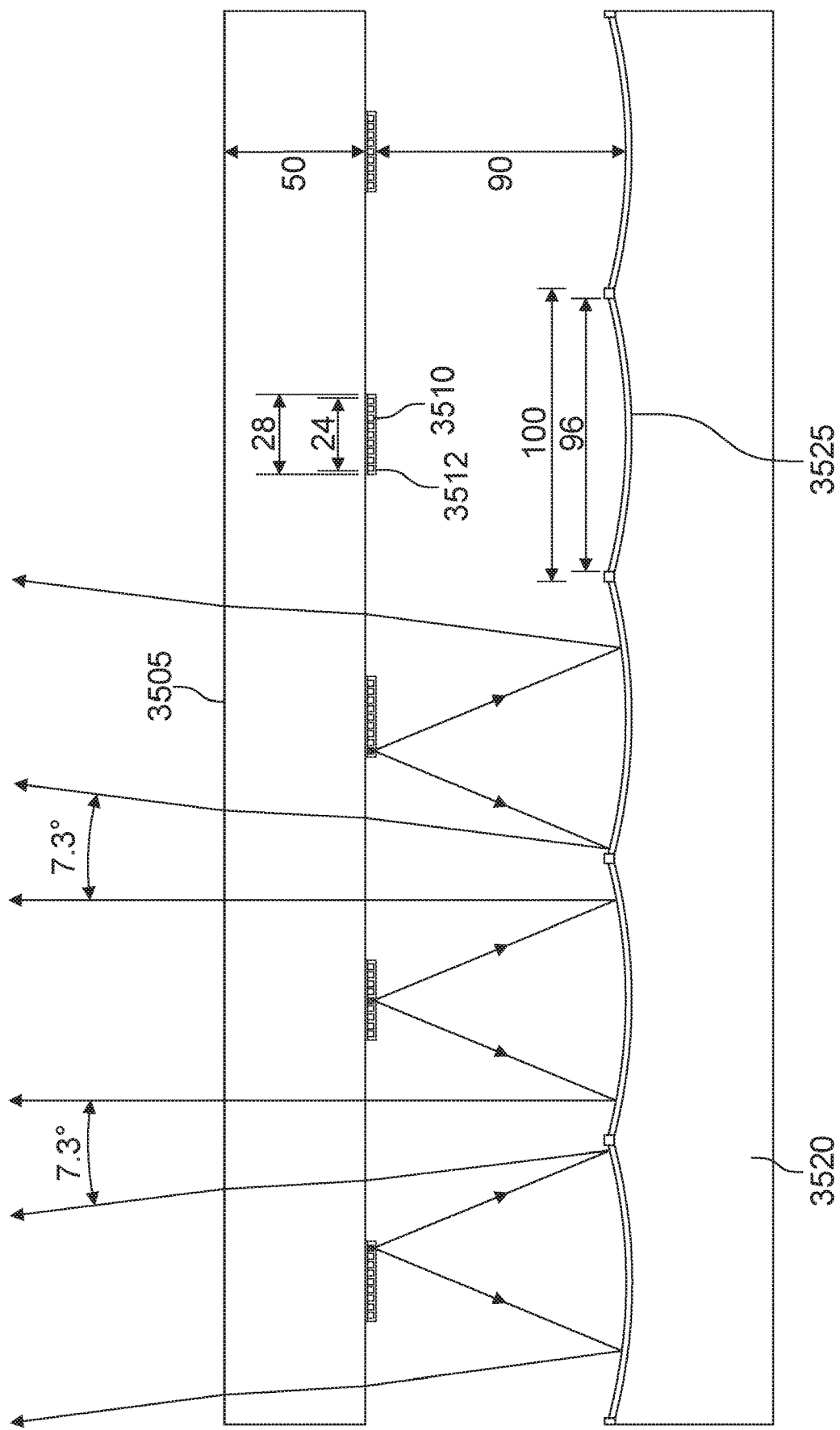
FIG. 35 is a cross-sectional illustration showing example measurements (in μm) of an optical backlight structure according to some embodiments.

FIG. 35 is a cross-sectional illustration showing example measurements (in μm) of an optical backlight structure 3500 that is based on parabolic micromirrors. In this particular example, a total of eighty-one μLEDs 3510 are bonded to a thin borosilicate glass window substrate 3505 on top of each mirror 3525. The components are coated with a thin phosphor layer 3512 that transforms the emitted blue light into a wider white light spectrum. Electrical contacts are made from transparent ITO by etching. The size of each μLED is 2 μm×2 μm and they have a pitch of 3 μm, which means that the outermost μLEDs in each row and column are at ±12 μm distance from the matrix center. The components are positioned at 90 μm distance from the mirrors 3525. Light extraction efficiency of the μLEDs 3510 has been increased by shaping the chips as described above. Due to the shaping, the emission is directional and most of the optical power is primarily contained inside a ±20° emission angle. This NA value of ~0.34 is large enough for covering most of the single mirror aperture from the 90 μm distance and also small enough for not wasting light excessively outside the aperture. The micromirrors 3525 have a curved parabolic shape with a focal length of 95 μm. The shapes are replicated to the mirror substrate 3520 with UV curable material (e.g., Ormocer) and processed with pure aluminum mirror coating. Single mirror aperture size is 96 μm×96 μm, and the mirrors are in a 1920×1080 matrix (full HD) with 100 μm pitch. The light-emitting components 3510 are in a rectangular 9×9 matrix, which makes it possible to generate a total of 81 unique view directions with each MBP. Illuminating beams exit the backlight structure from the top surface of the window 3505, which is coated with light diffusing surface microstructure made from UV-curable material (e.g., Ormocer). The diffuser causes a small 1° (FWHM) widening of the beam divergence and helps to make the far field illumination patterns more even. The outermost components generate beams that are tilted by ~±7.3° from the surface normal. And as the components are in a full matrix, the illumination can be directed symmetrically to both horizontal and vertical directions.

Figure 36:
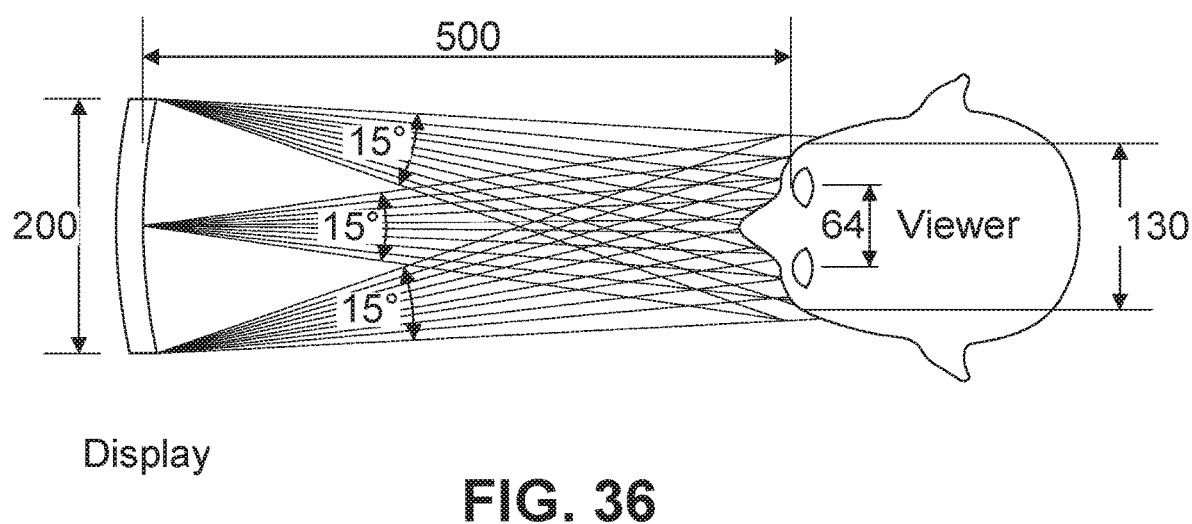
FIG. 36 illustrates viewing geometry of an example use case.

In an example embodiment, a multiview 3D display is created by placing a full HD three-color LCD display with 100 μm pixels on top of the above-described backlight module. FIG. 36 shows the viewing geometry of such an embodiment. By utilizing the eye tracking, it is not necessary to use all of the presented range as light can be directed primarily toward the two eye pupils. The beams generated with the mirror from the 2 μm-size μLEDs have divergence of ~5.2°, which results in a spot size of the single MBP illuminating beam at the 500 mm viewing distance of ~45 mm. Diffraction has only a minor effect to the beam collimation as the backlight system f-number is low. As the off-axis angles are relatively small and the μLED matrix distance from the mirror is optimized, the beam divergence values are same for all beam angles. The spot sizes at the viewing distance are well under the average human interpupillary distance, and all of the single illumination beams are visible only to one eye at any given time inside the 15° total range of each MBP. The total angular extent of pixels in the display edges overlap at the centerline when the vertical direction is considered, and there is no need for additional beam tilting features. However, in the horizontal direction the display width is so large that the overlapping area is not adequate. In order to provide large enough viewing window, the whole display is curved in the horizontal direction and a 130 mm wide viewing window is formed. This size is adequate for a single person and allows tilting of the tablet device and ease of use.

In an example embodiment, image rendering is performed with a rendering scheme in which the μLED intensities are modulated according to image content and synchronized to the LCD. The presentation of two different images is sufficient to generate a stereoscopic effect. However, in some embodiments, the 3D picture quality is enhanced by modulating the LCD pixels and μLEDs faster and projecting more than one image to each eye inside the 60 Hz flicker-free image POV timeframe. If a 240 Hz LCD is used, two images for both eyes may be projected inside the flicker-free frequency. The optical hardware also allows this as two neighboring illumination beams have a reasonable overlap, which makes it possible to project two different images from two slightly different view directions to the eyes almost simultaneously. Such an embodiment fulfills the SMV condition and generates a good quality 3D image. Color rendering can be performed by utilizing the color filters contained in the LCD panel.

Figure 37:
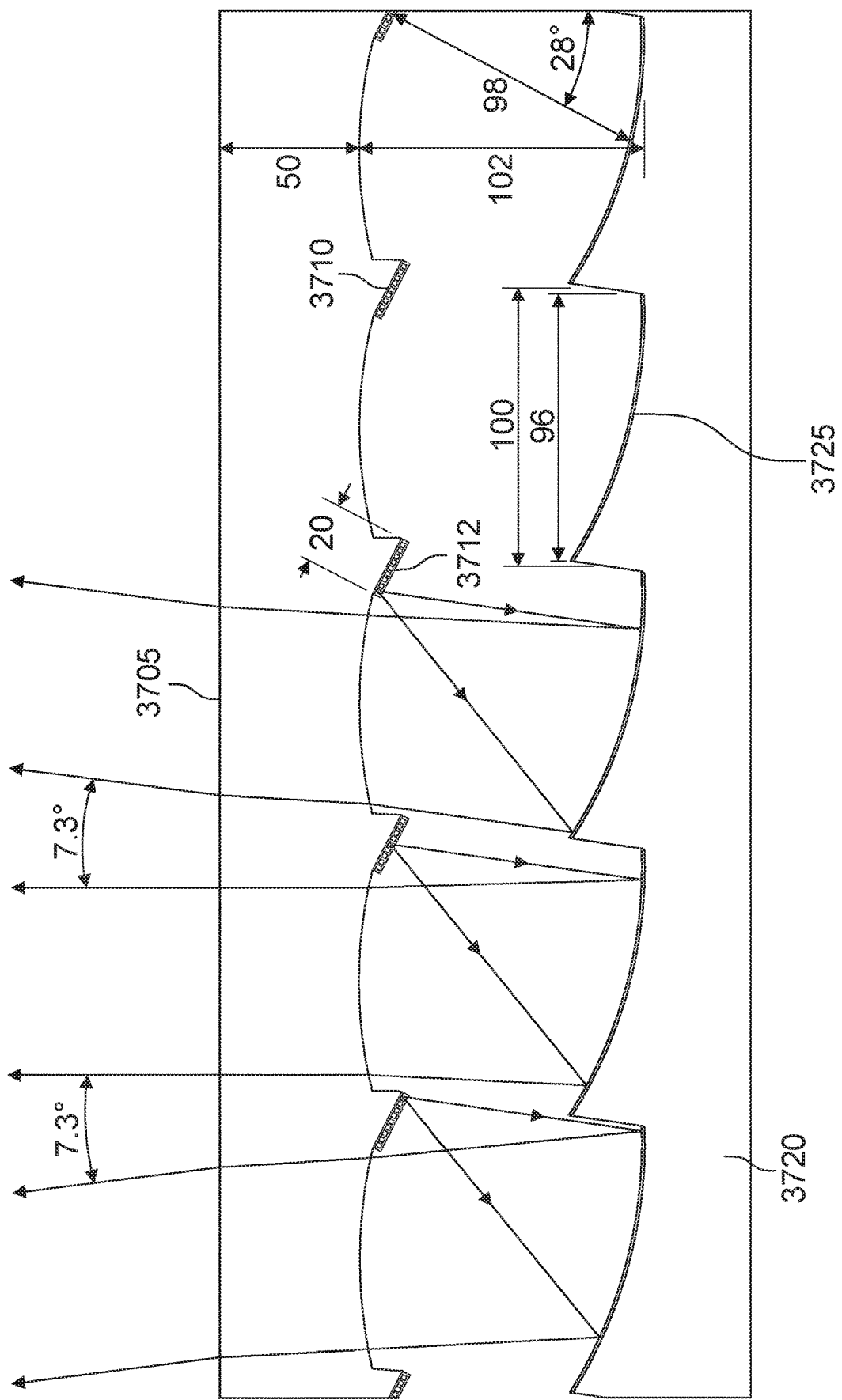
FIG. 37 is a cross-sectional illustration showing example measurements (in μm) of an optical backlight structure according to some embodiments.

FIG. 37 is a cross-sectional illustration showing example measurements (in µm) of an alternative optical backlight structure according to some embodiments. The embodiment of FIG. 37 uses off-axis freeform mirrors 3725. A total of seven µLEDs 3710 are bonded to a thin polycarbonate window substrate 3705 containing optical features. The components 3710 are coated with a thin phosphor layer 3712 that transforms emitted blue light into a wider white light spectrum. Electrical contacts are made from transparent ITO by etching. The size of each µLED 3710 is 2 µm×2 µm and they have a pitch of 3.3 µm, such that the outermost µLEDs in each row and column are at ±10 µm distance from the row center. The components are positioned at ~98 µm distance from the mirrors, and the component row normal is tilted by 28° off from the vertical direction. Optical properties of the µLEDs may be the same as discussed in relation to FIG. 35. In the horizontal direction, the micromirrors 3725 have a curved parabolic shape with a focal length of 70 µm. The mirrors 3725 are also off-axis parabolas that have been tilted by ~4.4° towards the µLED row. In the vertical direction, the mirrors 3725 have a spherical shape with a 280 µm radius. The shapes may be replicated to the mirror substrate 3720 with UV curable material (e.g., Ormocer) and processed with pure aluminum mirror coating. A single mirror aperture size is 96 µm×96 µm, and they are in a 1920×1080 matrix with 100 µm pitch. In this example, the polycarbonate window 3705 contains additional optical shapes that affect the beam collimation in the horizontal direction. The cylindrical shapes have a 184 µm radius and they do not have any optical power in the vertical direction. Illuminating beams exit the backlight structure from the top surface of the window 3705, which may be coated with the same light-diffusing surface microstructures as used in the embodiment of FIG. 35.

One reason for using the combination of mirror and lens shapes in the embodiment of FIG. 37 is to avoid light absorbance at the MBP aperture. The embodiment of FIG. 37 is directed to a solution in which the central occlusion of the light sources is avoided. This is realized by shifting the µLED row to the edge of the backlight pixel aperture and by utilizing an off-axis mirror shape. The arrangement allows µLED contact pads and electrical conductors that are opaque. As a result, for example, etched copper wiring may be used to make the needed electrical contacts instead of transparent ITO, making it easier to optimize the electrical properties of the design. In each MBP, the mirror slightly focuses the beam, making it smaller at the aperture defined by the µLED row, and the lens shapes compensate this with little diverging optical power. The optimized overall freeform shapes of the mirrors and window allow good collimation when the µLEDs are positioned at the edge of the single MBP aperture. The light-emitting components are in a horizontal row, which makes it possible to generate seven horizontal unique view directions with each MBP. As in the example of FIG. 35, the outermost components generate illumination beams that are tilted by ~±7.3° from the surface normal in the horizontal direction, whereas the single beam divergence is ~5.2°. In the vertical direction, the spherical shape of the mirrors causes the illumination beams to spread with an intentionally larger divergence angle of ~±8.5° in order to cover a larger FOV in that direction.

Differences between the examples of FIGS. 35 and 37 include difference in the position of µLEDs with respect to the mirror apertures and difference in the number of views they are creating. In the example of FIG. 37, the µLED row is positioned at the edge of the mirror aperture in order to avoid the occlusion effect coming from the centrally-located source matrix of the embodiment of FIG. 35. This occlusion is apparent in the nearfield spatial illumination distribution, which makes it much more difficult to map all the directional beams equally to the LCD pixels in the small scale. In the embodiment of FIG. 37, there is no occlusion, and fitting between the backlight module and LCD is a more straightforward task. As the embodiment of FIG. 35 has centrally located sources, it is more straightforward to arrange views in both horizontal and vertical directions by placing the µLEDs into a matrix. In the embodiment of FIG. 37, the use of aperture edge results in sources arranged in a row instead of a matrix, making it more natural to generate only one-dimensional views either in the horizontal or vertical direction. However, also in this case, an off-axis freeform shape may be employed in such a way that another row of µLEDs may be added to the other direction, allowing both vertical and horizontal directions to have alternative unique views that would allow for rotation of the display.

Figure 34:
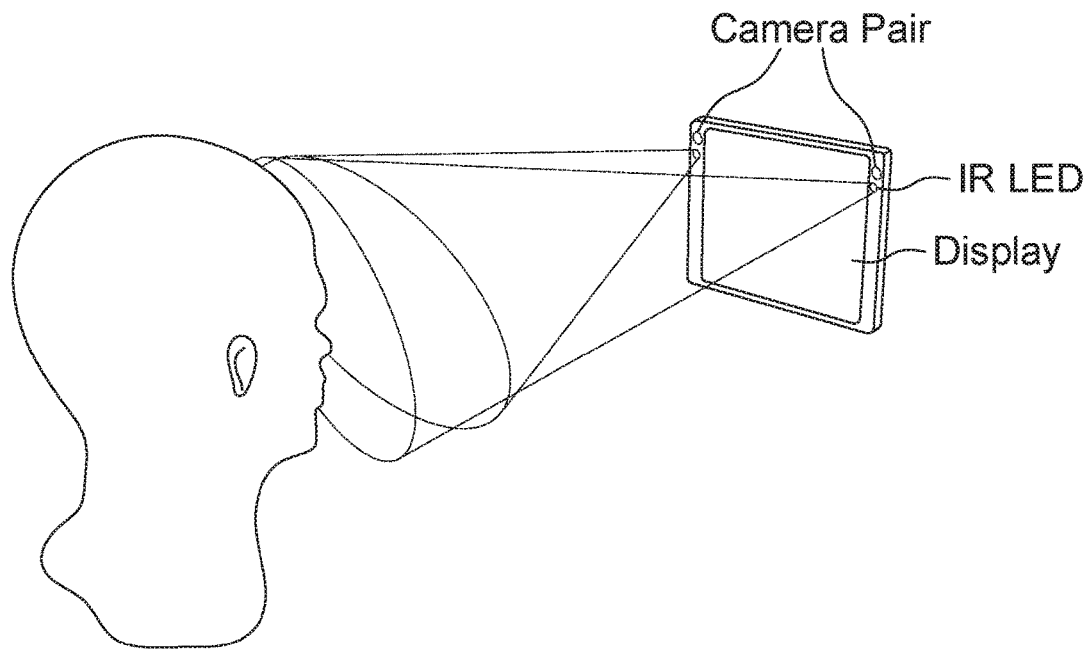
FIG. 34 illustrates viewing conditions for an example use case for a directional backlight, in accordance with some embodiments.

Example backlight structures such as those illustrated in FIGS. 35 and 37 may be employed in the mobile display use case scenario illustrated in FIG. 34. In addition, the viewing geometry shown in FIG. 36 is also applicable to such embodiments as the backlight designs both have similar optical performance characteristics in the horizontal view direction. However, as the embodiment of FIG. 35 employs a source matrix and the embodiment of FIG. 37 employs a source row, the optical characteristics in the vertical direction may be different. In the embodiment of FIG. 35, the use of approximately circular illumination spots is preferred in order to limit the single µLED visibility to one eye only in both directions. In the embodiment of FIG. 37, the illumination patterns may be lines that are narrow in one direction (horizontal) and wide in the other (vertical) in order to limit the visibility of the spots in one direction, but simultaneously to allow them to be visible over a fairly large FOV in the other. In both cases, the relatively narrow illumination beam FOVs allow not only stereoscopic views, but also make it possible to save energy as the illumination is generally directed toward the eyes. Furthermore, the limited visibility of the image makes the whole device safer to use from the privacy point-of-view as the display content can be viewed only inside the specified viewing window.

Raytrace Simulations of Directional Backlight Structures. In order to test optical functioning of the structures of FIGS. 35 and 37, a set of raytrace simulations was performed with commercial optical simulation software OpticsStudio 15.5. For optical parameters used in all simulations for the light sources, physical width of the source was set to 2 µm and angular divergence was set to a Gaussian distribution with full-width-half-maximum (FWHM) value of ±20°. Simulation geometries were set according to the directional backlight designs illustrated in FIGS. 35 and 37. In the simulations, a virtual 200 mm×200 mm detector surface was placed at 500 mm distance from the structures in order to get a view of the illumination patters at the defined far field viewing distance. Another virtual detector surface with the size of 0.3 mm×0.3 mm was placed directly on top of the backlight structures in order to analyze the near field illumination patterns that are falling on the LCD panel pixels.

Far field simulation results for both designs were obtained. In the simulation of the structure of FIG. 35, a total of nine sources were used at the far edges and in the middle of the source matrix in order to determine the extent of the obtainable illumination patterns. Nine visible roughly circular spots showed that the total size of the source matrix image is ~160 mm×160 mm. The single spots had a divergence of ~5° causing a spot size of ~45 mm at the viewing distance. In the simulation of the structure of FIG. 37, a total of three sources were used at the far edges and center of the source row. Three visible vertical illumination stripes showed that the total size of the source row image is in the same range as that of the structure of FIG. 35. In the horizontal direction, the illumination beams in the structure of FIG. 37 had a divergence of ~5° causing a stripe width of ~45 mm at the viewing distance. In the vertical direction, the beams had a divergence of ~±8.5°, which causes the ~150 mm height at the designated 500 mm viewing distance.

Near field simulation results were also obtained for the structures of FIGS. 35 and 37. In the irradiance distribution of light falling directly on the LCD pixels from a single MBP illuminated with the same nine sources described above, the occlusion caused by source matrix at the center of the MPB aperture was clearly visible in the light distribution. This dip in the light intensity makes it more difficult to fit the backlight module with a pixelated display as the pixels could modulate the illumination beams travelling to different directions differently. The size of the single MBP illumination spot was ~100 µm, and it could be seen that two illuminated MBPs caused a total illumination pattern where the spots could be clearly defined from each other. A near field pattern was obtained using the structure of FIG. 37 with a single MBP and with the three sources described above. In this pattern, there was no central occlusion visible and the pixels may be stacked into a matrix with much smaller edge effects as the spots would be somewhat fused together. This near-field difference between the structures of FIGS. 35 and 37 makes it more straightforward to use the structure of FIG. 37 in a display system where the backlight MBPs are much larger than the LCD panel pixels.

A second set of raytrace simulations was performed in order to show the performance of the backlight illumination designs in stereoscopic illumination use. Illumination patterns were obtained for when suitable source pairs were activated inside the simulated structure of FIG. 35 and of FIG. 37. In the simulation of the structure of FIG. 35, a full row of vertical sources was used in order to demonstrate that the full row is able to cover the whole ~150 mm high vertical viewing window. In the simulation of the structure of FIG. 37, only two sources were used as the MBPs generated stripe-shaped illumination patterns that were 150 mm high in the vertical direction. In both cases the illumination peaks obtained with the selected source pairs were found from ~64 mm distance from each other in the horizontal direction. This distance corresponds to the average human interpupillary distance. Furthermore, the simulation results showed that the patterns directed to the left eye are well separated from the patterns directed to the right eye and vice versa, making this a system with potentially very low cross talk between the two stereoscopic channels.

A further simulation was performed with the structure of FIG. 37 by using two pairs of side-by-side sources inside a single MBP. The results showed that the illumination from two neighboring sources overlap making it possible to project two different images to both eyes from slightly different viewing angles and fulfill the SMV condition. This feature may also be used for expanding the eyebox centered to one eye and thus improve the usability and/or lower the manufacturing tolerances as the eye can then move around the central position more freely without deterioration of the stereoscopic image.

In some embodiments, there may be a display device comprising: a mirror array comprising a plurality of collimating mirrors; a transparent substrate positioned over the mirror array; and for each mirror of the mirror array, a corresponding sub-array of light-emitting elements mounted on the transparent substrate, each sub-array being positioned such that light therefrom is substantially collimated by the corresponding mirror and directed through the transparent substrate. The display device may include wherein the collimating mirrors are concave mirrors. The display device may include wherein the collimating mirrors are parabolic mirrors. The display device may include wherein the collimating mirrors are Fresnel mirrors. The display device may include wherein the collimating mirrors are diffractive mirrors. The display device may include wherein the collimating mirrors have a controllable level of tilt around at least one axis. The display device may include wherein the collimating mirrors have a controllable distance from the corresponding sub-array. The display device may further include transparent conductors on the transparent substrate, the transparent conductors being connected to corresponding light-emitting elements to drive the corresponding light-emitting elements. The display device may include wherein each sub-array is a substantially linear array of light-emitting elements. The display device may include wherein each sub-array is a substantially cross-shaped array of light-emitting elements. The display device may include wherein each sub-array is a substantially square array of light-emitting elements. The display device may include wherein each sub-array is substantially centered on an optical axis of the corresponding mirror. The display device may include wherein each sub-array is offset from an optical axis of the corresponding mirror. The display device may include wherein each light-emitting element is a light-emitting diode (LED). The display device may include wherein each light-emitting element is a micro-light-emitting diode (µLED).

In some embodiments, there may be a display device comprising: a mirror array comprising a plurality of collimating mirrors; a transparent substrate positioned over the mirror array; a spatial light modulator positioned over the transparent substrate, the spatial light modulator having a plurality of pixels; and for each mirror of the mirror array, a corresponding sub-array of light-emitting elements mounted on the transparent substrate, each sub-array being positioned such that light therefrom is substantially collimated by the corresponding mirror and directed through the transparent substrate and through corresponding pixels of the spatial light modulator. The display device may include wherein the spatial light modulator is a liquid crystal display. The display device may include wherein the collimating mirrors are concave mirrors. The display device may include wherein the collimating mirrors are parabolic mirrors. The display device may include wherein the collimating mirrors are Fresnel mirrors. The display device may include wherein the collimating mirrors are diffractive mirrors. The display device may include wherein the collimating mirrors have a controllable level of tilt around at least one axis. The display device may include wherein the collimating mirrors have a controllable distance from the corresponding sub-array. The display device may further include transparent conductors on the transparent substrate, the transparent conductors being connected to corresponding light-emitting elements to drive the corresponding light-emitting elements. The display device may include wherein each sub-array is a substantially linear array of light-emitting elements. The display device may include wherein each sub-array is a substantially cross-shaped array of light-emitting elements. The display device may include wherein each sub-array is a substantially square array of light-emitting elements. The display device may include wherein each sub-array is substantially centered on an optical axis of the corresponding mirror. The display device may include wherein each sub-array is offset from an optical axis of the corresponding mirror. The display device may include wherein each light-emitting element is a light-emitting diode (LED). The display device may include wherein each light-emitting element is a micro-light-emitting diode (µLED).

In some embodiments, there may be a method of operating a multiview display, the method comprising: modulating emitted light from each of a plurality of light-emitting elements in each of a plurality of sub-arrays, the light-emitting elements being mounted on a transparent substrate; and for each of the sub-arrays, reflecting the emitted light by a corresponding one of a plurality of collimating mirrors through the transparent substrate; wherein the emitted light is modulated so as to generate at least a first view visible from a first position and a second view visible from a second position. The method may further include modulating the reflected emitted light with a spatial light modulator. The method may include wherein the spatial light modulator is a liquid crystal display, and wherein the reflected emitted light operates as a backlight for the liquid crystal display.

In some embodiments, there may be a liquid crystal display having a backlight, in which the backlight comprises: a mirror array comprising a plurality of collimating mirrors; a transparent substrate positioned over the mirror array; for each mirror of the mirror array, a corresponding sub-array of light-emitting elements mounted on the transparent substrate, each sub-array being positioned such that light therefrom is substantially collimated by the corresponding mirror and directed through the transparent substrate.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A light field display device comprising:
a light engine generating light;
a projection lens;
a spatial light modulator along an optical path from the light engine to the projection lens, wherein the spatial light modulator is configured to modulate the light into an image using spatial multiplexing to independently generate sub-pixels for each pixel of the image;
a digital micromirror device along the optical path between the spatial light modulator and the projection lens, wherein the digital micromirror device has a plurality of individually-directable micromirrors, the digital micromirror device is configured to perform temporal multiplexing, wherein each micromirror successively reflects sub-pixels of a corresponding pixel toward the projection lens in different angular directions, generating different viewing directions of the corresponding pixel; and
an imaging lens arranged between the spatial light modulator and the digital micromirror device, the imaging lens is configured to adjust a pixel size of the spatial light modulator to a pixel size of the digital micromirror device according to a magnification ratio.

2. The display device of claim 1, further comprising a screen, wherein the projection lens is configured to project the reflected sub-pixels onto the screen, the screen including:
a lenticular sheet layer; and
a light-diffusing layer.

3. The display device of claim 1, wherein the spatial light modulator is a digital micromirror device.

4. The display device of claim 1, wherein the spatial light modulator has a higher resolution than the digital micromirror device.

5. The display device of claim 3, wherein the spatial light modulator has micromirrors that are coated with red, green, and blue dielectric color filters.

6. A light field display method comprising:
directing light from a light source to a spatial light modulator, configured to modulate the light into an image;
using spatial multiplexing, by the spatial light modulator, to independently generate sub-pixels for each pixel of the image;
using an imaging lens, mapping the image generated by the spatial light modulator onto directable micromirrors, the mapping adjusts a pixel size of the spatial light modulator to a pixel size of the directable micromirrors according to a magnification ratio, the directable micromirrors are of a digital micromirror device; and
using temporal multiplexing, by the directable micromirrors, to reflect the image toward a projection lens, wherein each micromirror successively reflects sub-pixels of a corresponding pixel toward the projection lens in different angular directions to generate different viewing directions of the corresponding pixel.

7. The method of claim 6, further comprising cycling the directable micromirrors through a plurality of positions, wherein for a micromirror, of the directional micromirrors, and for a corresponding pixel:
while the micromirror is in a first position, reflecting a sub-pixel of the corresponding pixel toward the projection lens in a first angular direction, and
while the micromirror in a second position, reflecting another sub-pixel of the corresponding pixel toward the projection lens in a second angular direction.

8. The method of claim 6, wherein the mapping of the image generated by the spatial light modulator onto directable micromirrors comprises mapping a plurality of sub-pixels of a pixel of the spatial light modulator onto a corresponding micromirror of the directable micromirrors.

9. The method of claim 6, wherein the spatial light modulator has a faster refresh rate than the digital micromirror device.

10. The method of claim 6, wherein the reflected sub-pixels are focused on different focal planes.

11. A light field display device comprising:
- a light engine generating light;
- a projection lens;
- a spatial light modulator along an optical path from the light engine to the projection lens, wherein the spatial light modulator is configured to modulate the light into an image using spatial multiplexing to independently generate sub-pixels for each pixel of the image;
- a digital micromirror device along the optical path between the spatial light modulator and the projection lens, wherein the digital micromirror device has a plurality of individually-directable micromirrors, the digital micromirror device is configured to perform temporal multiplexing, wherein each micromirror successively reflects sub-pixels of a corresponding pixel toward the projection lens in different angular directions, generating different viewing directions of the corresponding pixel.

12. The device of claim 11, wherein the spatial light modulator and micromirrors of the digital micromirror device are synchronized, so that positioning a micromirror to reflect a sub-pixel toward a viewing direction is synchronized with the generation of the sub-pixel by the spatial light modulator.

13. The device of claim 11, wherein the spatial light modulator generates sub-pixels of a pixel at a faster rate than a micromirror scans the different angular directions to project the generated sub-pixels in the different angular directions.

14. The device of claim 11, wherein the spatial light modulator is coated with a polarizing film and the projection lens contain a birefringent material, so that sub-pixels of a pixel are projected through the projection lens at multiple focal planes.

15. The device of claim 14, wherein sub-pixels of a pixel that are projected through the projection lens at multiple focal planes each having a unique image content.

16. A light field display method comprising:
- directing light from a light source to a spatial light modulator, configured to modulate the light into an image;
- using spatial multiplexing, by the spatial light modulator, to independently generate sub-pixels for each pixel of the image; and
- using temporal multiplexing, by directable micromirrors of a digital micromirror device, to reflect the image toward a projection lens, wherein each micromirror successively reflects sub-pixels of a corresponding pixel toward the projection lens in different angular directions, generating different viewing directions of the corresponding pixel.

17. The method of claim 16, wherein for a micromirror, of the directional micromirrors, and for a corresponding pixel:
- while the micromirror is in a first position, reflecting a sub-pixel of the corresponding pixel toward the projection lens in a first angular direction, and
- while the micromirror in a second position, reflecting another sub-pixel of the corresponding pixel toward the projection lens in a second angular direction.

18. The method of claim 16, wherein the spatial light modulator and micromirrors of the digital micromirror device are synchronized, so that positioning a micromirror to reflect a sub-pixel toward a viewing direction is synchronized with the generation of the sub-pixel by the spatial light modulator.

19. The method of claim 16, wherein the spatial light modulator generates sub-pixels of a pixel at a faster rate than a micromirror scans the different angular directions to project the generated sub-pixels in the different angular directions.

20. The method of claim 16, wherein the spatial light modulator is coated with a polarizing film and the projection lens contain a birefringent material, so that sub-pixels of a pixel are projected through the projection lens at multiple focal planes.

* * * * *